(12) United States Patent
Daniels et al.

(10) Patent No.: US 11,551,378 B2
(45) Date of Patent: Jan. 10, 2023

(54) INFORMATION PROCESSING SYSTEM, INFORMATION PROCESSING DEVICE, SERVER DEVICE, PROGRAM, AND METHOD TO IDENTIFY A POSITION IN A FIGURE

(71) Applicant: NEURAL POCKET INC., Tokyo (JP)

(72) Inventors: Alex Edward Daniels, Tokyo (JP); Yuichi Sasaki, Tokyo (JP); Taichi Koido, Tokyo (JP); Roi Shigematsu, Tokyo (JP)

(73) Assignee: NEURAL POCKET INC., Tokyo (JP)

( * ) Notice: Subject to any disclaimer, the term of this patent is extended or adjusted under 35 U.S.C. 154(b) by 0 days.

(21) Appl. No.: 17/289,378

(22) PCT Filed: Dec. 27, 2018

(86) PCT No.: PCT/JP2018/048120
§ 371 (c)(1),
(2) Date: Apr. 28, 2021

(87) PCT Pub. No.: WO2020/090126
PCT Pub. Date: May 7, 2020

(65) Prior Publication Data
US 2022/0067962 A1 Mar. 3, 2022

(30) Foreign Application Priority Data
Oct. 31, 2018 (WO) .................. PCT/JP2018/040594

(51) Int. Cl.
*G06T 7/73* (2017.01)
*G06T 11/60* (2006.01)
(Continued)

(52) U.S. Cl.
CPC .............. *G06T 7/74* (2017.01); *G06T 11/203* (2013.01); *G06T 2207/30196* (2013.01); *G06T 2207/30232* (2013.01); *H04N 7/181* (2013.01)

(58) Field of Classification Search
None
See application file for complete search history.

(56) References Cited

U.S. PATENT DOCUMENTS

| 6,633,685 B1 | 10/2003 | Kusama et al. |
| 2004/0022453 A1 | 2/2004 | Kusama et al. |

(Continued)

FOREIGN PATENT DOCUMENTS

| JP | 2000-090092 | 3/2000 |
| JP | 2005-286685 | 10/2005 |

(Continued)

OTHER PUBLICATIONS

Jay P. Kapur, David P. Casasent, "Geometric correction of SEM images," Proc. SPIE 4044, Hybrid Image and Signal Processing VII, (Jul. 17, 2000), SPIEDigitalLibrary.org/conference-proceedings-of-spie (Year: 2000).*

(Continued)

*Primary Examiner* — Tize Ma
(74) *Attorney, Agent, or Firm* — Greenblum & Bernstein, P.L.C.

(57) ABSTRACT

The computer stores the plurality of first positions in the image captured by the image pickup device and the second positions corresponding to the plurality of first positions in the graphic corresponding to the image as a relationship. The computer acquires a third position related to the object in the image, a positional relationship between a part of the plurality of first positions and the third position, and one of the relationships. A method specifies a position in a figure corresponding to a position in an image including generating (Continued)

a fourth position in the figure corresponding to the third position using parts or all. In a method, a part of the plurality of first positions is three first positions closest to the third position among the plurality of first positions. A method includes generating the fourth position using the sides of a triangle composed of the three first positions.

13 Claims, 70 Drawing Sheets

(51) Int. Cl.
  *G06T 11/20* (2006.01)
  *H04N 7/18* (2006.01)

(56) References Cited

U.S. PATENT DOCUMENTS

| | | | | |
|---|---|---|---|---|
| 2012/0114229 | A1* | 5/2012 | Zhou | G06T 3/4038 |
| | | | | 382/164 |
| 2015/0058079 | A1 | 2/2015 | Freund et al. | |
| 2016/0189274 | A1 | 6/2016 | MacLaurin et al. | |
| 2016/0253579 | A1 | 9/2016 | Bamba | |
| 2016/0343152 | A1* | 11/2016 | Hay | G06T 11/60 |

FOREIGN PATENT DOCUMENTS

| | | |
|---|---|---|
| JP | 2010-262425 | 11/2010 |
| JP | 2012-014544 | 1/2012 |
| JP | 2015-230580 | 12/2015 |
| JP | 2016-163075 | 9/2016 |
| JP | 2018-046415 | 3/2018 |
| JP | 2018-120527 | 8/2018 |
| WO | 2018/159095 | 9/2018 |

OTHER PUBLICATIONS

Lt.Dr.S.Santhosh Baboo et al, "Geometric Correction in Recent High Resolution Satellite Imagery: A Case Study in Coimbatore, Tamil Nadu", International Journal of Computer Applications (0975-8887) vol. 14—No. 1, Jan. 2011 (Year: 2011).*

Samuel S. Rifman, "Digital Rectification of ERTS Multispectral Imagery", NASA. Goddard Space Flight Center Symp. on Significant Results obtained from the ERTS-1, vol. 1, Sect. A and B, Jan. 1, 1973 (Year: 1973).*

International Search Report issued in International Patent Application No. PCT/JP2018/048120, dated Feb. 26, 2019, with an English translation thereof.

Aug. 2015, pp. 48-50, "Big Data DAIZEN to grasp eveiything 2015-2016", Nikkei Business Publications, Inc.

Nov. 2016, No. 33, p. 10, Sugimoto, Akihiko, "Fashion proposal application that utilizes deep learning, developed by Scigineer learning millions of images", Nikkei BigData).

2016, No. 29, p. 26, Tada, Waichi, "Clarifying trends from images of photo sharing service, LeapMind", publication of analysis service of deep learning utilization, Nikkei BigData).

Edward Shen et al: "Multi-Camera Network Calibration With a Non-Planar Target", IEEE Sensors Jounral, IEEE, USA, vol. 11, No. 10, Oct. 1, 2011 (Oct. 1, 2011), pp. 2356-2364, XP011350209, ISSN: 1530-437x, DOI: 10.1109/JSEN.2011.2123884.

Liu Chin-Wei et al: "Accelerating Vanishing Point-Based Line Sampling Scheme for Real-Time People Localization", IEEE Transactions on Circuits and Systems for Video Technology, vol. 27, Jan. 5, 2017 (Jan. 5, 2017), p. 409, XP055930857, DOI: 10.1109/TCSVT.2017.2649019 Retried from the Internet: URL:https//ieeexplore.ieee.org/stampPDF/getPDF.jsp?tp=&arnumber=7807241&ref=aHR0cHM6Ly9pZWVleHBsb3JlLml1ZWUub3JnJnL2Fic3RyYWNOL2RvY3VtZW50Lzc4MDcyNDE=> [retrieved on Jun. 14, 2022].

Official Communication Received in European Patent Application No. 18939000.8, dated Jun. 28, 2022.

* cited by examiner

FIG.4

| No | Real Image X cordinate | Real Image Y cordinate | Reference Image X cordinate | Reference Image Y cordinate |
|---|---|---|---|---|
| 1 | Ax1 | Ay1 | Atx1 | Aty1 |
| 2 | Ax2 | Ay2 | Atx2 | Aty2 |
| 3 | Ax3 | Ay3 | Atx3 | Aty3 |
| 4 | Ax4 | Ay4 | Atx4 | Aty4 |
| 5 | Ax5 | Ay5 | Atx5 | Aty5 |
| 6 | Ax6 | Ay6 | Atx6 | Aty6 |
| 7 | Ax7 | Ay7 | Atx7 | Aty7 |
| 8 | Ax8 | Ay8 | Atx8 | Aty8 |
| ... | ... | ... | ... | ... |
| N | AxN | AyN | AtxN | AtyN |

FIG.6

|     | Real Image  |             | Reference Image R |          |
|-----|-------------|-------------|-------------------|----------|
| No  | X cordinate | Y cordinate | X cordinate       | Y cordinate |
| 1   | A1x1        | A1y1        | Atx1              | Aty1     |
| 2   | A1x2        | A1y2        | Atx2              | Aty2     |
| 3   | A1x3        | A1y3        | Atx3              | Aty3     |
| 4   | A1x4        | A1y4        | Atx4              | Aty4     |
| 5   | A1x5        | A1y5        | Atx5              | Aty5     |
| 6   | A1x6        | A1y6        | Atx6              | Aty6     |
| 7   | A1x7        | A1y7        | Atx7              | Aty7     |
| 8   | A1x8        | A1y8        | Atx8              | Aty8     |
| ... | ...         | ...         | ...               | ...      |
| N   | A1xN        | A1yN        | AtxN              | AtyN     |
| N+1 | A2x1        | A2y1        | AtXN+1            | AtyN+1   |
| ... | A2x2        | A2y2        | ...               | ...      |
| ... | A2x3        | A2y3        | ...               | ...      |
| ... | A2x4        | A2y4        | ...               | ...      |
| ... | A2x5        | A2y5        | ...               | ...      |
| ... | A2x6        | A2y6        | ...               | ...      |
| ... | A2x7        | A2y7        | ...               | ...      |
| ... | A2x8        | A2y8        | ...               | ...      |
| ... | ...         | ...         | ...               | ...      |
| N+M | A2xN+M      | A2yN+M      | AtxN+M            | AtyN+M   |

FIG.8

| No | Real Image A | | Reference ImageR | |
|---|---|---|---|---|
|  | X cordinate | Y cordinate | X cordinate | Y cordinate |
| 1 | Ax1 | Ay1 | A1tx1 | A1ty1 |
| 2 | Ax2 | Ay2 | A1tx2 | A1ty2 |
| 3 | Ax3 | Ay3 | A1tx3 | A1ty3 |
| 4 | Ax4 | Ay4 | A1tx4 | A1ty4 |
| 5 | Ax5 | Ay5 | A1tx5 | A1ty5 |
| 6 | Ax6 | Ay6 | A1tx6 | A1ty6 |
| 7 | Ax7 | Ay7 | A1tx7 | A1ty7 |
| 8 | Ax8 | Ay8 | A1tx8 | A1ty8 |
| ... | ... | ... | ... | ... |
| N | AxN | AyN | A1txN | A1tyN |
| N+1 | AxN+1 | AyN+1 | A2tx1 | A2ty1 |
| ... | ... | ... | A2tx2 | A2ty2 |
| ... | ... | ... | A2tx3 | A2ty3 |
| ... | ... | ... | A2tx4 | A2ty4 |
| ... | ... | ... | A2tx5 | A2ty5 |
| ... | ... | ... | A2tx6 | A2ty6 |
| ... | ... | ... | A2tx7 | A2ty7 |
| ... | ... | ... | A2tx8 | A2ty8 |
| ... | ... | ... | ... | ... |
| N+M | AxN+M | AyN+M | A2txN | A2tyN |

FIG.19

1) the directions of the eyes and nose are the same,
2) reaching out by hand,
3) returning a hand,
4) putting hands on the shoulder for a certain period of time, and
5) bringing the neck and ankle closer to each other.
6) The neck, hips and ankles are close to each other.

FIG.20

| Person ID | Slide ID | Neck | Noise | Right | | | | | | Left | | | | | |
|---|---|---|---|---|---|---|---|---|---|---|---|---|---|---|---|
| | | | | Wrist | Elbow | Shoulder | Waist | Knee | Ankle | Wrist | Elbow | Shoulder | Waist | Knee | Ankle |
| 001 | 0023 | (xn,yn) | (xno,yno) | (xne,yne) | (xe,ye) | (xs,ys) | (xh,yh) | (xk,yk) | (xa,ya) | ... | ... | ... | ... | ... | ... |
| 001 | 0024 | ... | ... | ... | ... | ... | ... | ... | ... | ... | ... | ... | ... | ... | ... |
| 001 | 0025 | ... | ... | ... | ... | ... | ... | ... | ... | ... | ... | ... | ... | ... | ... |
| ... | | | | | | | | | | | | | | | |

FIG.21

1. 1. ・ ・ ・
2. 2. The position of both wrists and the position of each corresponding shoulder fluctuate from a predetermined range to outside a predetermined range within a predetermined period.
3. 3. The position of both wrists and the position of each corresponding shoulder fluctuate from outside a predetermined range to within a predetermined range within the specified period.
4. The position of the left wrist and the position of the left shoulder are within the predetermined range, and the position of the right wrist and the position of the right shoulder are within the predetermined range for a predetermined time.
5. The position of the neck and the positions of the left ankle and the right ankle fluctuate from outside the predetermined range to within the predetermined range, and the fluctuation of the waist position during these fluctuation periods is within the predetermined range.
6. The position of the neck and the positions of the left ankle and the right ankle fluctuate from outside the predetermined range to within the predetermined range, and during these fluctuation periods, the position of the waist, the position of the left ankle and the position of the right ankle fluctuate from out of the predetermined range to within the predetermined range.

FIG.22

| Time range | Person ID | Person Position Information | Person Behavior Information | Person Behavior Supplemental Information |
|---|---|---|---|---|
| 10:00~10:05 | 001 | t1x1, t1y1 | pattern 1) | 30 degrees |
| | 002 | t1x2, t1y2 | pattern 3) | 50 degrees |
| | 003 | t1x3, t1y3 | pattern 5) | 20 degrees |
| | 001 | t1x4, t1y4 | pattern 2) | 50 degrees |
| 10:05~10:10 | 001 | t2x1, t2y1 | pattern 3) | 180 degrees |
| | 002 | t2x2, t2y2 | pattern 2) | 0 degrees |
| | 003 | t2x3, t2y3 | pattern 1) | 30 degrees |
| | 003 | t2x4, t2y4 | pattern 1) | 40 degrees |
| ... | ... | ... | ... | ... |

FIG.25

| Target time | Imaging device 05 | | | | | Imaging device 06 | | | | |
|---|---|---|---|---|---|---|---|---|---|---|
| | Target ID | Real Image | | Reference Image | | Target ID | Real Image | | Reference Image | |
| | | X cordinate | Y cordinate | X cordinate | Y cordinate | | x cordinate | y cordinate | x cordinate | y cordinate |
| t1 | | | | | | | | | | |
| t2 | | | | | | | | | | |
| t3 | 5 | x1 | y1 | 0 | 3 | | | | | |
| t4 | 5 | x2 | y2 | 2 | 3 | | | | | |
| t5 | 5 | x3 | y3 | 4 | 3 | | | | | |
| t6 | 5 | x4 | y4 | 6 | 3 | | | | | |
| t7 | | | | | | | | | | |
| t8 | | | | | | 5 | x5 | y5 | 1 | 4 |
| t9 | | | | | | 5 | x6 | y6 | 3 | 4 |
| t10 | | | | | | 5 | x7 | y7 | 5 | 4 |
| t11 | | | | | | 5 | x8 | y8 | 7 | 4 |
| t12 | | | | | | | | | | |
| t13 | | | | | | | | | | |

FIG.29

| Area ID | Area positional information | | | |
|---|---|---|---|---|
| | X lower limit | X upper limit | Y lower limit | Y upper limit |
| 1 | 1xL | 1xU | 1yL | 1yU |
| 2 | 2xL | 2xU | 2yL | 2yU |
| 3 | 3xL | 3xU | 3yL | 3yU |
| 4 | 4xL | 4xU | 4yL | 4yU |

FIG.30

| Area ID | Area positional information<br>The values taken by an area are shown by the variables x and y, and let a, b, and c be coefficients. |
|---|---|
| 1 | $x^2+y^2 <= a1$ |
| 2 | $x >= b$ |
| 3 | $x <= c1 \land y > c2$ |
| 4 | ... |

FIG32

| Target ID | Area information belonged to |
|---|---|
| 1 | Area 3 |
| 2 | Area 2 |
| 3 | Area 5 |
| 4 | Area 3 |
| 5 | ... |

FIG.33

| Target ID | Area information belonging to | Area information belonging to | Area information belonging to |
|---|---|---|---|
| 1 | Area 1 | Area 1.2 | |
| 2 | Area 2 | Area 2.1 | |
| 3 | Area 1 | Area 1.3 | Area 1.3.2 |
| 4 | Area 3 | | |
| 5 | ... | | |

FIG.35

| Target ID | Reference Image | | Area |
|---|---|---|---|
| | x cordinate | y cordinate | |
| 1 | x1 | y1 | F1 |
| 2 | x2 | y2 | F2 |
| 3 | x3 | y3 | F1 |
| 4 | x4 | y4 | F4 |
| 5 | x5 | y5 | F2 |
| 6 | x6 | y6 | F2 |
| 7 | x7 | y7 | F3 |
| 8 | x8 | y8 | F5 |
| ... | ... | ... | ... |

FIG.36

| Time | F1 | F2 | F3 | F4 |
|---|---|---|---|---|
| t1 | 2 | 3 | 0 | 1 |
| t2 | 2 | 2 | 1 | 1 |
| t3 | 4 | 1 | 0 | 2 |
| ... | ... | ... | ... | ... |

FIG.37

| Target ID | types | time | Reference Image | | Area |
| --- | --- | --- | --- | --- | --- |
| | | | x cordinate | y cordinate | |
| 1 | 1 | t1 | t1x1 | t1y1 | F1 |
| 2 | 2 | t1 | t1x2 | t1y2 | F2 |
| 3 | 1 | t1 | t1x3 | t1y3 | F1 |
| 4 | 1 | t1 | t1x4 | t1y4 | F4 |
| 5 | 1 | t1 | t1x5 | t1y5 | F2 |
| 6 | 2 | t1 | t1x6 | t1y6 | F2 |
| 1 | 1 | t2 | t2x1 | t2y1 | F1 |
| 2 | 2 | t2 | t2x2 | t2y2 | F2 |
| 3 | 1 | t2 | t2x3 | t2y3 | F1 |
| 4 | 1 | t2 | t2x4 | t2y4 | F4 |
| 5 | 1 | t2 | t2x5 | t2y5 | F2 |
| 6 | 2 | t2 | t2x6 | t2y6 | F3 |
| 1 | 1 | t3 | t3x1 | t3y1 | F1 |
| 2 | 2 | t3 | t3x2 | t3y2 | F2 |
| 3 | 1 | t3 | t3x3 | t3y3 | F1 |
| 4 | 1 | t3 | t3x4 | t3y4 | F4 |
| 5 | 1 | t3 | t3x5 | t3y5 | F1 |
| 6 | 2 | t3 | t3x6 | t3y6 | F4 |
| 7 | 1 | t3 | t3x7 | t3y7 | F1 |
| ... | ... | ... | ... | ... | ... |

FIG.38

|      | Type 1 |    |    |    | Type 2 |    |    |    |
|------|--------|----|----|----|--------|----|----|----|
| Time | F1     | F2 | F3 | F4 | F1     | F2 | F3 | F4 |
| t1   | 2      | 1  | 0  | 1  | 0      | 2  | 0  | 0  |
| t2   | 2      | 1  | 0  | 1  | 0      | 1  | 1  | 0  |
| t3   | 4      | 0  | 0  | 1  | 0      | 1  | 0  | 1  |
| ...  | ...    | ...| ...| ...| ...    | ...| ...| ...|

FIG.43

| Item | Time | Area | Person ID | Person Position |
|---|---|---|---|---|
| 1 | 10:00. 00. 1 | 11 | 1 | xt1、yt1 |
| 2 | 10:00. 00. 1 | 11 | 2 | xt2、yt2 |
| 3 | 10:00. 00. 1 | 13 | 3 | xt3、yt3 |
| 4 | 10:00. 00. 1 | 13 | 4 | xt4、yt4 |
| ... | ... | ... | ... | ... |

FIG.48

| Merchandise ID | Area |
|---|---|
| 001 | 11 |
| 002 | 12 |
| 003 | 13 |
| 004 | 11 |
| 005 | 12 |
| 006 | 11 |
| ... | ... |

FIG.51

| Ranking | Merchandise | Number of people |
|---:|---|---:|
| 1 | Merchandise ID1 | 491 |
| 2 | Merchandise ID2 | 444 |
| 3 | Merchandise ID3 | 436 |
| 4 | Merchandise ID4 | 430 |
| 5 | Merchandise ID5 | 389 |
| 6 | Merchandise ID6 | 232 |
| 7 | Merchandise ID7 | 165 |

FIG.52

| Person behavior information | Weighed value |
|---|---|
| 1) The direction of eys and nose are same for a predetermined time | 3 |
| 2) reaching out by hand, | 7 |
| 3) returning a hand, | 0 |
| 4) putting hands on the shoulder for a certain period of time, and | 10 |
| 5) bringing the neck and ankle closer to each other, | 2 |
| 6) The neck, hips and ankles are close to each other. | 2 |

FIG.53

| Ranking | male/female | age group | a number of people |
|---|---|---|---|
| 1 | female | 20's | 330 |
| 2 | male | 20's | 320 |
| 3 | female | 30's | 317 |
| 4 | female | 10's | 284 |
| 5 | male | 30's | 237 |
| ... | ... | ... | ... |

FIG.54

| Ranking | male/female | age of group | Fashion time group | Fashion item colour | a number of people |
|---|---|---|---|---|---|
| 1 | female | 20's | outing | shirt | gray | 330 |
| 2 | male | 20's | outing | shirt | black | 320 |
| 3 | female | 30's | ... | ... | 317 |
| 4 | female | 10's | ... | ... | 284 |
| 5 | male | 30's | ... | ... | 237 |
| ... | ... | ... | ... | ... | ... |

FIG.57

| Target ID | Reference image | | | Area |
|---|---|---|---|---|
| | time | x cordinate | y cordinate | |
| 1 | t1 | t1x1 | t1y1 | F1 |
| 1 | t2 | t2x1 | t2y1 | F2 |
| 1 | t3 | t3x1 | t3y1 | F3 |
| 1 | t4 | t4x1 | t4y1 | F5 |
| 1 | t5 | t5x1 | t5y1 | F7 |
| 1 | t6 | t6x1 | t6y1 | F9 |
| 1 | t7 | t7x1 | t7y1 | F13 |
| 1 | t8 | t8x1 | t8y1 | F15 |
| ... | ... | ... | ... | ... |
| 1 | tN | tNx1 | tNy1 | F25 |

FIG.60

| Time | Person ID | Positions | | Distance | | | |
|---|---|---|---|---|---|---|---|
| | | | | Person ID1 | Person ID2 | Person ID3 | ... |
| 001 | 1 | P1X1 | P1Y1 | | D12 | D13 | ... |
| 001 | 2 | P2X1 | P2Y1 | D21 | | D23 | ... |
| 001 | 3 | P3X1 | P3Y1 | D31 | D32 | | ... |
| 001 | 4 | P4X1 | P4Y1 | D41 | D42 | D43 | ... |
| 001 | 5 | P5X1 | P5Y1 | D51 | D52 | D53 | ... |
| ... | ... | ... | ... | ... | ... | ... | ... |
| 002 | 1 | P1X2 | P1Y2 | | D12 | D13 | ... |
| 002 | 2 | P2X2 | P2Y2 | D21 | | D23 | ... |
| 002 | 3 | P3X2 | P3Y2 | D31 | D32 | | ... |
| 002 | 4 | P4X2 | P4Y2 | D41 | D42 | D43 | ... |
| 002 | 5 | P5X2 | P5Y2 | D51 | D52 | D53 | ... |
| ... | ... | ... | ... | ... | ... | ... | ... |

FIG.61

| Entry Door | Time | Person ID | Person movinig direction |
|---|---|---|---|
| Entry Door 1 | 001 | 001 | People coming in |
| Entry Door 1 | 001 | 002 | People getting out |
| Entry Door 1 | 002 | 003 | People getting out |
| Entry Door 1 | 002 | ... | ... |
| Entry Door 1 | 003 | 005 | People coming in |
| ... | ... | ... | ... |
| Entry Door 2 | 550 | ... | ... |
| Entry Door 2 | 550 | ... | ... |
| Entry Door 2 | 550 | 005 | People getting out |
| Entry Door 2 | 550 | 001 | People coming in |
| Entry Door 2 | 550 | ... | ... |
| ... | ... | ... | ... |
| Entry Door 3 | 050 | ... | ... |
| Entry Door 3 | 050 | 002 | People getting out |
| Entry Door 3 | 050 | ... | ... |
| Entry Door 3 | 050 | ... | ... |
| Entry Door 3 | 050 | ... | ... |

FIG.65

|  | Fashion Item | | | | | ... |
|---|---|---|---|---|---|---|
| Image for Learning ID | Types | Types detailed 1 | Types detailed 2 | Colour | Processing | |
| ID1001 | Upper garment | sweater | sweater 1 | Green | Without processing | |
| ID1002 | pants | chino pants | | Black | Without processing | |
| ID1003 | Upper garment | sweater | sweater 2 | White | Without processing | |
| ... | | | | | | |

FIG.66

|  | Fashion Item 1 | | | | Fashion Item 2 | | | ... |
|---|---|---|---|---|---|---|---|---|
| Image for Learning ID | Attribute 1 | Attribute 2 | Attribute 3 | ... | Attribute 1 | Attribute 2 | ... | ... |
| ID00001001 | | | | | | | | |
| ID00001002 | | | | | | | | |
| ID00001003 | | | | | | | | |
| ... | | | | | | | | |

FIG.67

| Image for Learning ID | Person 1 | | ... | Fashion Item 1 | | | ... | Fashion Item 2 | | ... | Person 1 | | ... | Fashion Item 1 | | ... |
| --- | --- | --- | --- | --- | --- | --- | --- | --- | --- | --- | --- | --- | --- | --- | --- | --- |
| | Attribute 1 | Attribute 2 | ... | Attribute 1 | Attribute 2 | Attribute 3 | ... | Attribute 1 | Attribute 2 | ... | Attribute 1 | Attribute 2 | ... | Attribute 1 | Attribute 2 | Attribute 3 |
| ID00001001 | | | | | | | | | | | | | | | | |
| ID00001002 | | | | | | | | | | | | | | | | |
| ID00001003 | | | | | | | | | | | | | | | | |
| ... | | | | | | | | | | | | | | | | |

|  |  | Person | | | |
|---|---|---|---|---|---|
| Image for Learning ID | Person | Rough Age group | Fine age group | male/female | ... |
| ID1001 | 1 | ... | ... | ... | ... |
| ID1002 | 1 | ... | ... | ... | ... |
| ID1002 | 2 | ... | ... | ... | ... |
| ID1002 | 3 | ... | ... | ... | ... |
| ID1003 | 1 | ... | ... | ... | ... |
| ID1003 | 2 | ... | ... | ... | ... |
| ... | ... | ... | ... | ... | ... |

FIG.68(a)

|  |  | Fashion Item | | | |
|---|---|---|---|---|---|
| Image for Learning ID | Person | Fashoin Item types | Fashion Item colour | Fashion Item processing | ... |
| ID1001 | 1 | Upper garment | ... | ... | ... |
| ID1001 | 1 | Bottoms | ... | ... | ... |
| ID1001 | 1 | Shoes | ... | ... | ... |
| ID1002 | 1 | Upper garment | ... | ... | ... |
| ID1002 | 1 | Bottoms | ... | ... | ... |
| ID1002 | 1 | Hat | ... | ... | ... |
| ID1002 | 1 | Shoes | ... | ... | ... |
| ID1002 | 2 | ... | ... | ... | ... |
| ID1002 | 3 | ... | ... | ... | ... |
| ID1003 | 1 | ... | ... | ... | ... |
| ID1003 | 2 | ... | ... | ... | ... |
| ... | ... | ... | ... | ... | ... |

| Person 1 | | | Fashion Item 1 | | | | Fashion Item 2 | | | |
|---|---|---|---|---|---|---|---|---|---|---|
| Attribute 1 | Attribute 2 | ... | Attribute 1 | Attribute 2 | Attribute 3 | ... | Attribute 1 | Attribute 2 | ... | |

FIG. 70

| Person 1 | | | Fashion Item 1 | | | | Fashion Item 2 | | | | ... | Person 2 | | | Fashion Item 1 | | | | ... |
|---|---|---|---|---|---|---|---|---|---|---|---|---|---|---|---|---|---|---|---|
| Attribute 1 | ... | | Attribute 1 | Attribute 2 | Attribute 3 | ... | Attribute 1 | Attribute 2 | ... | | | Attribute 1 | Attribute 2 | ... | Attribute 1 | Attribute 2 | Attribute 3 | ... | |

INFORMATION PROCESSING SYSTEM, INFORMATION PROCESSING DEVICE, SERVER DEVICE, PROGRAM, AND METHOD TO IDENTIFY A POSITION IN A FIGURE

TECHNICAL FIELD

Technologies disclosed in this application relate to an information processing system, an information processing device, a server device, a program, or a method.

BACKGROUND ART

With the advanced information society in recent years, necessity to utilize the information captured by an imaging device effectively is increasing.

PRIOR ART DOCUMENT

Patent Document

[Patent Document 1] JP2015-230580
[Patent Document 2] JP2005-286685

SUMMARY OF INVENTION

Problems to be Solved by the Invention

However, the above-mentioned literature is not a system that can effectively utilize the information captured by the imaging device. Therefore, various embodiments of the present invention provide an information processing system, an information processing device, a server device, a program, or a method in order to solve the above problems.

Means for Solving Problems

The first method of the embodiment according to the present invention is
A method to identify a position in a figure corresponding to a position in an image comprises: a storing step to store, by a computer, a plurality of the first positions in the image captured by an imaging device and a plurality of the second positions corresponding to the plurality of the first positions in the figure corresponding to the image as a relationship, an acquiring step to acquire, by a computer, the third position involving a target in the image,
a generation step to generate, by a computer, a fourth position in the figure corresponding to the third position, using a positional relationship between a part of the plurality of the first positions and the third position and a part or all of the relationship.

The second method of the embodiment according to the present invention is
the method according to the first method,
wherein a part of the plurality of the first positions is three first positions closest to the third position among the plurality of the first positions.

The third method of the embodiment according to the present invention is
the method according to the first or second methods,
wherein the generation step to generate the fourth position includes a step to use a side of an triangle comprising from the three first positions.

The fourth method of the embodiment according to the present invention is
the method according to any of the first to third methods,
wherein the generation step to generate the fourth position includes a step to use each perpendicular lines from the third position to sides or extension lines thereof involving the triangular.

The fifth method of the embodiment according to the present invention is
the method according to any of the first to fourth methods,
wherein the generation step to generate the fourth position includes a step to use each intersections of the each perpendicular lines corresponding to each sides of the triangle or the extension lines thereof.

The sixth method of the embodiment according to the present invention is
the method according to any of the first to fifth methods,
the method includes an obtaining step to obtain, by a computer, one of the second positions after obtaining one of the first positions.

The seventh method of the embodiment according to the present invention is
the method according to any of the first to sixth methods,
the method includes a step to display, by a display device displaying the figure, the first position after obtaining the one of the first positions and before obtaining the one of the second positions by a computer.

The eighth method of the embodiment according to the present invention is
the method according to any of the first to seventh methods,
the method includes a step to continue to display, by a displaying device displaying the figure, the first positions obtained by a computer until finishing the obtaining of the plurality of the first positions.

The ninth method of the embodiment according to the present invention is
the method according to any of the first to eighth methods,
the method includes a step to obtain, by a computer, one of the first positions after obtaining one of the second positions.

The tenth method of the embodiment according to the present invention is
the method according to any of the first to ninth methods,
the method includes a step to display, by a display device displaying the figure, the second position after obtaining one of the second positions and before obtaining one of the first positions by a computer.

The eleventh method of the embodiment according to the present invention is
the method according to any of the first to tenth methods,
the method includes a step to continue to display, by a display device displaying the figure, the second positions obtained by a computer until finishing the obtaining of the plurality of the second positions.

The twelfth system of the embodiment according to the present invention is
a system comprising of
a storing unit to store a plurality of the first positions in the image captured by an imaging device and a plurality of the second positions corresponding to the plurality of the first positions in a figure corresponding to the figure as a relationship,
an acquiring unit to acquire the third position involving a target in the figure, and
a generation unit to generate a fourth position in the figure corresponding to the third position, using a positional relationship between a part of the plurality of the first positions and the third position and a part or all of the relationship.

The thirteenth system of the embodiment according to the present invention is
the system according to the twelfth system,
wherein a part of the plurality of the first positions is three first positions closest to the third position among the plurality of the first positions.

The fourteenth system of the embodiment according to the present invention is
the system according to the twelfth or thirteenth systems,
wherein the generation unit to generate the fourth position uses a side of an triangle comprising from the three first positions.

The fifteenth system of the embodiment according to the present invention is
the system according to any of the twelfth to fourteenth systems,
wherein the generation unit to generate the fourth position uses each perpendicular lines from the third position to sides or extension lines thereof involving the triangular.

The sixteenth system of the embodiment according to the present invention is,
the system according to any of the twelfth to fifteenth systems,
wherein the generation unit to generate the fourth position uses each intersections of the each perpendicular lines corresponding to each sides of the triangle or the extension lines thereof.

The seventeenth system of the embodiment according to the present invention is,
the system according to any of the twelfth to sixteenth systems,
the system includes an obtaining unit to obtain the first positions and the second positions,
wherein the obtaining unit obtains one of the second positions after obtaining one of the first positions.

The eighteenth system of the one embodiment according to the present invention is
the system according to any of the twelfth to seventeenth systems,
the system includes an obtaining unit to obtain the first positions and the second positions,
wherein the obtaining unit obtains one of the first positions after obtaining one of the second positions.

The nineteenth program of the embodiment according to the present invention is
a program operating a computer by a method according to any of the first to eleventh methods.

Effect of the Invention

According to one embodiment of the present invention, information captured by an imaging device can be appropriately processed and provided.

SIMPLE EXPLANATION OF DRAWINGS

FIG. 1 is a block diagram showing a configuration example of an information processing device according to one embodiment.
FIG. 2 is an example of an image targeted by the system according to one embodiment.
FIG. 3 is an example of a function of the system according to one embodiment.
FIG. 4 is an example of available data for a system according to one embodiment.
FIG. 5 is an example showing the relationship between actual and reference images available for a system according to one embodiment.
FIG. 6 is an example of available data for a system according to one embodiment.
FIG. 7 is an example showing the relationship between actual and reference images available for a system according to one embodiment.
FIG. 8 is an example of available data for a system according to one embodiment.
FIG. 9 is an example of a screen displayable by a system according to one example.
FIG. 10 is an example of a screen displayable by a system according to one example.
FIG. 11 is an example of a screen displayable by a system according to one example.
FIG. 12 is an example of a screen displayable by a system according to one example.
FIG. 13 is an example of a flowchart achievable by a system according to one example.
FIG. 14 is an example of a screen displayable by a system according to one example.
FIG. 15 is an example of a screen displayable by a system according to one example.
FIG. 16 is an example of a flowchart achievable by a system according to one example.
FIG. 17 is an example of a flowchart achievable by a system according to one example.
FIG. 18 is an example of a flowchart achievable by a system according to one example.
FIG. 19 is an example of a classification of information available for a system according to one example.
FIG. 20 is an example of an available dada for a system according to one example.
FIG. 21 is an example of an available rule for a system according to one example.
FIG. 22 is an example of an available dada for a system according to one example.
FIG. 23 is an example of a situation available for a system according to one example.
FIG. 24 is an example of a configuration for a system according to one example.
FIG. 25 is an example of an available dada for a system according to one example.
FIG. 26 is an example of a flowchart achievable by a system according to one example.
FIG. 27 is an example of a flowchart achievable by a system according to one example.
FIG. 28 is an example of a flowchart achievable by a system according to one example.
FIG. 29 is an example of an available dada for a system according to one example.
FIG. 30 is an example of an available dada for a system according to one example.
FIG. 31 is an example of an area of a reference image available for a system according to one example.
FIG. 32 is an example of an available dada for a system according to one example.
FIG. 33 is an example of an available dada for a system according to one example.
FIG. 34 is an example of a screen displayable by a system according to one example.
FIG. 35 is an example of an available dada for a system according to one example.
FIG. 36 is an example of an available dada for a system according to one example.

FIG. 37 is an example of an available dada for a system according to one example.

FIG. 38 is an example of an available dada for a system according to one example.

FIG. 43 is an example of an available dada for a system according to one example.

FIG. 48 is an example of an available dada for a system according to one example.

FIG. 51 is an example of a screen displayable by a system according to one example.

FIG. 52 is an example of an available dada for a system according to one example.

FIG. 53 is an example of a screen displayable by a system according to one example.

FIG. 54 is an example of a screen displayable by a system according to one example.

FIG. 57 is an example of an available dada for a system according to one example.

FIG. 60 is an example of an available dada for a system according to one example.

FIG. 61 is an example of an available dada for a system according to one example.

FIG. 65 is an example of a data structure of a system according to one embodiment.

FIG. 66 is an example of a data structure of a system according to one embodiment.

FIG. 67 is an example of a data structure of a system according to one embodiment.

FIGS. 68(a) and 68(b) are an example of a data structure of a system according to one embodiment.

FIG. 69 is an example of a data structure of a system according to one embodiment.

FIG. 70 is an example of a data structure of a system according to one embodiment.

1. EACH CONFIGURATION OF THE INFORMATION PROCESSING DEVICE 10

Figure 1:
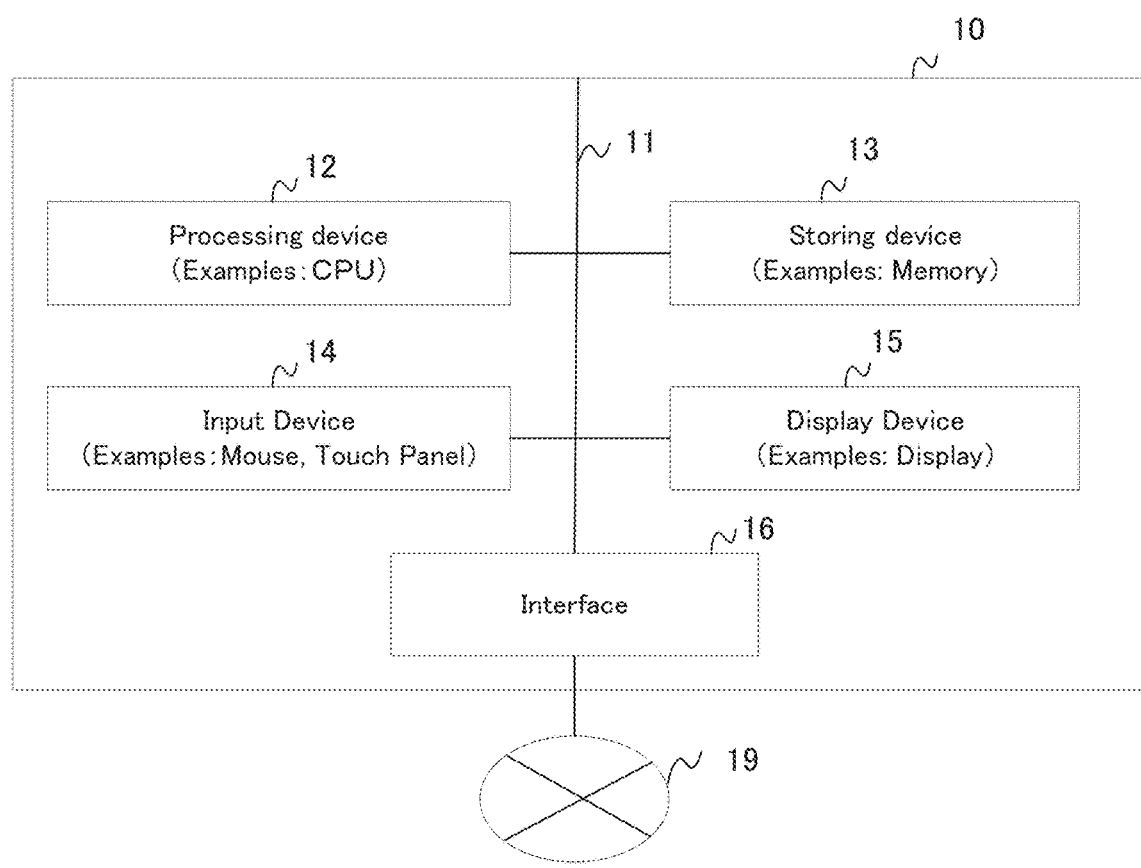

The system of this embodiment may have a configuration as shown in FIG. 1, for example. The system of this embodiment is comprising of an information processing device 10. As an example of a configuration of the information processing device 10, for example, as shown in FIG. 1, the configuration may include a bus 11, an arithmetic device 12, a storage device 13, an input device 14, a display device 15, and a communication IF 16. Further, the information processing device 10 may be configured to be directly or indirectly connected to the network 19.

The bus 11 has a function of transmitting information between the arithmetic unit 12, the storage device 13, the input device 14, the display device 15, and the communication IF 16.

The arithmetic unit 12 is a device capable of executing a program instruction. For example, it is a processor. This may be a CPU or an MPU. It may also have a graphics processing unit, a digital signal processor, and the like.

The storage device 13 is a device that stores information. The memory may be a temporary memory or a long-term memory. The storage device 13 may be an internal memory, an external memory, or both. Further, the storage device 13 may be a magnetic disk (hard disk), an optical disk, a magnetic tape, a semiconductor memory, or the like. Further, although not shown, the storage device 13 may be a storage device via a network or a storage device on the cloud via a network.

The registers, L1 cache, L2 cache, etc. that store information at a position close to the arithmetic unit may be included in the arithmetic unit 12 in the block diagram of FIG. 1, but the storage device may include these as the device storing the information in the design of the computer architecture. In short, the arithmetic unit 12, the storage device 13, and the bus 11 may be configured to cooperate with each other to execute information processing.

The storage device 13 can be provided with a program for executing the technique related to the present invention, and can appropriately record data necessary for the present invention. For example, it may stores a learning data necessary for machine learning described later when it acquires, it may store a program to execute a machine learning, and it may store a necessary information for an attribute information generation function that is generated by learning after executing machine learning. The storage device 13 may also include a database. Further, the storage device 13 may be a short-term storage device or a long-term storage device. Examples of the short-term storage device include a cache, and examples of the long-term storage device include an HDD.

Also, the above is described as an example in a case where the above arithmetic unit 12 is executed based on a program provided in a storage device 13. However, the information processing related to the system of the present application can be realized by a programmable logic device capable of changing the hardware circuit itself or a dedicated circuit in which the information processing to be executed is determined as one of the format combined by the above bus 11, the arithmetic unit 12 and the storage device 13. When realized by a programmable logic device or a dedicated circuit, there is an advantage that the system of the present application can be processed at a higher speed. Further, the arithmetic unit 12 may be configured so that parallel calculation can be performed. For example, when the arithmetic unit 12 performs machine learning, machine learning may be realized for a plurality of learning data simultaneously.

The input device 14 inputs information. Examples of the input device 14 include an input device such as a keyboard, a mouse, a touch panel, or a pen-type instruction device. The input device 14 may have other functions so that the touch panel has a display function.

The display device 15 has a function of displaying information. For example, a liquid crystal display, a plasma display, an organic EL display, and the like can be mentioned, but in short, any device capable of displaying information may be used. Further, the input device 14 may be partially provided like a touch panel.

The network 19 has a function of transmitting information together with the communication IF 16. For example, it has a function of transmitting the information possessed by the information processing device 10 to another information processing device via the network 19. The communication IF 16 may have any connection form. For example, USB, IEEE1394, Ethernet (registered trademark), PCI, SCSI and the like may be used. The network 19 may be either wired or wireless, and in the case of wired network 19, an optical fiber, a coaxial cable, or the like may be used.

The information processing device 10 may be a dedicated information processing device for a part or all of the techniques described in the documents of the present application, or an information processing device capable of executing a technique other than the techniques described in the documents of the present application. The information processing device 10 may be a server, a workstation, a desktop computer, a laptop computer, a laptop computer, a PDA, a mobile phone, a smartphone, or the like.

Although the information processing device 10 has been described as one information processing device 10 in FIG. 1, the information processing device 10 may be comprised of a plurality of information processing devices. The plurality of information processing devices may be internally connected or may be externally connected via a network. Further, when the information processing device 10 is comprised of a plurality of information processing devices, even if the owners or managers of the information processing devices 10 are different, information processing can be performed due to access rights when executing the technique described in this process. Further, the information processing device 10 may be a physical existence or a virtual one. For example, the information processing device 10 may be virtually realized by using cloud computing. Further, FIG. 1 describes the basic configuration of the system of the present embodiment, but in the case of connecting with other information processing devices, the system may not have the input device 14 and the display device 15.

2. EXPLANATION OF TERMS

In the application documents, the "real image" refers to an image taken by an imaging device. The real image may be a moving image or a still image. The real image may be a background with or without an object, which will be described later. Also the real image may be one still image of the moving image, or one of a moving image being played. The camera may be provided at various positions. The moving image may be captured at various angles from various positions where the camera is installed. For example, the moving image may be a moving image captured by a camera installed at a position capable of capturing a downward image at an angle such as 30 degrees, 45 degrees, 50 degrees, 55 degrees, or 60 degrees with respect to the ground, or may be directed upward. A camera can be installed in a position directly above the ground and can capture an image directly underneath, or capture an image directly beside the ground and there is no limitation on the direction in which the image is taken.

Here, the real image may contain those serving as a reference in the video, but does not need to include those as a reference. For example, the real image or the moving image that is the source thereof need not be a moving image that is captured after a reference object is installed so as to include the reference object in the field of view. Therefore, the burden on the user to install a reference object before the image is taken by the camera is reduced. Further, since it is not necessary to install a reference object, there is an advantage that the past moving image captured without including the reference object can be utilized.

Moreover, the real image may be those that include various objects in the video in accordance with the various purposes of the following, or may be those that does not include them. For example, in generating the relationship between the real image and the reference image described later for the purpose of identifying the movement of a person or counting the number of people, the real image may include a person or may not include it. When the system of the present embodiment uses a real image including a person, there is an advantage that the burden is reduced in that it is not necessary to prepare a moving image that does not include a person in advance.

Figure 2:
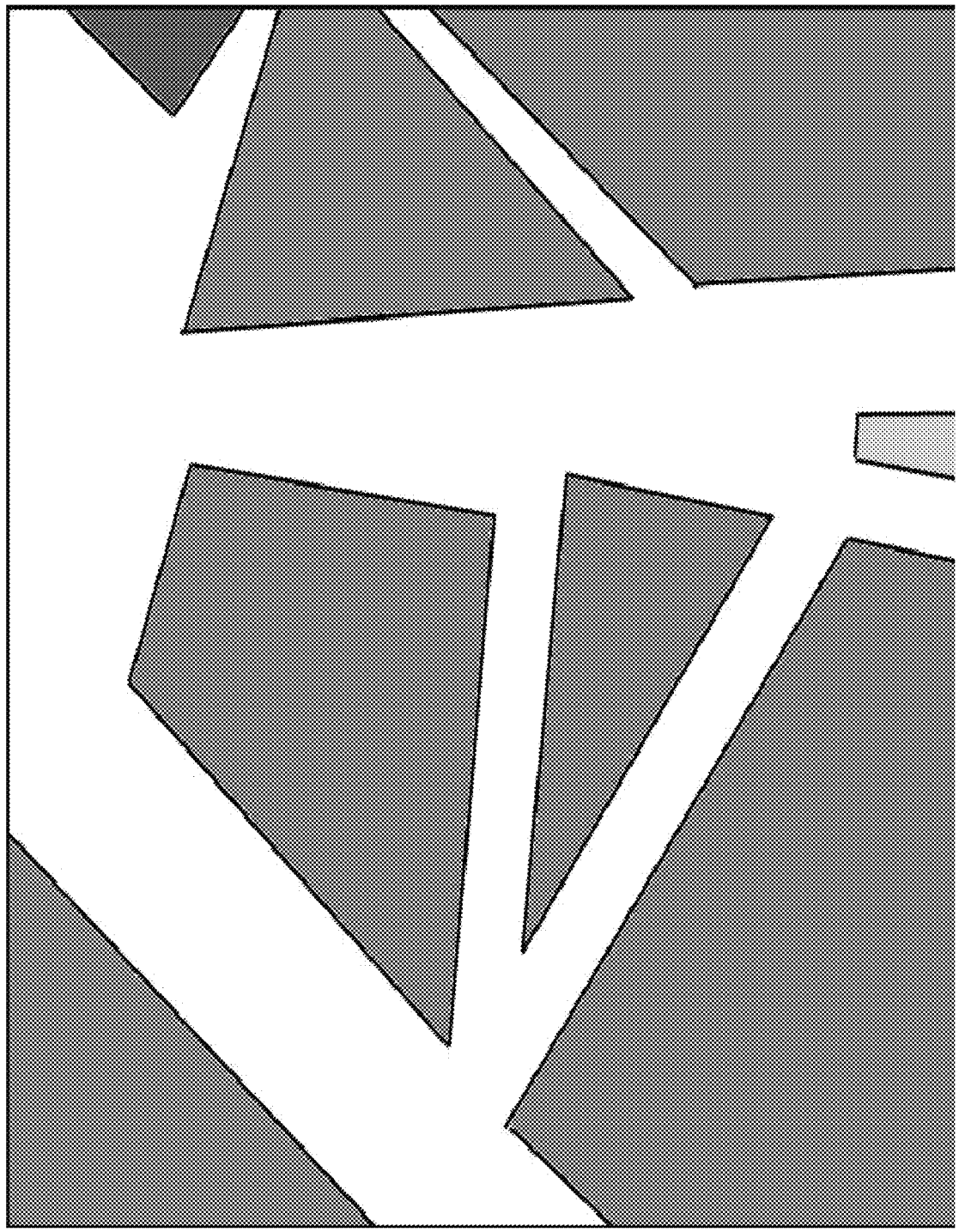

FIG. 2 is an illustrated example of a real image of one still picture video, and shows a valley of buildings and a park. A real image used by a system of one embodiment may be a single screen captured by such an imaging device.

The "reference image" indicates an object captured by a moving image. The object indicated by the reference image may be consistent with that shown in the real image, or may be a part of the real image. For example, one reference image and one real image may match, a combination of a plurality of reference images may match one real image, or a combination of a plurality of reference images may match a part of a real image. Further, a part of the reference image may match the one shown in the real image. For example, one reference image may match a combination of a plurality of real images. Further, examples of a reference image are maps or drawings, and they may be accurate maps or drawings and they may not be inaccurate maps or drawings. A reference image may be a map or a drawing which have different scales from the real image, may be a freehand map or drawing, may be a partially exaggerated map or drawing, or may be a map or drawing with a distorted part. If the moving image is the one captured by an imaging device installed in a part of the store or an aisle or the like, the reference image may be a drawing of the store or facility. Further, for the moving image captured by the imaging device installed outside the building or on the road, the reference image may be a map around the building, a road map, or the like.

3. AN EXAMPLE OF SYSTEM FUNCTIONS

Figure 3:
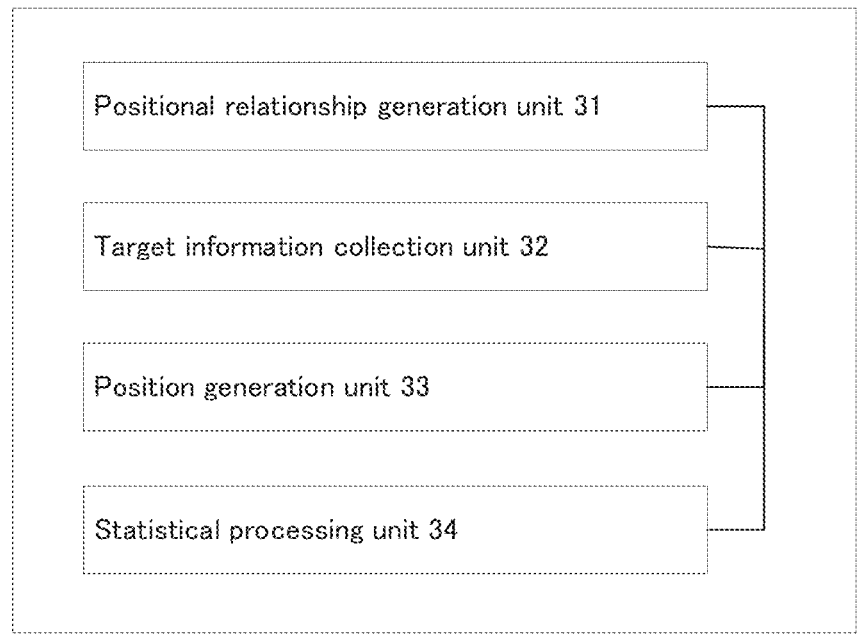

An example system may have some or all of some of the functions described below. Here, the functions of the system will be described collectively, but the invention included in the document of the present application does not have to always use all of these functions, and even if some of the functions are provided, such invention has a technical significance provided with such some of the functions. Hereinafter, the positional relationship generation unit 31, the target information collection unit 32, the position generation unit 33, and the statistical processing unit 34, which are shown in FIG. 3, will be described in order.

3.1. Positional Relationship Generator 31

The positional relationship generation unit has a function of generating the positional relationship between a real image and a reference image corresponding to the real image.

By using the positional relationship generation unit, the user can generate the relationship between the real image and the reference image as follows. Firstly, the user touches and specifies a location of A1 in the real image, and touches and specifies the point At1 in the reference image corresponding to the A1 in the real image. Similarly, the user touches and specifies a location of A2 in the real image, and touches and specifies the point At2 in the reference image corresponding to the A1 in the real image. In this way, the location corresponding to the designation of the location in the real image is specified in the reference image. The positional relationship generation unit acquires and stores each positional information for these designations. For example, the coordinate information of (Ax1, Ay1) corresponding to the location of A1 is acquired, and the coordinate information of (Atx1, Aty1) is acquired corresponding to the location of At1. Similarly, the coordinate information of (Ax2, Ay2) is acquired for the location of A2, and the coordinate information of (Atx2, Aty2) is acquired for the location of At2. Here, for example, if it acquires N points of the coordinate information, positional relation generation unit acquires positional information from At1 to AtN respectively corresponding to from A1 to AN in the real image. FIG. 4 is an example of data in which the positional relation between the real image and the reference image are stored for the coordinate information as the positional information.

The input function of the information processing apparatus may be used to specify the above-mentioned position. The input function may be a touch panel, a pen-shaped pointer, or a mouse. The input function and the display function may be included in the same device.

Further, as described above, a relationship between a real image and a reference image may be not only one-to-one, but may be many-to-one, one-to-many, or many-to-many. Here, many means plural. A case where a number of reference images is set smaller than a number of real image is a case where a single reference map corresponds to a place captured by a plurality of imaging devices. More specifically, it may be a map showing a one store with respect to the one store inside captured by a plurality of cameras. At this time, since it is not necessary to prepare a reference image for each imaging device, there is an advantage that the burden of inputting the positional relationship generation by the user is reduced.

Figure 5:
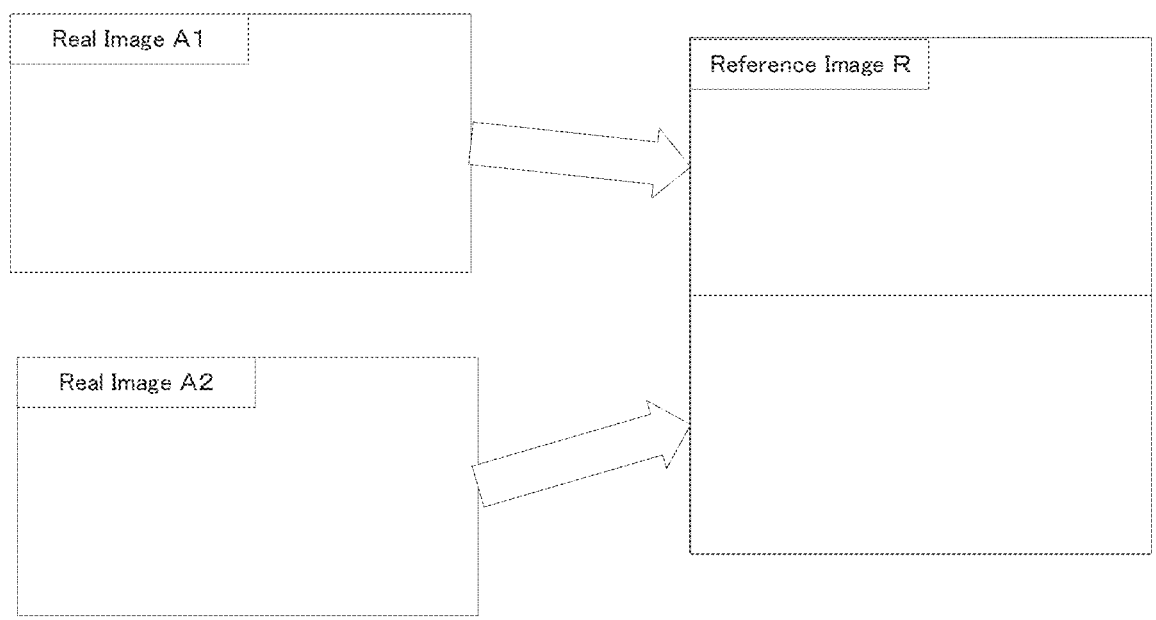

For example, there may be one reference image R for each real image A1 and A2 captured by a plurality of imaging devices C1, C2. In this case, the positional relationship generation unit generates positional relationship information for a part of the position of the reference image R with respect to the position in the moving image A1 by the imaging device C1, and generates positional relationship information for a part of the position of the reference image R with respect to the position in the moving image A2 by the imaging device C2. FIG. 5 is a diagram schematically showing the correspondence of the position information between the real images A1, A2 and the reference image R, and FIG. 6 is an example of the data generated by the position relationship generation unit. The real image A1 is located above in the reference image R, and the real image A2 is located below in the reference image R. The relationship between the position information in the real image A1 and the position information in the reference image R, and the relationship between the position information in the real image A2 and the position information in the reference image R is stored in the data.

For example, with respect to commercial facilities such as department stores and station buildings in which a plurality of imaging devices are installed, for each floor, existence of one reference image can be given. When the reference image has a corresponding portion for all the parts of the field of view of the plurality of imaging devices, there is an advantage that the positions of all the parts of the moving image captured by the imaging device can be related in the reference image. However, the reference image does not necessarily have a corresponding portion for all parts of the field of view of the imaging devices.

Figure 7:
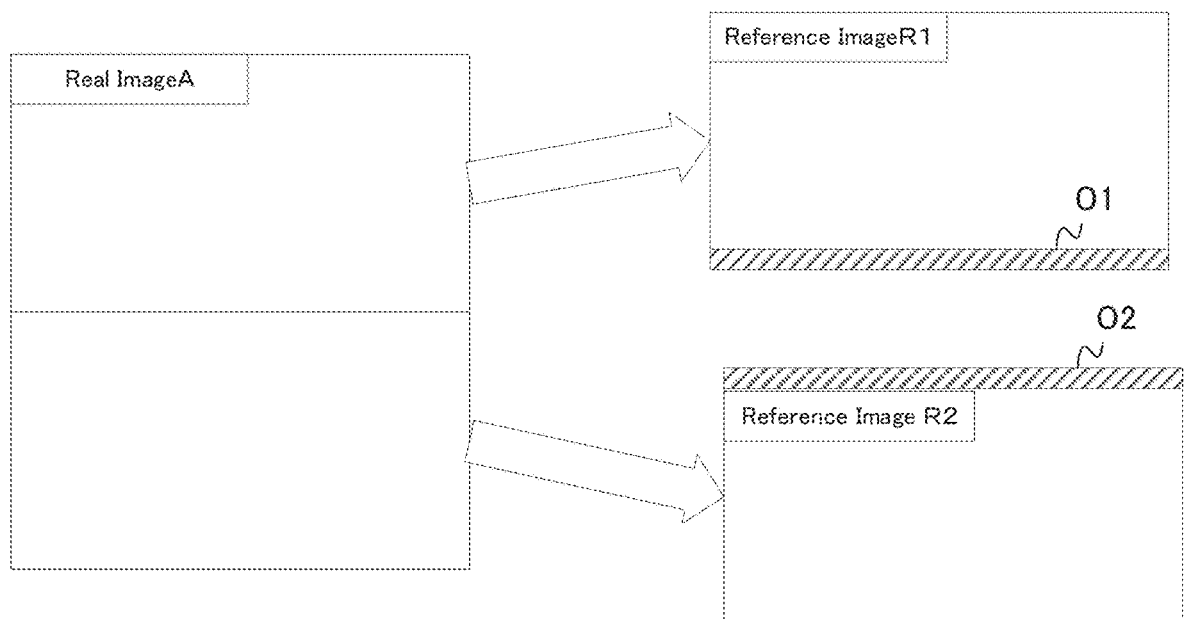

On the other hand, there may be a plurality of reference images R1 and R2 for the imaging device C. For example, with respect to distant imaging objects being captured by a high precision of the imaging device, which are hardly grasped in the eyes of human, a plurality of a reference image may be associated as reference image corresponding to the one real image. For example, there is a case where the area in the field of view by one high-precision camera installed in a high-rise building is associated with a plurality of reference images. In this case, there is an advantage to identify a positional relation for a reference image with a fineness level understandable for a user with respect to a plural areas in a field of view. In this case, the positional relationship generation unit generates positional relationship information for the reference image R1 with respect to a part of the position in the moving image by the imaging device C, and the positional relationship generation unit generates positional relationship information for the reference image R2 with respect to a part of the position in the moving image by the imaging device C. FIG. 7 is a diagram schematically showing the correspondence relationship of the positional information between the real image A and the reference images R1 and R2, and FIG. 8 is an example of the data generated by the position relationship generation unit. The upper part of the real image A is located in the reference image R1, and the lower part of the real image A is located in the reference image R. The relationship between the positional information in the upper of the real image A and the positional information in the reference image R1, the relationship between the positional information in the below of the real image A and the positional information in the reference image R2, are stored in the data.

For example, when one imaging device includes both the entrances and exits of two stores in the field of view, there may be a case where there are reference images of these two stores. When any one of the plurality of reference images has a corresponding portion for all the parts of the field of view of the imaging device, there is an advantage that the positions of all the parts of the moving image captured by the imaging device can be related in the reference image. However, the reference image does not necessarily have a corresponding portion for all parts of the field of view of the imaging device.

Further, the reference image R1 and the reference image R2 may be set to have overlapping portions with each other. When they have overlapping parts with each other, it is possible to provide a plurality of points described later for generating a positional relationship in the overlapping parts, and there is an advantage to enable to propagate the positional relationship information from one reference image to another reference image.

In addition, the imaging device may move. For example, the imaging device may change the field of view in order to obtain a wide field of view. In this case, based on the associated data of the position information in the real image in a specific field, the information in the direction of the field of view of the imaging device, and the position information in the reference image, it may be possible to convert a position information in the real image of a specific field of view to a position information in the reference image. The information on the direction of the visual field may be the angle of movement or the time associated with the movement, and the like.

Further, the imaging device may be a panoramic imaging device, an imaging device having a 180-degree field of view, or an imaging device having a 360-degree field of view. Even in such a case, similarly, the position information in the real image captured by these imaging devices may be associated with the position information of the reference image corresponding to the imaging device.

Here, the positional relationship generation unit may acquire position information from At1 to AtN after acquiring from A1 to AN, or it may acquire interchangeably position information of real image and position information of reference image such as it acquires position information A1 and position information At1 and then position information A2 and position information At2. In short, the positional relationship generation unit acquires one or a plurality of predetermined number of position information in the real image, and then acquires predetermined number of position information in the reference image corresponding to position information in the real image, and stores them.

Further, the positional relationship generation unit may acquire the position information of A1 to AN after acquiring the position information of At1 to AtN, or it may acquire interchangeably position information of reference image and position information of real image such as it acquires position information At1 and acquire the position information A1, and then acquires the position information At2, and acquires position information A2. In short, the positional relationship generation unit acquires one or a plurality of predetermined number of position information in the reference image, and then acquires predetermined number of position information in the real image corresponding to position information in the reference image, and stores them.

Figure 9:
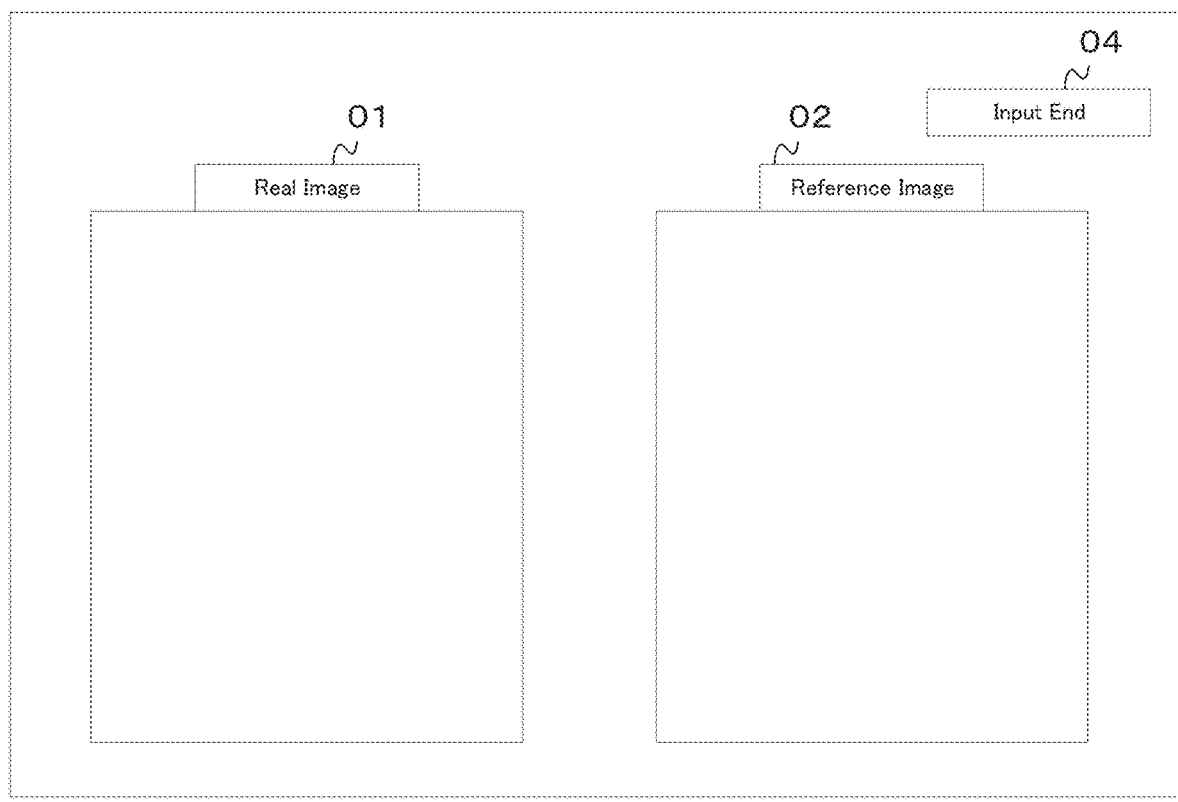

Further, the configuration of the input screen to obtain position information by the positional relationship generation unit can be any kinds of one. For example, FIG. 9 shows an example in which the real image and the reference image are displayed on the same screen. Since the real image and the reference image are displayed on the same screen, the user has an advantage that the location in the reference image can be specified while comparing the real image and the reference image.

Further, the positional relationship generation unit clearly indicates whether to acquire the position information in the real image or the position information in the reference image, if it interchangeably acquires a position information of reference image and a position information of real images as it acquires a position information A1 and acquires a position information At1 and then it acquires a position information A2 and acquires a position information At2. For example, the current reception status may be shown. Information on which information to acquire may be displayed by various information. For example, the side of the real image or the reference image that receives the input may be displayed in a different manner, or the side that is not input in the alternate input may be in a situation where the input is not performed. In this case, the user has an advantage that user can understand whether the real image or the reference image should be inputted next. Note that when the position information in the corresponding real image is acquired after the position information in the reference image is acquired, the above-mentioned reference image and the real image may be reversed.

Further, after designating the location in the real image, the positional relationship generation unit may display the designated location in the real image. The display has the advantage that the user can confirm that the system has memorized the specified location in the real image. When the position information in the corresponding real image is acquired after the position information in the reference image is acquired, the above-mentioned reference image and the real image may be reversed.

Further, the positional relationship generation unit may display the location specified in the real image for a period of time for accepting the input of the positional information in the reference image. The display of the period has an advantage that the user can specify the location in the reference image while comparing it with the location specified in the real image. When the position information in the corresponding real image is acquired after the position information in the reference image is acquired, the above-mentioned reference image and the real image may be reversed.

Further, the positional relationship generation unit may display the specified position information in the real image during the period for accepting the designation of a position information in the real image. By being displayed during this period, the user recognizes the location already specified and can specify the different location from the specified location, and does not have to specify again the position too close to the previously specified position again and it is possible to reduce the burden of excessive designation by the user. When the position information in the corresponding real image is acquired after the position information in the reference image is acquired, the above-mentioned reference image and the real image may be reversed.

Figure 10:
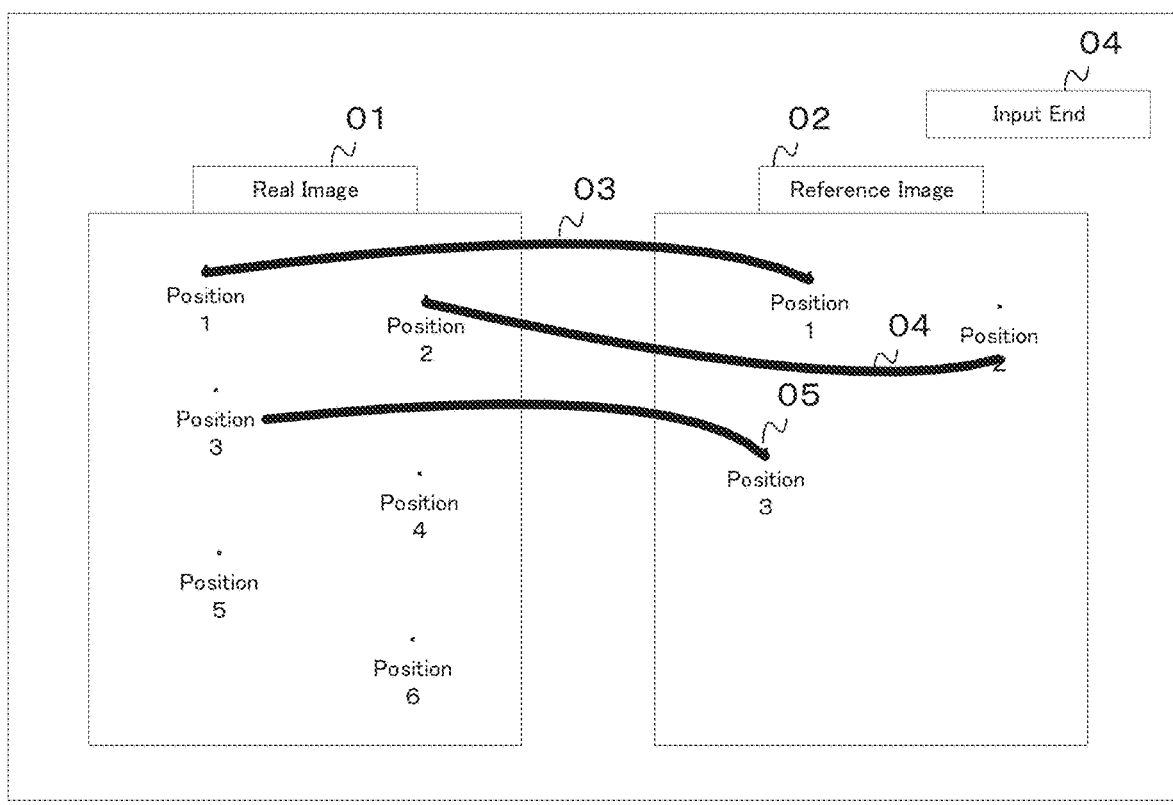

In addition, the positional relationship generation unit may display the one to understand the combination in an easy-to-understand manner of the position specified in the real image and the position specified in the reference image. For example, as shown in FIG. 10, the connected line between the position specified in the real image and the position specified in the associated reference image, or a figure including both positions can be displayed. The lines may be a straight line or a curved line. The figure may be elliptical or polygonal.

Further, in case where the position information in the real image are acquired continuously and then the position information are acquired continuously, such as after acquiring the position information of A1 to AN, acquiring the position information of At1 to AtN, it is advantages to move the range to input shortly because the user may input only the real image or the reference image compared to the manner where the alternatively inputted the position in the reference image apart from the real image. When the position information in the corresponding real image is acquired after the position information in the reference image is acquired, the above-mentioned reference image and the real image may be reversed.

Further, in case where the position information in the real image are acquired continuously and then the position information are acquired continuously, such as after acquiring the position information of A1 to AN, acquiring the position information of At1 to AtN, the positional relationship generation unit may display the position information in the real image corresponding to the position information for accepting an input in the reference image. When the position information in the corresponding real image is acquired after the position information in the reference image is acquired, the above-mentioned reference image and the real image may be reversed.

Figure 11:
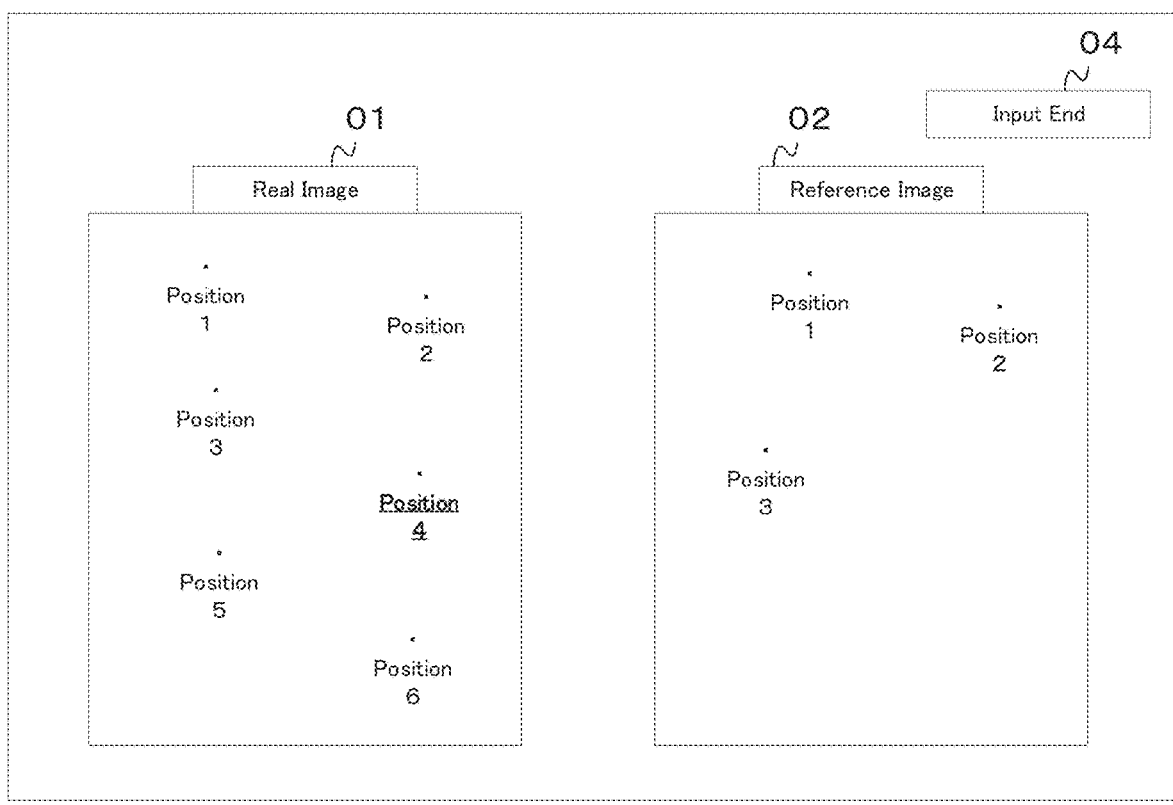

For example, FIG. 11 shows the time points when positions 1 to 6 are inputted in the real image and then positions 1 to 3 are inputted in the reference image. Since what is inputted next is the position in the reference image corresponding to the position 4 in the real image, this is an example in which the position 4 in the real image is displayed. In this way, the positional relationship generator is configured to be able to display the position information in the real image corresponding to the position information that accepts the input in the reference image, so that the user can understand and input the position to be intended in the reference image corresponds to which position information in the real image. When the position information in the corresponding real image is acquired after the position information in the reference image is acquired, the above-mentioned reference image and the real image may be reversed.

Further, when displaying the position information in the real image corresponding to the position information that accepts the input in the reference image, the position 4 in the real image may be displayed in a different manner from the other positions in the real image. The different manners may be various, but for example, the font, style, underline, color, size, character decoration, arrangement, etc. may be different with respect to the format of the numerical value or the character. Also, the fields and backgrounds related to the numerical value or the attribute information may have different fillings, patterns, and the like. When displaying the position information in the real image corresponding to the position information that accepts an input in the reference image in this way, if it is displayed in a mode different from other position information, there is an advantage that it is possible to understand for a user the part to be inputted corresponds to which position information in the real image without being confused with other position information in the real image. When the position information in the corresponding real image is acquired after the position information in the reference image is acquired, the above-mentioned reference image and the real image may be reversed.

Figure 12:

Further, FIG. 12 is an example in which the real image and the reference image are displayed in an overlapping manner. Tab 01 and tab 02 are installed, and one selected by the user with an instruction device or the like or one selected by the positional relationship unit is displayed on the screen 03. When the reference image 02 is displayed on the screen 03, there is an advantage that the space of the display screen can be reduced. Further, the input end button (04) is also displayed, and the input can be completed by inputting to the button.

Figure 13:
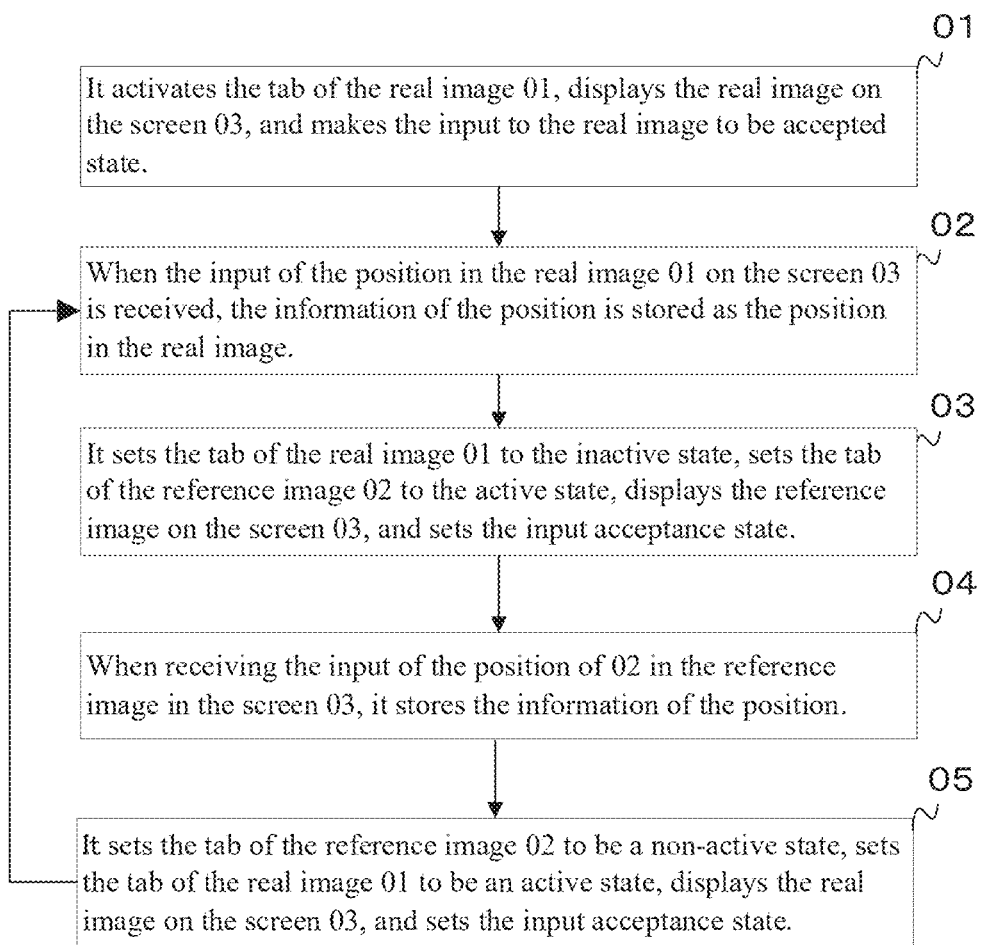

An example of the display using FIG. 12 will be described using the flow of FIG. 13. First, the positional relationship generation unit activates the tab of the real image 01, displays the real image on the screen 03, and makes the input to the real image to be accepted state (step 01).

Next, when the input of the position in the real image 01 on the screen 03 is received, the information of the position is stored as the position in the real image (step 02).

Next, the positional relationship generation unit sets the tab of the real image 01 to the inactive state, sets the tab of the reference image 02 to the active state, displays the reference image on the screen 03, and sets the input acceptance state (step 03).

Next, when the positional relationship generation unit receives the input of the position of 02 in the reference image in the screen 03, the positional relationship generation unit stores the information of the position as the position in the reference image corresponding to the position in the real image (step 04).

Next, positional relation generation unit sets the tab of the reference image 02 to be a non-active state, sets the tab of the real image 01 to be an active state, displays the real image on the screen 03, and sets the input acceptance state (step 05). After this, the process returns to step 02. When the end of input is detected, the input may be terminated.

In the above description, the configuration of accepting the input of the reference image as the position corresponding to the input of the position in the real image after receiving the input of the position in the real image has been described, but the reverse configuration may be used.

That is, after accepting the input of the position in the reference image, the input of the real image may be accepted as the position corresponding to the input of the position in the reference image. In this case, the positional relationship generation unit may first acquire the position information in the reference image, and then store the position information in the real image to be acquired in association with the position acquired in the reference image.

Further, the above-mentioned tab is an example, and other modes may be used as long as it is information that makes it clear whether the target input by the user is a real image or a reference image. For example, an icon indicating a reference image and/or a real image may be installed to indicate whether the reference image or the real image is currently displayed, or it may be displayed from the screen 03 itself so that it can be determined whether the reference image is being input or the real image is being input.

On the other hand, if only one of the real image and the reference image is displayed, the user may forget the information that is not displayed. For example, when a reference image is specified after specifying a location in the real image, it may be forgotten which location in the real image is specifically specified. Therefore, the transparency of either the real image or the reference image may be changed and displayed.

Further, the coordinates corresponding to the location specified by the user may be other means other than the coordinates as long as the information specifies the position in the real image or the reference image. For example, the real image or the reference image may be divided into a plurality of areas in advance, and the position in the real image or the reference image may be specified by the information for identifying one of the divided areas.

In the above description, it is configured that it acquires the position information of the reference image after acquiring the position information of the real image, similarly, it may be configure that it may acquire the position information of the real image after acquiring the position information of the reference image.

Conventionally, when the information in the image of the moving image or the still image obtained by the imaging device is related to the map corresponding to the image, preparation is required in advance. For example, it was necessary to set a reference point in the moving image and relate the reference point to the position on the map. In this case, there is a problem that there is a burden of an associative work and that the ones imaged in the past cannot be used. By simply specifying the corresponding positions of the moving image and the reference image described above, the correspondence between the position in the moving image and the position in the reference image can be memorized, and the position in the reference image can be inferred from the position information in the moving image as described later, this technology has an advantage that the position in the reference image corresponding to the position in the moving image can be generated with a small burden.

<Recommended Display>

Further, the positional relationship generation unit may have a function of displaying an area where input is recommended. The accuracy of the positional relationship between the real image and the reference image obtained from the imaging device is determined by the number of inputs and their specific positions. Therefore, when the system of the present embodiment displays an area where input is recommended, the user has an advantage that he/she can input while ensuring accuracy to some extent.

The area where input is recommended may have a certain area or may be a line. Areas where input is recommended may be displayed in the real image.

Areas where input is recommended may be specified in various ways. For example, the areas where input is recommended may be specified based on a figure using a predetermined length. The figure may be specified as a round figure such as a circle or an ellipse, a polygon such as a triangle or a quadrangle, or a region other than a specific circle or polygon. If it is a round figure, it may be a circle with the predetermined length of a radius, or an ellipse having a predetermined length of a major axis and the minor axis.

Areas where input is recommended may be calculated and displayed by various calculations. For example, a circle C1 having a predetermined radius may be drawn around a designated position in the real image A, and the other areas may be designated as areas for which input is recommended. In this case, around the next designated location in the real image A, a predetermined radius of the circle C2 is drawn similarly, and the difference areas subtracted from the real image A the common areas of the figure C1 and C2 may be the recommended area for input. Further, based on the position information newly inputted in the real image, the area where the input is recommended to be displayed decreases. Further, the radius of this circle may be, for example, a length determined with reference to the side of the real image A. For example, it may be a value calculated as one-third of the side. Here, the side may be the long side or the short side of the real image A.

Further, a quadrangle R1 in which the distance between the center of gravity and the apex is a predetermined length is drawn with the position specified in the real image A as the center, and the other areas other than that is the areas where input is recommended. In this case, around the next designated location in the real image A as a center, a quadrangle R2 is drawn in which the distance between the center of gravity and the apex is a predetermined length similarly, and the difference areas subtracted from the real image A the common areas of the figures R1 and R2 may be the recommended area for input. Further, based on the position information newly inputted in the real image, the area where the input is recommended to be displayed decreases. Further, the predetermined length between the center of gravity and the apex may be, for example, a length determined with reference to the side of the real image A. For example, it may be a value calculated as one-third of the side. Here, the side may be the long side or the short side of the real image A.

Further, the positional relationship generation unit may indicate the above-mentioned circular or polygonal line as a preferable region. In this case, there is an advantage that the user can more specifically understand which part the location information should be inputted to.

Further, the positional relationship generation unit may indicate the inner side of the above-mentioned circle or polygon as a region where the accuracy becomes high. In this case, the user has an advantage that he/she can understand which part of the position information should be input when he/she wants to input the position information in order to improve the accuracy of the positional relationship.

Although the area in the real image has been mainly described as the area where the above input is recommended, it is not limited to the real image, and the areas in the reference image can be generated and displayed as the areas in which the input is recommended.

<Input Support>

Further, the positional relationship generation unit may provide an input support by estimating the relationship between the positional information in the real image and the positional information in the reference image. If the estimation is correct, the user has an advantage that the burden of inputting the position information in the real image and the position information in the reference image is reduced.

Figure 14:
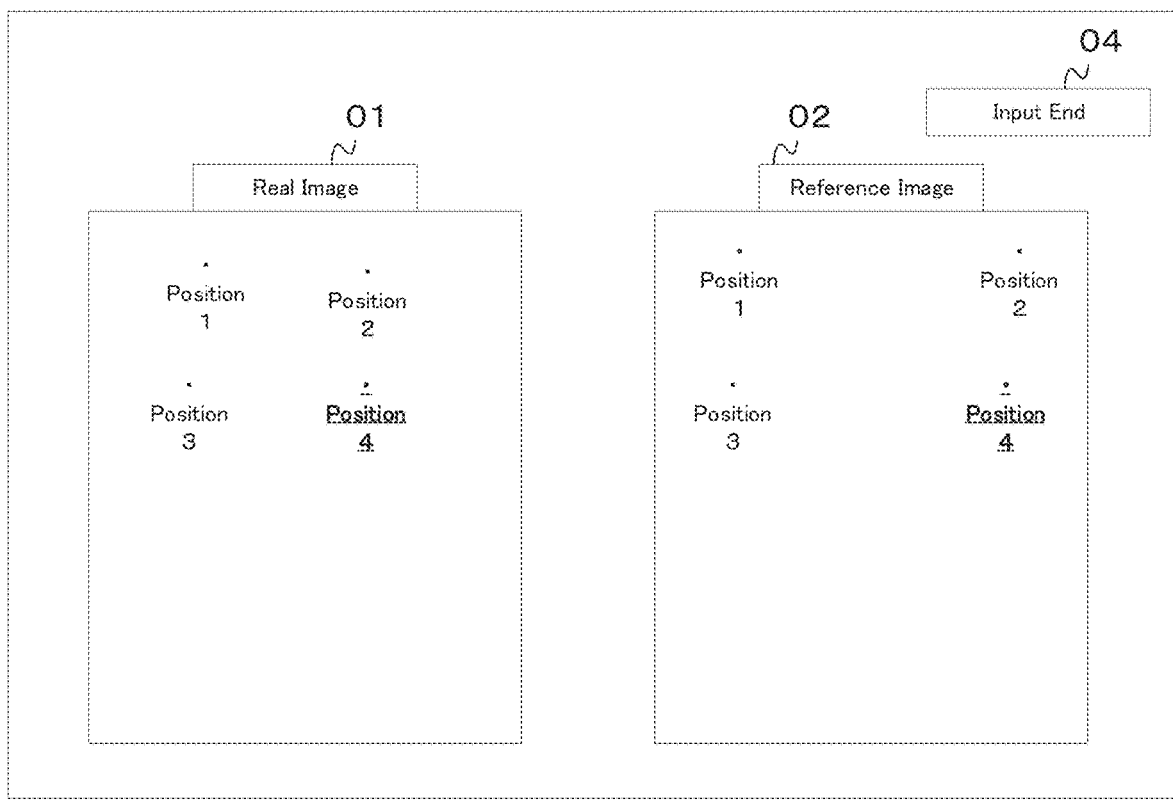

FIG. 14 is an example to estimate the position information in the reference image corresponding to the position information in the one of the position information in the real image, using the position information in the real image and the position information in the reference image corresponding to these. In the following as well, the position information in the real image corresponding to the position information in one reference image may be estimated.

For positions 1 to 3, it is assumed that the user has already input the position information in the real image and the position information in the reference image. At this time, for the position 4, the position information in the real image and the position information in the reference image are estimated.

For the estimation of the relationship between the position information in the real image and the position information in the reference image in the above, the position information in the real image and the reference image of all or a part of the input position information may be used. This estimation will be described using FIG. 15 with reference to FIG. 16.

First, it is assumed that the positional relationship generation unit of the system of the example stores the positions 1 to 3 in the real image, and stores the positions 1 to 3 in the reference image as the corresponding positions (step 1).

Next, the positional relationship generation unit sets the position 4 in the real image (step 2). The position set in the real image may be any place, and may be a position that is apart from the inputted position to some degree. Here, it is assumed that the position 4 is set. One method of setting the position of the position 4 is, for example, dividing the real image into a plurality of areas, and among the areas where the position has been inputted (hereinafter referred to as "position input area") the areas where the position has not been inputted (hereinafter, referred to as "position non-input area"), the area may be a position non-input area and an area adjacent to the position input area. By setting areas for estimating the position information close to the position input area, the information of the position relationship can be transmitted without significantly reducing the accuracy of the position relationship between the real image and the reference image. Further, the position may be any place in the position non-input area. For example, the positions may be set so that the predetermined number of positions with respect to the position non-input area are evenly separated. In this case, since the positions are evenly separated, the information on the positional relationship can be transmitted without significantly reducing the accuracy of the positional relationship between the real image and the reference image in the position input are. Here, the predetermined number may be determined according to the area of the position non-input area. This is because the larger the area, the more the position information is set, the more the position information can be transmitted without significantly reducing the accuracy of the position relationship between the real image and the reference image in the position input area. Further, the positions may be set so as to be separated from each other by a predetermined length. This is because the information on the positional relationship can be transmitted without significantly reducing the accuracy of the positional relationship between the real image and the reference image in the position input region by setting the distance between the positions with a predetermined distance. Further, the position may be set from a position close to the position input area. This is because the information on the positional relationship can be transmitted without significantly reducing the accuracy of the positional relationship between the real image and the reference image in the position input area by setting from a position close to the position input area.

Next, the position in the reference image corresponding to the position 4 is specified by using the three points in the real image closest to the position 4 and the three corresponding points in the reference image (step 3). Here, for the position in the reference image corresponding to the position 4, the function in the position generation unit described later may be used.

Figure 15:
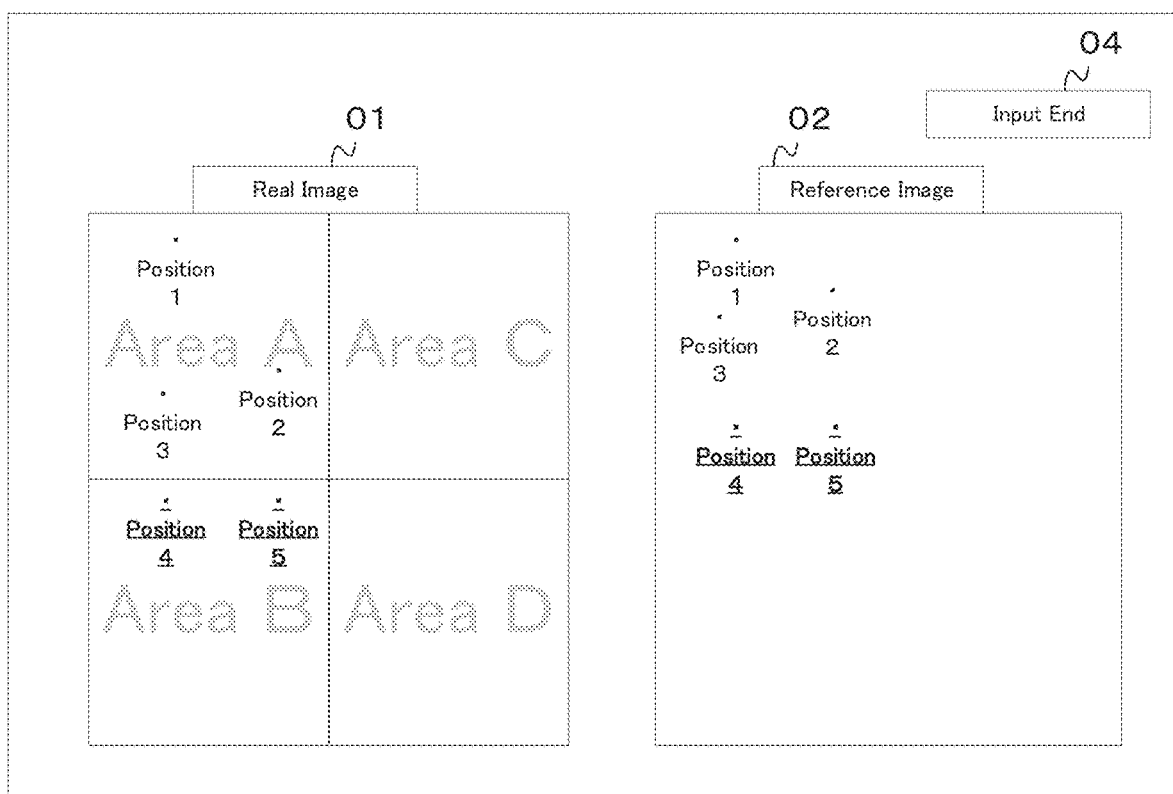
Figure 16:
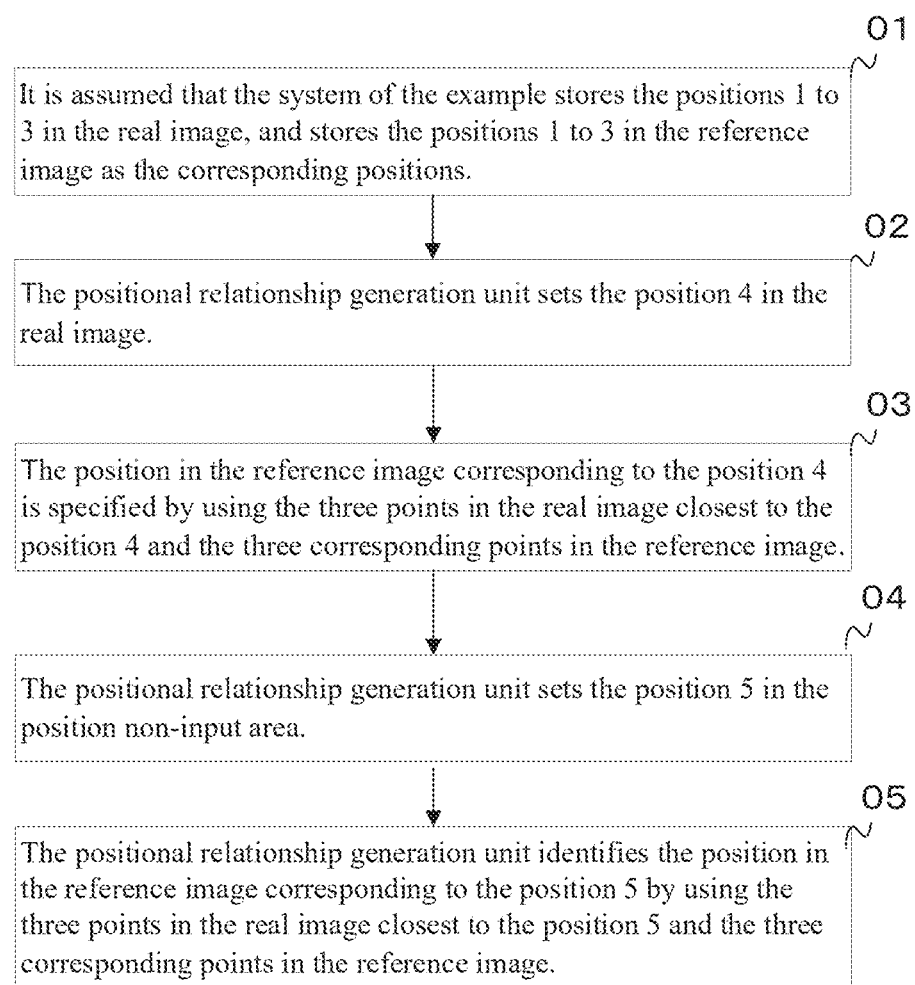

Next, the positional relationship generation unit sets the position 5 in the position non-input area (Step 4). The position 5 can be set with the similar method as the position 4 described above. In FIG. 15, since the position 4 has already been set in the area B, it is assumed that the position 5 is set at a position having a predetermined length with the position 4 in the area B.

Next, the positional relationship generation unit identifies the position in the reference image corresponding to the position 5 by using the three points in the real image closest to the position 5 and the three corresponding points in the reference image (Step 5). Here, one of the three points in the real image closest to the position 5 may not be the positions 1 to 3 inputted by the user described above, but the position 4 may be set in the real image by the positional relationship generation unit. The position in the real image used to generate the position information in the reference image is not the position inputted by the user but the position set by the positional relationship generation unit, so that the information on the positional relationship can be transmitted without significantly reducing the accuracy of the positional relationship between the real image and the reference image in the position input area.

By repeating the above, the position may be estimated and set.

Further, regarding the estimation of the estimated position in the reference image, information for correcting the position in the real image may be obtained from the user. There may be various methods for correcting the position.

For example, after step 3 and before proceeding to the Step 4 above, there may be a step to allow the user to confirm the position 4 in the reference image which the positional relationship generation unit has estimated. For example, it may have a function to acquire information indicating that the user has confirmed the position 4 in the reference image, and a function to acquire position change information that can change the position of position 4 in the reference image. An example system equipped with a function which can receive information indicating that the user has confirmed the position 4 in the real image if the user thought the position 4 in the real image is correct in the light of the position 4 in the reference image, and which can receive position 4 in the reference image set by the user if the user thought the position 4 is not correct. When the positional relationship generation unit has this function, the user can reduce the input of position information while checking each position and correcting it as necessary.

Further, the position correction may be configured to accept the user's input after setting of the positions in the real image and estimation of the positions in the reference image corresponding thereto a plurality of times by the input support. In this case, for example, in a state where the positions 4 to N in the reference image are set corresponding to the positions 4 to N in the real image, it is configured to set the correct positions which the user selected and set when the user thought that the positions in the reference image are not correct in light of the positions in the real image. In this case, when a certain position X in the reference image is selected and the position of the position X is changed, the positional relationship generation unit stores the relationship between the position information of the position X in the real image corresponding to the position X in the reference image and the modified position X in the reference image. Then, the positional relationship generation unit may again perform the above calculations of one or plural positions in the reference image calculated using the relationship between the position X in the real image and the position X in the reference image. In addition, the position of the calculated result in the reference image may be displayed in the reference image. In this case, since the user can estimate the positions collectively for the positions 4 to N, there is an advantage that the input burden on the user can be reduced when the position estimation function operates correctly.

Next, a method is described where the positional relationship information can be transmitted from the position information in the one real image to the position in formation in other real image other than the one real image without reducing significantly the accuracy of the positional relationship between the reference image and the real image at the position input area. For example, when a user inputs position information about a moving image captured by one imaging device, the position information can be transmitted to a moving image captured by another imaging device having an overlapping portion with the one imaging device. Therefore, the user has an advantage that the burden of inputting the position information for the moving image related to each imaging device is reduced.

Figure 17:
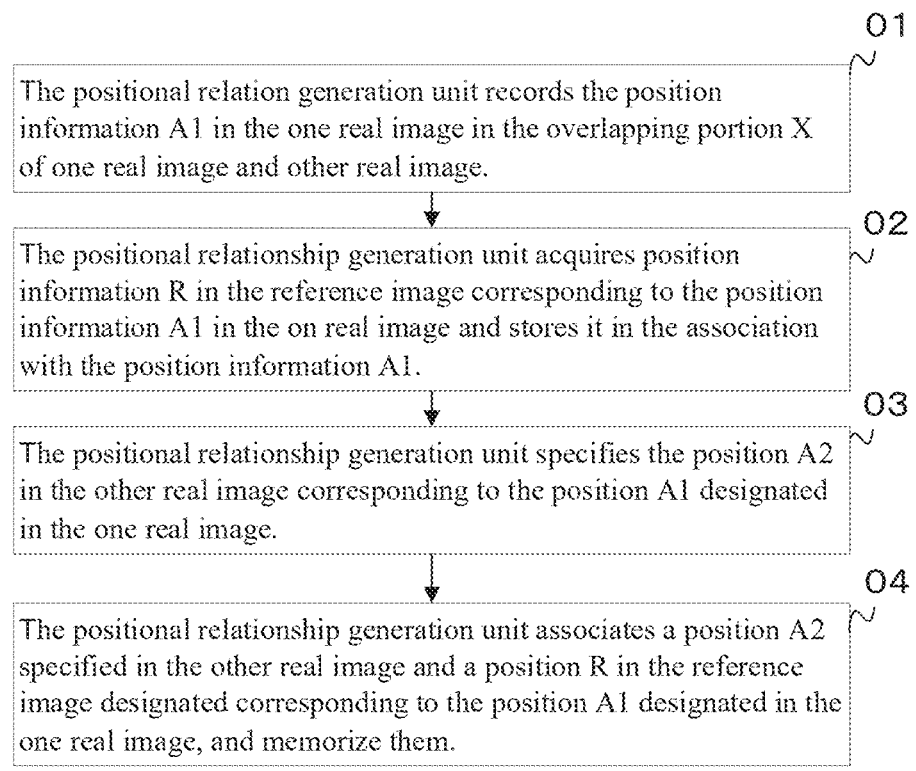

This embodiment is an example to estimate the position information in the reference image corresponding to the position information in the one real image, based on the position information in the other real image which is different from the one real image and the position information in the reference image corresponding thereto. It is described using FIG. 17.

First, the positional relation generation unit records the position information A1 in the one real image in the overlapping portion X of one real image and other real image (step 1). Here, the position information A1 may be acquired by an input from a user, or may be set by the above-mentioned estimation function.

Next, the positional relationship generation unit acquires position information R in the reference image corresponding to the position information A1 in the on real image and stores it in the association with the position information A1 (Step 2). Here, the position information R may be acquired by an input from a user, or may be set by the above-mentioned estimation function.

Next, the positional relationship generation unit specifies the position A2 in the other real image corresponding to the position. A1 designated in the one real image (step 3). Since the position A1 designated in the one real image is in the overlapping portion X of the one real image and the other real image, the position A1 designated in the one real image exists in other real images. The method of the designation may be various methods. For example, an area including a designated position in the one real image may be specified by a pattern matching in the overlapping portion in the other real image. The pattern match can be specified based on a determination that the possibility of matching is high because it assumes the existence in a limited area. The order of step 3 and step 2 may be changed.

Further, instead of the pattern matching, it may be applied by using a learning function. For example, when a neural network based on a deep learning is used as a learning function, the relationship between the position. R in the reference image, the one real image, and the position. A1 in the one real image is learned by a deep learning. The position R in the reference image and the other real image may be applied to the neural network to specify the position A2 in the other real image corresponding to the reference image R.

Next, the positional relationship generation unit associates a position A2 specified in the other real image and a position R in the reference image designated corresponding to the position A1 designated in the one real image, and memorize them (step 4).

When the position information of a plurality of points is acquired in the overlapping portion, the positional relationship generation unit can associate a plurality of position information in the other real image and the position information in the reference image corresponding to each position information, and store them. The positional relationship unit may further associate the position information in the other real image and the position information in the reference image by the above techniques even on the areas that does not overlap with the one real image in the other real image. According to the present technology, when the user inputs the positional relationship between the real image related to one imaging device and the reference image, there is an advantage that the positional relationship between the other imaging device including the real image overlapping with the real image related to the one imaging device and the reference image.

Further, with respect to the moving images M1 to M3 corresponding to the image pickup devices C1 to C3, when the imaging devices C1 and C2 have an overlapped visual field and the imaging devices C2 and C3 have an overlapping visual field, regardless of whether the imaging devices C1 and C3 have an overlapping visual field, if the positional relationship generation unit acquires the positional relationship between the real image and the reference image in the imaging device C1, firstly the position relationship between the real image and the reference image in the imaging device C2 are estimated through the overlapping portion, and next, the positional relationship between the real image and the reference image in the imaging device C3 can be estimated. As described above, the system of one example may have a configuration capable of estimating the positional relationship even between reference images having no duplication.

In the above, as an example of input support, an example system in which position information in a reference image is estimated, confirmed, and corrected has been mainly described, but these are not limited to the reference image, and an example system may be configured that the position information in the real image may be estimated, confirmed, and corrected.

3.2. Target Information Collection Unit 32

The target information collection unit has a function of collecting information about the target from one image of the moving image. For example, when the target is a person, the information about the target may be a fashion item attribute, a person attribute, a position of each part of the person, or the like (hereinafter, these are collectively referred to as "person information"). Fashion item attributes and human attributes will be described later. The information on each part of the person may be, for example, information on the left and right positions of the eyes, ears, wrists, elbows, shoulders, hips, knees, or ankles, a part of the information on the nose, or the position of the neck, or it can be all. In addition, human attributes include information such as human age, human gender, height, human weight, human physique, human occupation, human facial expression, human nationality, presence/absence and degree of makeup, and hairstyle. It may be part or all thereof. In addition, the lower concept of people information (for example, fashion item attributes, fashion item type, tops, people attribute, age layer of the person, the age of the person, such as 30 years old) is "human characteristics". "Classification by personal characteristics" means, for example, a classification by tops and bottoms, by men and women, by 20s, 30s, 40s, by hairstyle, or by the type of makeup.

The information obtained by the target information collection unit may be stored in the "target database". The target database may be comprised of one database or a plurality of databases, and may be, for example, a relational database in which a plurality of databases are associated with each other via an ID or the like.

The target information collection unit may have a function of detecting a target as a premise for collecting information. The detection method may be various methods. For example, it may be a method of comparing a background image in a state where there is no target and a paused image of a moving image and determining a different part as a target appearing in the moving image, or a paused image for detecting the target. It may be a method of comparing the image with the paused image before the image and determining the target to be detected at a different part. Regarding the latter part, the target in the moving image that is not detected as a different part may be treated as if there was no movement.

As a method for the target information collecting unit to acquire human information from one image of a moving image, various methods may be used, and the method is not limited.

Target information collecting unit may produce human processing information, using the human information. For example, as the human processing information, it may generate a part or all of the human position information or the human behavior information. The human processing information may be stored in the target database.

The person position information may be the position information in the real image corresponding to the moving image with respect to the person in one image of the moving image.

For example, the person position information may be information calculated by various methods, but it needs to be reasonably considered to be the position of a person in the image. For example, the position of the person may be the position at the center of both feet, or the position where the straight line connecting the neck and the center of the waist intersects the ground. Further, instead of the position of the neck, the position may be the center of both shoulders or the center of both wrists. The significance of applying various calculation methods is that the person position information can be calculated even when the whole person does not appear in one image of the moving image. There may be a part of the person outside one image of the video, or the whole person may be hidden by another person or something else. As described above, since the target information unit can calculate the position of each part of the person by a plurality of means, there is an advantage that the person position information can be calculated from a part of the information of each part of the person.

Figure 18:
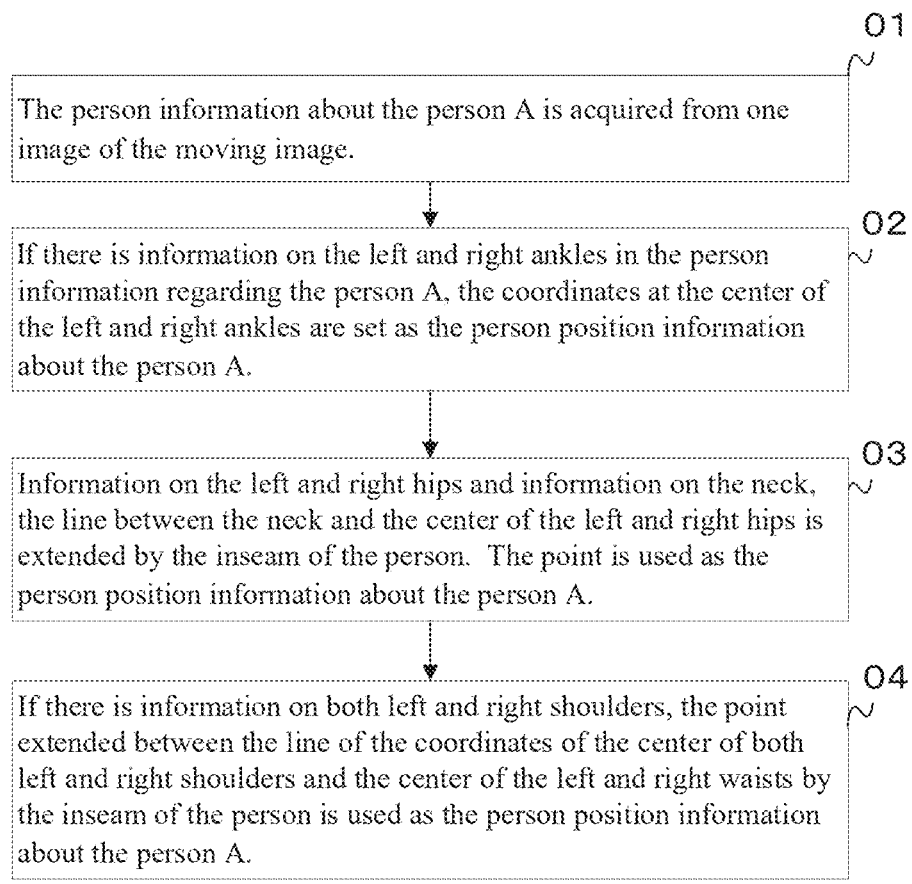

Here, when the person A is in the moving image, an example of the process of acquiring the person position information of the person. A from one image of the moving image is as shown in the flow of FIG. 18, for example. That is, the person information about the person A is acquired from one image of the moving image (step 01). Next, if there is information on the left and right ankles in the person information regarding the person A, the coordinates at the center of the left and right ankles are set as the person position information about the person. A (step 02). Next, in the person information about person A, if there is no information on the left and right ankles and information on the left and right hips and information on the neck, the line between the neck and the center of the left and right hips is extended by the inseam of the person. The point is used as the person position information about the person A (step 03). The inseam portion may be calculated from other information. For example, the inseam portion may be calculated using the average length of the inseam length of a person having the central length of the head and the left and right hips and the central length of the head and the left and right hips. Next, in the person information about person A, if there is no information on the left and right ankles, no information on the neck, and there is information on both left and right shoulders, the point extended between the line of the coordinates of the center of both left and right shoulders and the center of the left and right waists by the inseam of the person is used as the person position information about the person A (step 04).

The human behavior information may be information on human behavior, information indicating human behavior, or predetermined classified information on human behavior. Human behavior information may be collected by various methods, and the methods are not limited. For example, the artificial intelligence technique described later may be used, or another method may be used.

For example, as the human behavior information, the predetermined classified information may be information that classifies human behavior into a plurality of types and identifies one of them. The classification of human behavior into a plurality of behaviors may be classified according to the purpose of use of the technology.

Here, a method of classifying interests in fashion items in a commercial facility related to fashion items will be described using an example.

In one example system, the human behavior information is classified to one of 1 to 6 in FIG. 19. That is, 1) the directions of the eyes and nose are the same, 2) reaching out by hand, 3) returning a hand, 4) putting hands on the shoulder for a certain period of time, and 5) bringing the neck and ankle closer to each other. 6) The neck, hips and ankles are close to each other. Human behavior information may be specified by a combination of information on each part of a person and time.

In 1), since the directions of the eyes and the nose are the same, it is considered that they are interested in those in that direction. For example, if you look at a particular shelf in a store, you are presumed to be interested in what is on that shelf. In particular, if it is detected that the directions of the eyes and the nose are the same for a predetermined time, it may be presumed to be interested. In this case, information on the direction in which the directions of the eyes and the nose are the same may also be acquired. The direction may be the direction in the reference image, or may be converted to the direction in the reference image after determining the direction in the real image.

In 2), it is presumed that reaching out is particularly trying to take the one that reached out, and it is presumed that he is interested in the one that reached out. For example, if you reach tier a product on a shelf in the store, it is presumed that you are interested in that product. Reaching may be detected by the position of the wrist, elbow, and shoulder within a predetermined period and the distance calculated by these. In addition, information on the direction of reaching out may be acquired. The direction may be the direction in the reference image, or may be converted to the direction in the reference image after determining the direction in the real image.

3) it is estimated to take something at hand since it returns the hand, in particular it is estimated that there is interest in those stretched out hand. Returning the hand may be detected by the position of the wrist, elbow, and shoulder within a predetermined period and the distance calculated by these, in addition, information on the direction of returning the hand may be acquired. The direction may be the direction in the reference image, or may be converted to the direction in the reference image after determining the direction in the real image.

In 4), since the hand is placed on the shoulder for a certain period of time, it is presumed that the fashion item is picked up and fitted to one's body. From this, it is presumed that they are particularly interested in the product.

5) If the position of the waist does not change so much and the neck and ankle approach each other, it is presumed that the person is in the middle waist, and if it is in front of the shelves in the store, it is presumed that he/she is interested in the middle items. In this case, information on the direction of the front of the face and it or the direction of the line of sight may also be acquired. The direction may be the direction in the reference image, or may be converted to the direction in the reference image after determining the direction in the real image.

6) When the neck, hips and ankles come close to each other, it is presumed that they are crouching, and if they are in front of the shelves in the store, they are presumed to be interested in the lower items. In this case, information on the direction of the front of the face and/or the direction of the line of sight may also be acquired. The direction may be the direction in the reference image, or may be converted to the direction in the reference image after determining the direction in the real image.

FIG. 20 is an example of information on each part of a person. This is an example in which the position information of each human part information is recorded as coordinate information. Here, the slide ID is corresponding to the real image which is one stop image of the moving image, and it corresponds to the image at each time of the video. This information may be used to generate human behavior information.

FIG. 21 is an example of a rule for the target information collecting unit to generate human behavior information by using each human part information. In FIG. 21, it is an example of determination using information on each part of a person and time information. As the time information, the time information in the moving image may be used, or the ID or time of the stopped image of the moving image, which substantially correspond to the time information may be used. Each rule shown in FIG. C4 is only an example and it may be various determination methods.

Human behavior information is determined after a predetermined time. Therefore, the database including the human behavior information may be stored as the information of the human behavior information in the predetermined time zone, or the predetermined time may be stored as the start time of the human behavior information. FIG. 22 is an example of a predetermined time period and, with each person ID, a human position information, and human behavioral information, human behavior supplemental information is identified with. Incidentally, human behavior supplementary information may include the direction information corresponding to each person action. The direction is represented here by an angle where the positive X-axis in Cartesian coordinates corresponding to Y value of 0 in the reference image is 0 degree. Further, as the human behavior information, the above-mentioned six patterns have been described, but in addition to this, information such as walking and standing may be detected, and from the viewpoint of reducing the storage amount of the database these information may be configured not to be stored.

<Vehicle Information>

Target information collection unit may collect information of the vehicle, as the target. Vehicles include automobiles, motorcycles, light vehicles, and the like. Information about the vehicle may be, for example, vehicle type, color, vehicle number. This information may be collected by various methods. Further, in the case of a vehicle, the target information collecting unit may specify information on which direction the vehicle is traveling in. As for the traveling direction, the direction of movement may be specified by the relationship between a plurality of real images related to the moving image and the time thereof <Animal Information>

The target information collection unit may collect animal information as a target. Information about animals may be postures and movements according to the type of each animal. The posture may be a lying posture, a standing posture, a walking posture, a running posture, a threatening posture, an attacking posture, a food eating posture, a sleeping posture, or the like. Further, the motion may be a sleeping motion, a walking motion, a running motion, a threatening motion, an attacking motion, an eating motion, or the like.

<Identity Judgment Function>

Target information collection unit may have a function to determine the identity of the target. The target may be a target between real images, a target between reference images, or a target stored in a target database.

The target information collecting unit may determine the identity of such a target by various methods. For example, the target information collecting unit may determine the identity of the subject based on the position information of the target. Specifically, when the target information collecting unit acquires position information of target X in the real image at a certain time, it may determine that the target Y, which has the closest position information to the position information in the real image before the time, is identical to the target X. In this case, the ID of the target Y may be set the subject ID of the target.

Further, when the target information collecting unit acquires the position information in the reference image for the target X at a certain time, the target has the position information closest to the position information in the reference image before the time. It may be determined that Y is the same as the target X. In this case, the ID of the target Y may be set as the target ID of the target.

Figure 23:
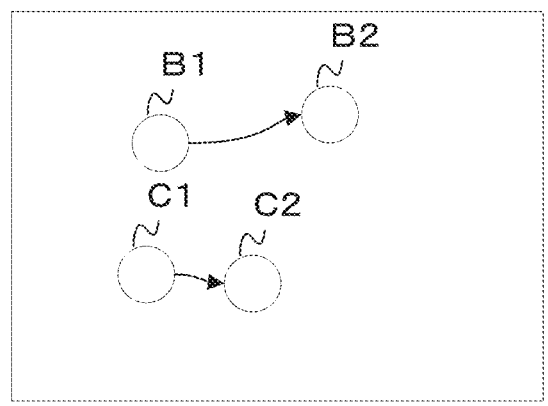

For example, FIG. 23 is a diagram showing an example of movement between the target B and the target C for a moving image. That is, at time t1, the target B is at the position of B1 and the target C is at the position of C1, and at the time t2, the target B is at the position of B2 and the target C is at the position of C2. In this figure, for the sake of clarity, the object B and the object C are drawn as having a certain area instead of a point. In this figure, since the distance between B2 and B1 is shorter than that of between B2 and C1, B2 may be set to the same object ID as B1. Moreover, since the distance between C2 and C1 is shorter than that of C2 and B1, C2 may be set to the same object ID as the C1.

In addition, after a lapse of a predetermined time, a plurality of objects may approach each other. For example, depending on the setting of the predetermined time, after the predetermined time elapsed, B1 moves to the position of C2 and C1 moves to the position of B2. In this case, by shortening the elapsed predetermined time, the position before B1 moving to the position C2 and the position before C1 moving to the position B2 are known. Therefore, the tracking function may be configured to use the position identification function after a predetermined time less than the threshold value has elapsed.

In addition, the target information collection unit may use other information related to the target as a recognition of the identity of the target. For example, information such as the color, shape, and movement of the object may be used. In addition, information such as color, shape, and movement related to the object may be acquired by various methods. For example, when the colors of the objects are different, the identity of the objects may be recognized using each color. Each color related to a plurality of places related to the target may be used. For example, when the target is a person, since the person wears fashion items such as tops, bottoms, socks, shoes, etc., some or all of them may be used.

Another example of using the information related to the target when the target information collection unit recognizes the identity of the target will be described. For example, it is assumed that there are imaging devices C1 to Cn, and the real images captured by each imaging device are A1 to An. These may be some or all imaging devices in department stores and amusement parks. In addition, the target information collection unit may have a database having human information and/or human processing information (referred to as "person-related database").

The target information collecting unit may detect a person who is a new target in order for the real images A1$t$1 to An$t$n captured at time t1 in the imaging devices C1 to Cn, and sequentially assign a temporary ID to the person. In addition, the target information collection unit may generate personal information and/or human processing information regarding each person. When the target information collection unit can identify the generated person information and/or the person processing information as the same person by comparing the generated person information and/or the person processing information with the person in the person-related database, the target information collection unit determines the person ID in the person-related database. A person. ID, location information, and the like may be registered in the target database by using the temporary ID instead. On the other hand, the target information collecting section may grant a new person ID and register the target database and a human related database when it compares the generate human information and/or human processing information with a human stored in the person-related database and cannot identify as the same person such as different information arises more than a predetermined level. In this case, since the person information obtained by the target information collecting unit is registered in the person-related database, for example, there is a part outside the field of view of the image pickup device in the area, so that the view of the image pickup device is continuous. Even if a person cannot be tracked, if a person who once went out of the field of view of the image pickup device enters the field of view of the image pickup device again after a certain period of time, the person-related database remembers the person. There is an advantage that it can be determined that they are the same person. The information in the person-related database may be deleted at regular intervals. For example, the time for storing information may be one day, and the time may be deleted after one day has passed. This is because different items can be worn on different days, so if the identity judgment function emphasizes fashion item attributes (sets a high value as the weight), an error may occur in the judgment of identity. On the other hand, when the identity determination function makes a determination with an emphasis on the face and hairstyle (by setting a high value as the weighting) when targeting a person, the period for retaining the information may be long. For example, it may be one week, one month, three months, half a year, or the like. In particular, since facial information does not fluctuate during such a period, there is an advantage that the number of visits by the same person and the number of visits to the store can be generated within a predetermined period.

Here, at a point where there is a plurality of imaging devices, the same people, the plural imaging devices, consider the case appearing in order. At this time, the person's eyes can understand that they are the same person from the person's face, clothes, movements, and the like.

Figure 24:
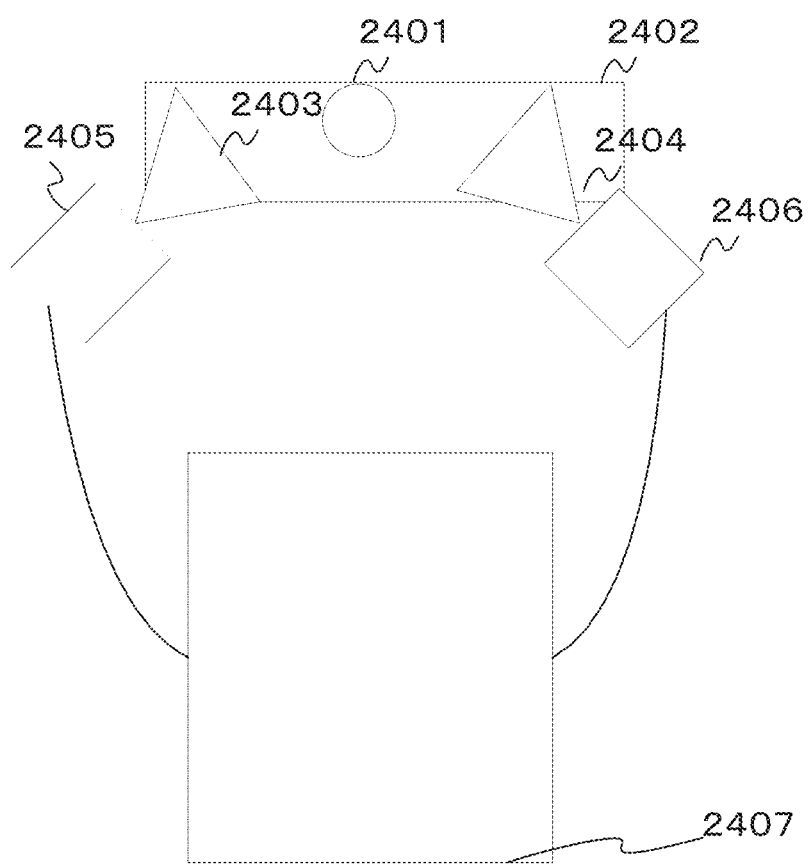

FIG. 24 illustrates the situation described above. For example, a human as a target 2401 is supposed to move the passage 2402 from the paper-left to the right. In this case, the person 2401 first appears from the left end of the field of view 2403 of the imaging device 2405, moves to the right end and disappears from the right end, then appears from the left end of the imaging device 2406 in the field of view 2404, moves to the right end, and moves from the right end and disappear. The captured information of the imaging devices 2405 and 2406 are transmitted to the information processing device 2407 for processing.

FIG. 25 is an example of a target database recording the state of human 2401. Information related to the imaging device 2405 and information related to the imaging device 2406 are summarized with respect to the target time. By detecting the person 2401 appearing in the real image in the imaging device 2405, the target information collecting unit may assign a target ID and collect and record information about the target. In this figure, the coordinate information in the real image may be recorded. Here, since the in-field 2403 of the imaging device 2405 is inclined and the coordinate information is complicated, it is displayed by x and y. The position generation unit may generate position information in the reference image by using the position information of the real image. In this figure, it is assumed that the person. 01 moves to the coordinates (x4, y4) in the real image at the time t6 and then disappears from the field of view 2403 at the time t7. As a result, since it disappears from the imaging device 2405, the position information disappears from both the real image and the reference image, and the memory of the target ID also disappears. Next, at time t8, the person 2401 appears in the field of view 2404 of the imaging device 2406. At this time, the target information collecting unit collects the person information for the person appearing in the real image of the imaging device 2406 as described above, and determines whether or not the target information collecting unit may judge whether this and the information of the target ID 5 is the same or not. When determining the person who newly appeared to be identical to the target ID5, target information collecting unit assigns 5 as the target ID in the imaging device 2406 and acquires a coordinate (x5, y5) in the real image. After that, the person 01 moves in the field of view 2404 in the imaging device 2406 until the time 11. Correspondingly, the position generation unit may generate the position information in the reference image by using the position information of the real image. Incidentally, in this example, y coordinate is calculated to be 5 in the reference image in the imaging device 2405, and to be 4 in the reference image in the imaging device 2406.

3.3. Position Generation Unit 33

The position generation unit generates the position information of the target. Further, the position generation unit may generate the position information of the target in the reference image by using the position information of the target in the real image. The information generated by the position generation unit may be stored in the target database.

For example, suppose that a person B appears in a moving image with a real image as a background, and the target information collecting unit generates coordinate information (B1$x$1, B1$y$1) of the position information B1 of the person B in the real image. Position determining unit may generate the coordinates (B1$tx$1, B1$ty$1) of the corresponding position Bt1 in the reference image, from the coordinate (B1$x$1, B1Y1) of the position B1 located in the real image. Various methods can be considered as the method, and for example, the following method can be considered.

<Method 1>

Figure 26:
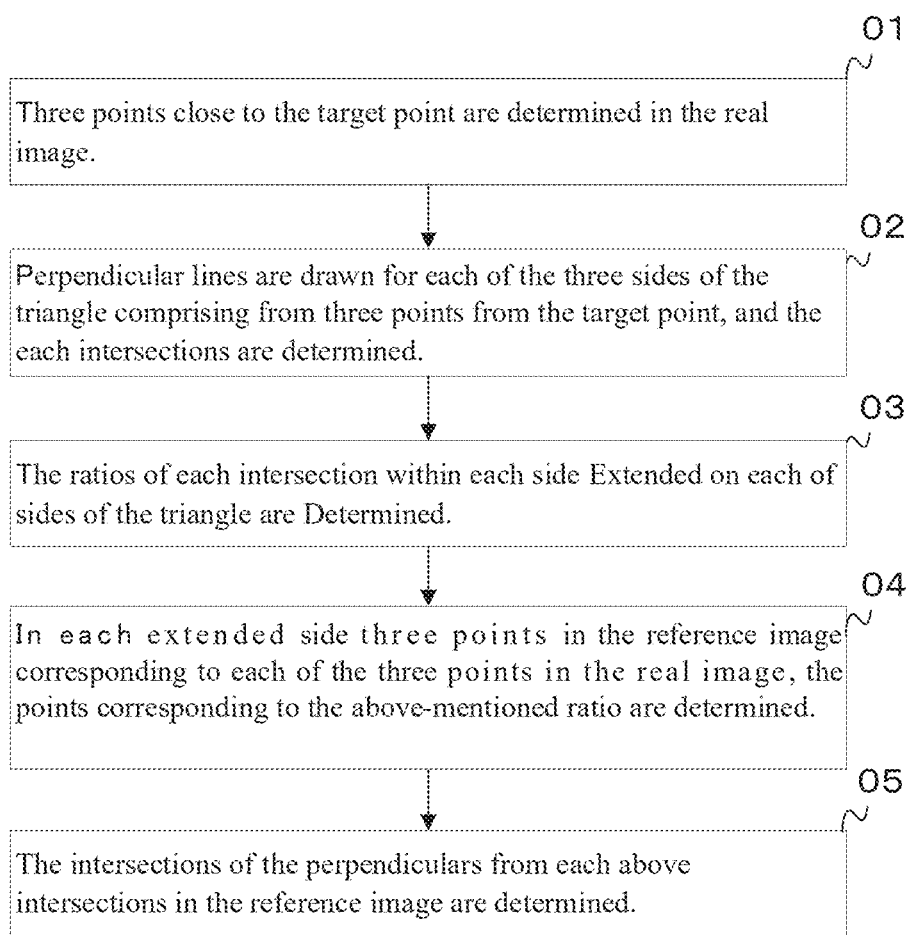

The method 1 is described with reference to FIG. 26. First, three points close to the B1 are identified. These three points are selected from the above A1 to AN. Here, these are referred to as Ai1, Ai2, and Ai3. These three points can be identified by the closest distance coordinates among the A1 to AN by measuring the distance between the coordinate B1 and the coordinate A1 to AN. The distance can be, for example, the Euclidean distance.

Next, perpendicular lines are drawn for each of the three sides from B to Ai1, Ai2, and Ai3, and the each intersections of each perpendicular lines and the corresponding side are specified. Each sides are a straight line between Ai1 and Ai2, a straight line between Ai2 and Ai3, and a straight line between Ai3 and Ai1. Then, each intersections of the perpendicular lines from B1 to each side are on the each side and they are Ak1, Ak2, and AK3 in turn. Note that Ak1, Ak2, and AK3 are not necessarily on each side but they may be on the extended line of each side. That is, Ak1 is on the line connecting Ai1 and Ai2, Ak2 is on the line connecting Ai2 and Ai3, Ak3 is on the line connecting Ai3 and Ai1.

Next, the ratio of each intersection within each side is specified. That is, the ratio of the distance from Ai1 to Ak1 and the distance from Ai2 to Ak1, the ratio between the distance from Ai2 to Ak2 and the distance from Ai3 to Ak2, and the ratio between the distance from Ai3 to Ak3 and the distance from Ai1 to Ak3 are calculated and specified.

Next, in each side in the reference image corresponding to each of the above three sides, the points corresponding to the above-mentioned intersections are specified based on the above-mentioned ratio. For example, Atk1 in the reference image corresponding to Ak1 in the real image is set such that the ratio of the distance from Ai1 to Ak1 and the distance from Ai2 to Ak1, and the ratio between the distance from Ati1 to Atk1 and the distance from Ati2 to Atk1 be equal. Incidentally, the points in the reference image corresponding to the points Ai1, Ai2, and Ai3 in the real image are Ati1, Ati2, and Ati3, respectively. Similarly, the points corresponding to Ak2 and Ak3 are set as Atk2 and Atk3. Incidentally, Atk2 and Atk3 are on the straight line connecting the At12 and Ati3, and on the straight line connecting the Ati3 and Ati1, respectively.

Next, it calculates the intersections of Atk1, Atk2, and Atk3 and the perpendicular of each side corresponding thereto. The intersection is At1.

<Method 2>

Figure 27:
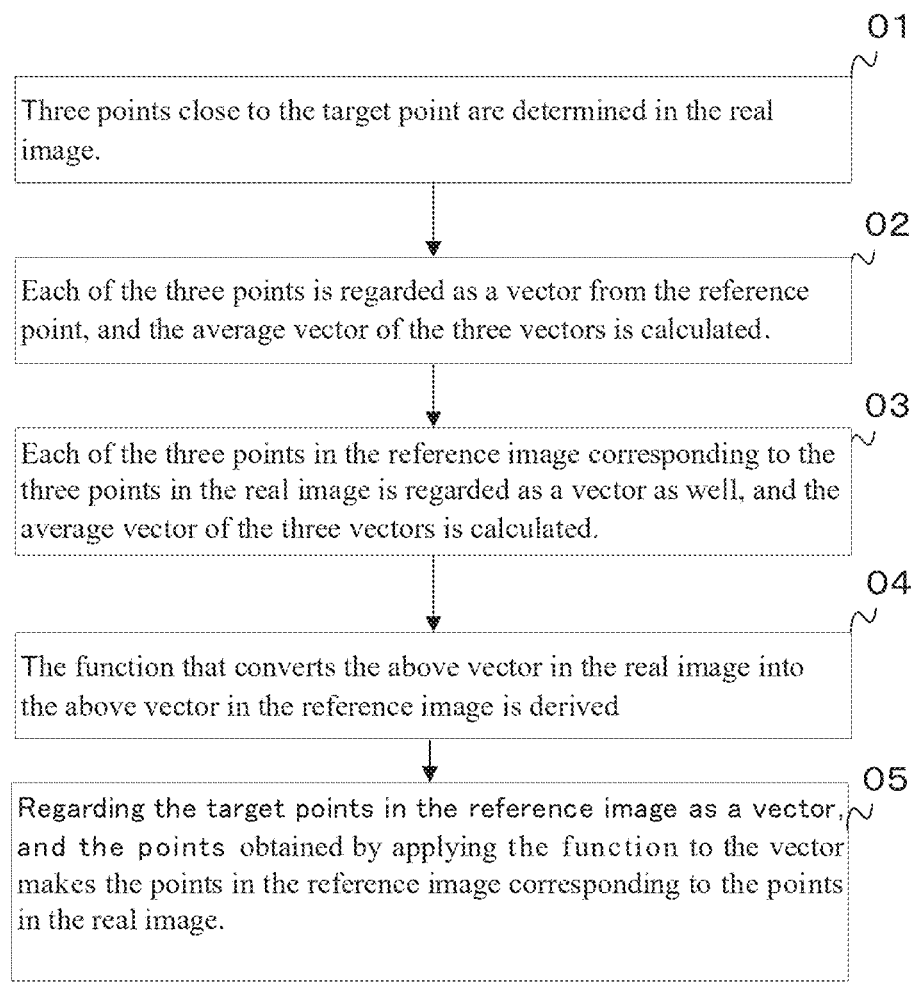

Method 2 will be described with reference to FIG. 27. In the next method, first, three points that are close to B1 (B1$x$1, B1$y$1) in order are specified. The method for acquiring the points is the same as described above, and the same applies to Ai1, Ai2, and Ai3. The points in the reference image corresponding to these are designated as Ati1, Ati2, and Ati3.

Next, each of the three points is regarded as a vector from the reference point, and the average vector of the three vectors is calculated. For example, let each points of Ai1, Ai2, and Ai3 be regarded as three vectors from the reference point in the real image, and let the average vector be Aia, and let each of the three points of Ati1, Ati2, and Ati3 be a vector from is the reference point in the reference image, and let Atia be the average vector thereof. Then, the function Fia that converts the vector Aia into the vector Atia is derived, and the point B1$t$ (B1$tx$1, B1$ty$1) obtained by applying Fia to the vector B1 in the real image and the points in the reference image corresponding to the real image B1 is specified.

The method 2 has an advantage that the points corresponding to the points in the real image can be easily derived in the reference image.

<Method 3>

Figure 28:
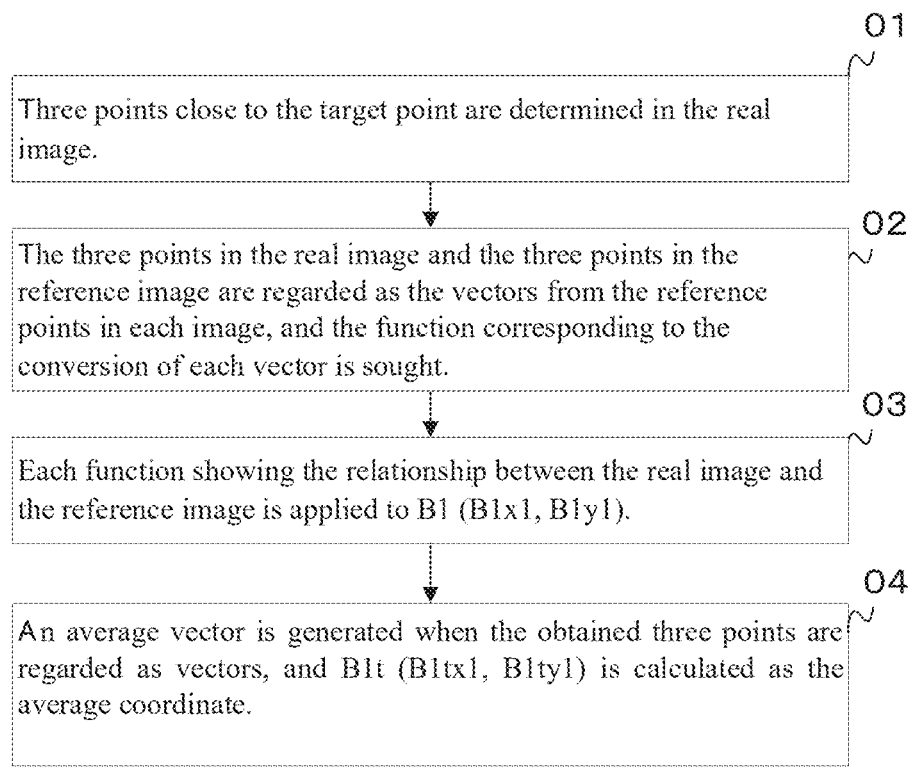

Method 3 will be described with reference to FIG. 28. In the next method, as in method 2, three points that are close to B1 (B1$x$1, B1$y$1) in order are specified. The point acquisition approach is the same as described above, and let the three points be Ai1, Ai2, and Ai3, and let the corresponding points in the reference image be Ati1, Ati2, and Ati3.

Next, in the same manner as described above, the three points in the real image and the three points in the reference image are regarded as the vectors from the reference points in each image, and the function corresponding to the conversion of each vector is obtained. More specifically, it generate a function FAi1 that converts Ai1 into Ati1, function Fai2 that converts Ai2 into Ati2, function FAi3 that converts ai3 into Ati3.

Next, each function showing the relationship between the real image and the reference image is applied to B1 (B1$x$1, B1$y$1). That is, each of the functions FAi1 to FAi3 is applied to B1 (B1$x$1, B1$y$1).

Next, an average vector is generated when the obtained three points are regarded as vectors, and B1$t$ (B1$tx$1, B1$ty$1) is calculated as the average coordinate.

Method 3 also has the advantage that points corresponding to points in the real image can be easily derived in the reference image. Similarly, the coordinates B1 to BM of the object in the video with the background of real image, sequentially, the corresponding coordinates Bt1 to BtM may be calculated.

In the above calculation, the expressions in the real image or the reference image were used, since it is easy to understand that they are displayed in the real image or the reference image. In calculating Bt1 from Bt1, the real image and the reference image may not be provided.

In Method 1 to 3 described above, the position information in the reference image is generated as the position information is coordinate information. However, the location in the reference image can be specified with the similar thought even if the location designated by a user is an area. For example, the above-mentioned coordinate transformation calculation is applied to an area by using the coordinates of one point in the area such as the center of gravity coordinate, the lower end coordinate, the upper end coordinate, the right end coordinate, the left end coordinate, or the average coordinates of these as representative coordinates. Alternatively, the above-mentioned coordinate transformation calculation may be applied to a plurality of coordinates defined in the region.

<Area Specifying Unit>

When an area is used, the position generation unit may have an area specifying unit. The area specifying unit has a function of specifying one or a plurality of areas set in the reference image for the target in the reference image. When the area is set, there is an advantage that the statistical processing unit described later can generate information using the area. For example, there is an advantage that a numerical value can be generated or determined for each area. The information specified by the area specifying unit may be stored in the target database.

The area specifying unit compares the position information of the target in the reference image with the position information of one or more areas set in the reference image, and the position information of the target is included in the one or more areas. When it is determined that the target position information belongs to the one or more regions, information may be generated.

Here, FIG. 29 is an example of data showing position information of a plurality of regions. Here, an example is shown in which each area is simply defined by the upper and lower limits of the X and Y coordinates. Each area does not necessarily have to be a quadrangle, and may be a polygon, a circle, or a combination thereof. These may be expressed by using various mathematical formulas. Then, each area is defined by various mathematical formulas, and it may be determined whether or not the position information of the target is included by the sufficiency of the range. FIG. 30 is an example in which each area is represented by a function represented by the x-coordinate and the y-coordinate.

Figure 31:
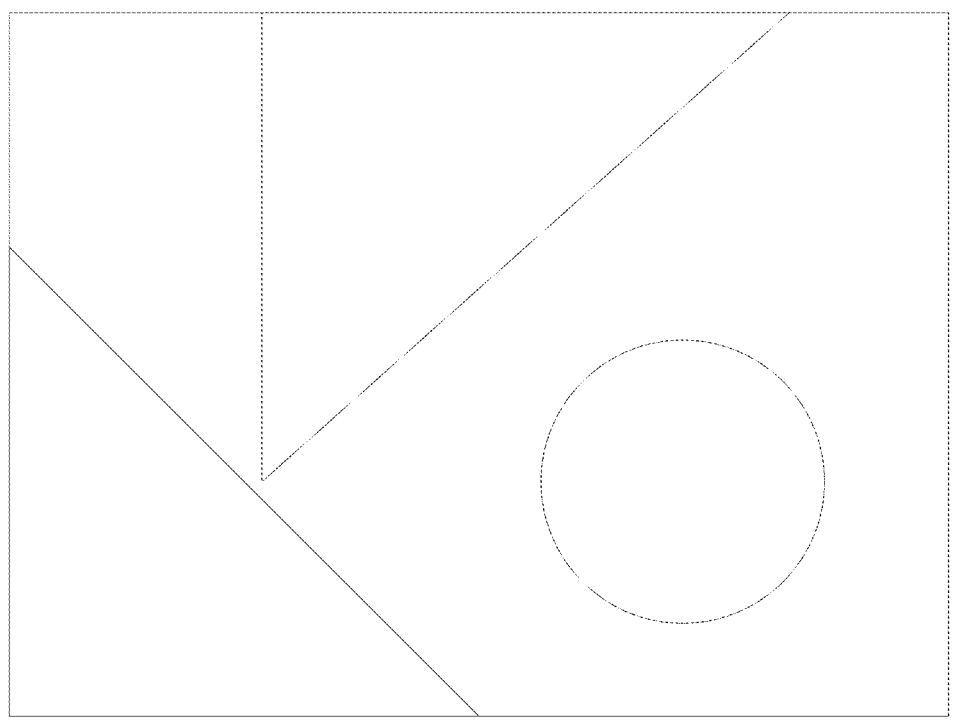

FIG. 31 is an example of an area in the reference image. The area may be defined by polygons, circles, ellipses, and various other functions. The areas may also be separated by a function.

FIG. 32 is an example of data in which information generated when the target belongs to an area is stored. This data is an example showing a situation in which the target ID 2 belongs to the area 2, the target ID1 and the target ID3 belong to the area 3, and the target ID3 belongs to the area 5.

Further, when the target is not a point but a certain area (hereinafter referred to as "target area"), the area can be specified when a part of the target area and a part of the area set in the reference image overlap with each other, or when all of the target area and a part of the area set in the reference image area overlap with each other. The area may be specified when a part of the target area overlaps with the area set.

In addition, the areas may be layered. Area specifying unit based on the position information of the target may specify hierarchical plurality of areas. Moreover, one object may be specified in a plurality of areas.

FIG. 33 is an example of data in which the specified area is stored for the layered area. This is an example wherein this data, the area 1.1, the area 1.2, and the area 1.3 are set as the lower layers of the area 1, and the area 1.3 is further divided into the areas 1.3.1 and the area 1. Then, this is an example where the target ID 1 specifies the area 1.2, the target ID 2 specifies the area 2.1, and the target ID 3 specifies the area 1.3.2. In this data, an example is shown in which the data is stored in three columns from the viewpoint of comprehensibility. However, in a row of data, the data including the area in the lower hierarchy may be stored. Further, since the above-mentioned information of the hierarchical structure has a structure in which the upper layer can be specified if the lower layer is specified, it may be specified only in the lower layer.

Further, the area may be set in advance or may be set by an input by the user.

Figure 34:
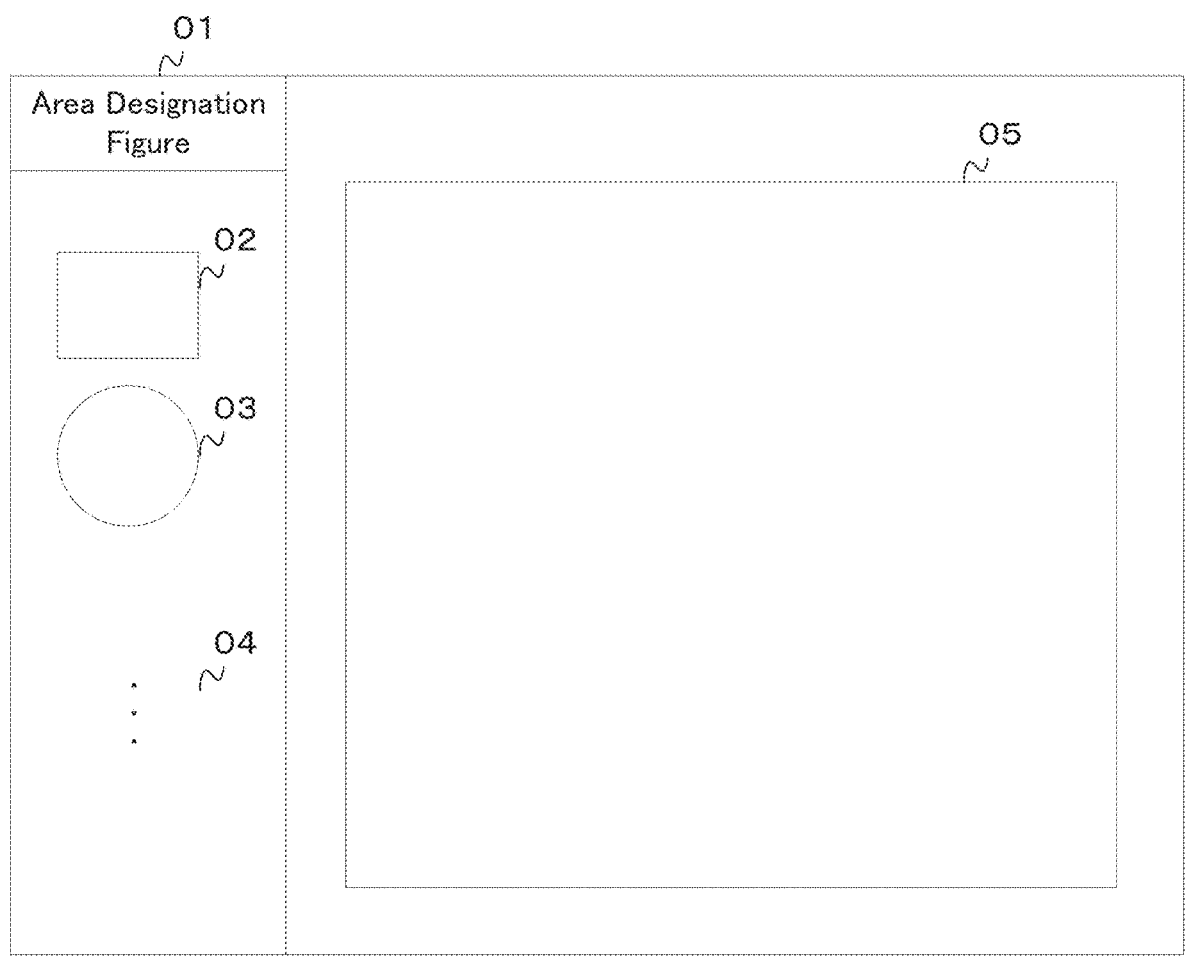

For example, FIG. 34 shows a screen for the user to set an area. The menu of the area designation FIG. 01 on the screen provides means for specifying the area. As a means for designating the area, the area may be specified by a line segment, or a predetermined figure may be prepared so that the area can be specified using the figure. For example, in the figure, the quadrangle 02 and the circle 03 are displayed, but in addition to this, various polygons, ellipses, and the like may be prepared 04. The location 05 where the area can be specified corresponds to the reference image, and the user specifies the area by using a means capable of specifying the area in this screen. As a method of designating an area by a user, an area may be designated by setting a line segment or a figure. Further, these line segments and pre-designated figures may be deformed by the user and used as the designated means. The user may select and drag these line segments or figures by the mouse input means, or may install them by touch input by the touch panel. In addition, other input means may be used. Further, the reference image corresponding to the field of view captured by one imaging device may be regarded as one region. In this case, the ID of the imaging device or the like may substantially serve as information for identifying the region. In this case, there is an advantage that each reference image corresponding to each real image captured by the plurality of imaging devices can be treated separately, assuming that each region is set.

The area specifying unit may generate an area corresponding to a line segment or a figure in response to an input by the user using the area designating means. If it is a line segment, the area may be a line segment and a range closed by a line segment, another figure, a frame of a reference image, or the like. When a plurality of figures overlap, it may be set as a layered area, or the figure obtained by superimposing the figures may be set as one area. An input means for the options may be provided to provide the user with such options.

3.4. Statistical Processing Department

The statistical processing unit has a function of generating statistical information using the target database. The generated statistical information may be displayed on the display device or may be transmitted to the display device for display on the display device.

The statistical information may be the number of objects, the total number of objects, the average value of the number of objects, or the number obtained by statistically processing the number of objects. Further, the statistical information may be the number of objects, the total number of objects, the average value of the number of objects, or the number obtained by statistically processing the number of objects in a predetermined period. As described above, the target may be a person, an animal, a vehicle, or the like. Statistical information may be generated using the information in the target database.

Further, the information used by the statistical processing unit to generate statistical information may be limited information in the target database. The information used to generate the statistics may be limited by the type of object, the time factor, and the location factor. If it is a person, the target type may be gender, age, age group, occupation, facial expression, makeup, person position information, fashion item attributes (type, color, processing, etc.). Time elements may be time zones, weekdays and holidays, weeks, months, seasons, years, and so on. Location elements may be the areas mentioned above, tenants, and floors within the facility, facilities, geographical divisions, and the like.

Further, as described in detail in each of the following embodiments, when the target is a person, the statistical processing unit of the system of each example determines the number of visitors, the number of people related to the area, the number of people in the area, and the products in the area Number of people concerned, number of people estimated to be interested in products, number of people estimated to be interested in advertising, number of visitors per store, ratio of store visitors, number of passersby, number of facility visitors, the number of people ov visitors to facility entrance/exit, the number of people in the same group, and the like (hereinafter, may be referred to as "target number of people") may be generated as a number within a predetermined period or as a number for each predetermined period. Here, the target of the target number of people (for example, the store to visit in the number of visitors, the area in the number of people involving the area, the area in the number of people in the area, the product in the number of people related to the product in the area, the product in the number of people estimated to be interested in the product, advertisements in the number of people estimated to be interested in advertising, each store in the number of visitors per store, stores in the ratio of store visitors, passages in the number of passersby, doorways related to the number of facility visitors, facilities or stores related to the number of visitors to the facility entrance/exit store) may also be referred to as "something related to the target number of people." Similarly, even when the target is not a person, the number related to the area may be generated as a number within a predetermined period or as a number for each predetermined period. In addition, the predetermined period may be an unit of time such as 1 hour, 2 hours, etc., or it may be a half day, 1 day, 1 business day, weekday, holiday, 1 week, 1 month, 3 months, 6 months, a year or the like. Further, the target number of people may be the total number of these predetermined periods or the average value of these predetermined periods. Since the target number of people is generated for each predetermined period, there is an advantage that the number of customers for each predetermined period can be examined. For example, the number of customers may differ depending on the morning, noon, evening, night, morning, afternoon, and the like. In addition, the target number of people may be the total number of weekdays and the total number of holidays, or the average value of weekdays and the average value of holidays, by dividing weekdays and holidays. Since the number of passengers can differ between weekdays and holidays, there is an advantage that the difference between weekdays and holidays can be grasped. In addition, the target number of people may be divided by day of the week and may be the total number of each day of the month or the average value of each day of the month. Depending on the store, the number of customers may differ depending on the day of the week in more detail than on weekdays or holidays, so there is an advantage that the difference in the number of customers due to the difference in the day of the week can be grasped.

In addition, the statistical processing unit may generate the target number of people by classifying them according to their personal characteristics. Human characteristics may be based on human information generated by the application of machine learning techniques. One can understand the difference in human characteristics regarding the target number of people by classifying and displaying them by gender, age group, occupation, facial expression, hairstyle, makeup, fashion item type, fashion item color, etc. In addition, human characteristics may be classified from a plurality of viewpoints. For example, it may be classified from the viewpoints of both gender and age group. Specifically, males in their 20s, males in their 30s, males in their 40s, females in their 20s, females in their 30s, females in their 40s, and the like may be used. Similarly, a man with a dark blue top, a man with a black top, a woman with a blue bottom, a woman with a beige bottom, and the like may be used. Human characteristics may be based on human information generated by the application of machine learning techniques. Based on the human characteristics generated by applying machine learning technology, there is an advantage that human characteristics can be classified with high accuracy and more useful information for marketing can be generated.

In addition, the statistical processing unit may create a graph by classifying the target number of people according to the characteristics of the person. Creating a graph has the advantage of being able to obtain information organized from a more specific point of view. In the graph, the horizontal axis may be the time axis of a predetermined period, and the vertical axis may be divided into human characteristics and used as the target number of people. This has the advantage that the number of people targeted for human characteristics during a predetermined period can be grasped. More specifically, as an example, the horizontal axis is the time zone of the day, and the vertical axis is the target number of people, classified by gender, age group, fashion item type, fashion item processing, and hairstyle. It may be classified by combination or by combination of gender and age group.

In addition, the statistical processing unit may generate a ranking by classifying the target number of people according to the characteristics of the person. The ranking may generate a ranking of human characteristics for the target number of people, or may generate a ranking of the target number of people for a specific person characteristic. The former ranks the characteristics of a large number of people with respect to the target number of people. For example, if the area is related to the target number of people, the person characteristics associated with the area may be in their 40s, 30s, 20s, 50s, etc. in descending order of the number of people. This has the advantage of being able to consider the customer base of the target number of people. The latter ranks one person's characteristics related to a large number of target people. For example, if the target number of people is a product, women in their twenties may be ranked in the order of product A, product B, and product C. This has the advantage of being able to consider what is relevant to a target with a specific customer base.

Further, the target number of people is generated using the position information of the reference image associated with the position of the real image, or areas based on the position information, it has an advantage to generate the number of people easily from the movie captured by the imaging device.

Further, when the position information in the reference image associated with the position in the real image in the moving image is used by using the moving image captured without providing the reference point in the field of view, there is an advantage that the moving image captured in the past can be used. This has the advantage that, for example, the target number of people at different times can be compared. For example, before and after events, the differences of the number of people can be generated, thereby making it possible to examine the effect of the event. The event may be a particular promotion, a particular service, a layout change, and so on. More specifically, the statistical processing unit may generate a target number of people in one period and a target number of people in another period. One time and the other timing respectively corresponding may be a predetermined time period. This has the advantage that before and after the event can be compared numerically. In addition, the statistical processing unit may generate a relationship between the target number of people in the above period and the target number of persons in the other period. Relationships can be percentages or percentages. This has the advantage that the impact on the target number of people before and after the event can be grasped numerically.

In addition, these generated information may be transmitted to and displayed on the facility manager terminal and/or the store manager terminal described later. This has the advantage that the facility manager and/or the store manager can grasp and examine this information.

The information generated by the statistical processing unit may be stored in the statistical processing database.

Here, an example in which the statistical processing unit generates a total number will be described. FIG. 35 is an example of the target database where the target ID1, ID2, ID3 etc. in one real image are determined to belong to a plurality of areas F1, F2, the F3 etc. Here, the time flows as t1, t2, and t3, and at each time, the position information for each object and the information of the area to which the object belongs are defined.

Figure 36:
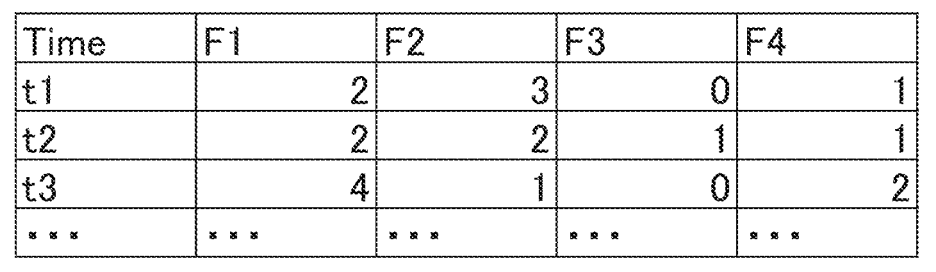

Statistical processing unit may use the content of such object database, and generate the total number of the target in each area. For example, FIG. 36 is a data obtained by counting the results of FIG. 35 by the statistical processing unit. As the time flows from t1 to t3, the position of the target may move, and the number of targets in each area changes according to the time. Further, since the target ID 7 appears at the time of t3, the total number of pieces at t1 and t2 is 6, while the total number of pieces at t3 is 7.

In addition, the statistical processing unit may have a function of counting the number of targets according to the type of target. In FIG. 37, 1 or 2 is added as a type information to each target ID. FIG. 38 is an example in which the number of objects are counted by type with respect to FIG. 37. As an example of the type of object, when the object is a person, it may be a human characteristic.

<Grouping Function>

The statistical processing unit may have a function of counting the number of groups in which the objects are grouped after grouping the objects. Grouping is to treat multiple objects as one group. For example, assuming that the target is a person, the statistical processing unit may group the people and count the number of groups of people. Grouping may be performed based on a certain relationship of objects. For example, grouping may be performed based on the location information of a person. For example, when the position information of the person A and the person B are close to each other, the person A and the person B may be grouped. The proximity of the position information may be determined to be close when the value is equal to or less than a predetermined value. The proximity determination may be made based on one image in the moving image, or may be determined using a plurality of images in the moving image.

Figure 39:
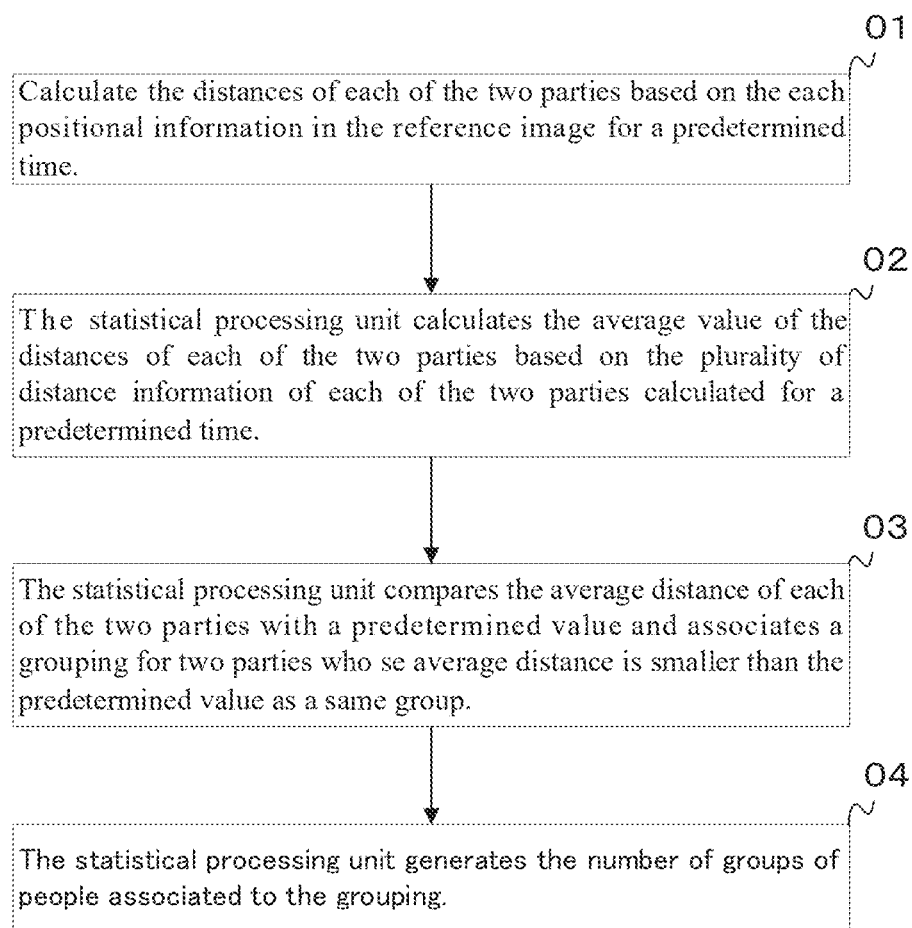
FIG. 39 is an example of a screen displayable by a system according to one example.

Here, an example of a flow in the case where this system has a grouping function of people will be described with reference to FIG. 39. First, as a premise, the positional relationship generation unit of the system generates a relationship between the moving image and the reference image, and target information collecting unit of the present system collects the location information of people in a scene in the video, and the position generation unit of the system generates each position information in the reference image corresponding to each position information of people in one scene in the moving image.

The statistical processing unit calculates the distance between two of the people using each position information in the reference image for a predetermined time.

Next, the statistical processing unit calculates the average value of the distances of each of the two parties based on the plurality of distance information of each of the two parties calculated for a predetermined time.

Next, the statistical processing unit calculates the average value of the distances of each of the two parties based on the plurality of distance information of each of the two parties calculated for a predetermined time.

The statistical processing unit generates the number of groups of people who are related to the grouping.

4. EMBODIMENT

4.1. In-Store Embodiment

Figure 40:
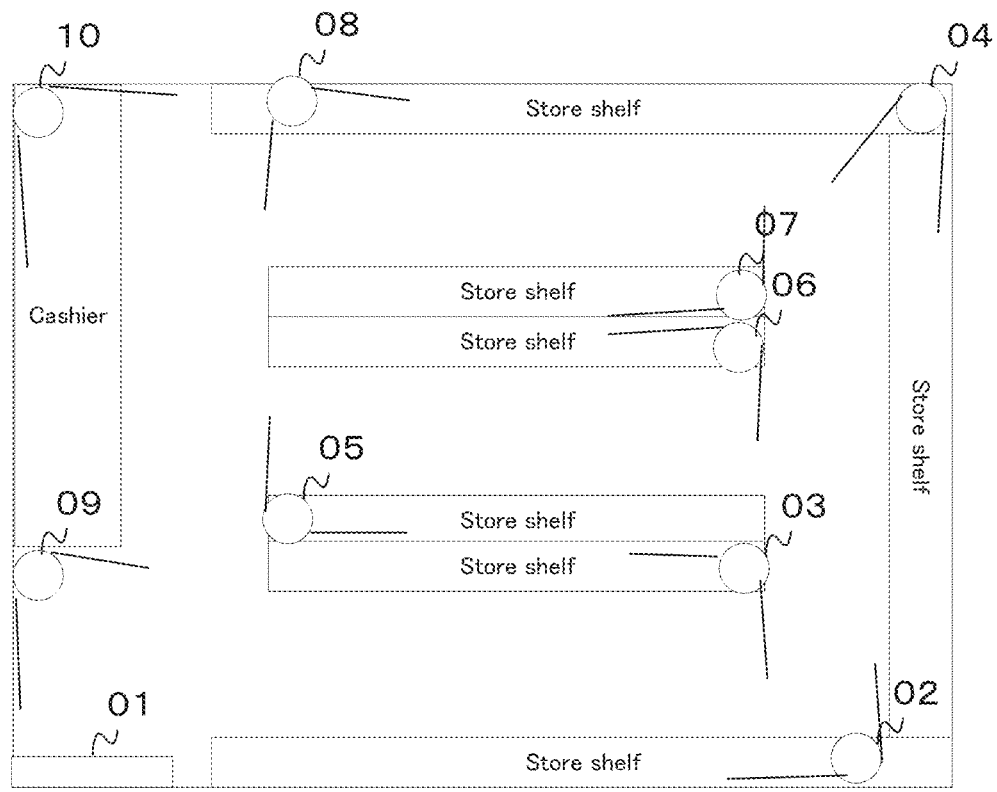
FIG. 40 is an example of a position of the imaging device handled by a system according to one embodiment.

An example system is described with reference to FIG. 40. This figure is a schematic view of the inside of the store. Cameras 02 to 10 are installed so that the customer can be photographed. Specifically, a camera 09 is installed so that a customer who uses the doorway 01 can be imaged. In addition, cameras 03 to 08 are installed so that the customer in front of each product shelf on which the product is provided can be imaged. The camera 09 can image the customers in the cash register portion, but at the same time, it can also image the customers around the product shelves in the field of view. The cameras 02 to 10 may be installed and imaged for security reasons. Further, the cameras 02 and 03, the cameras 05 and 06, and the cameras 07 and 08 each take an image on the aisle through which the customer passes, but they are set up in the field of view including the front of the customer facing each product shelf in the same aisle. The front of the customer may be an image of the face from the front side instead of the front. As a result, the facial expression of the customer, the line of sight of the customer, or the direction in which the face of the customer is facing may be included in the image.

Figure 41:
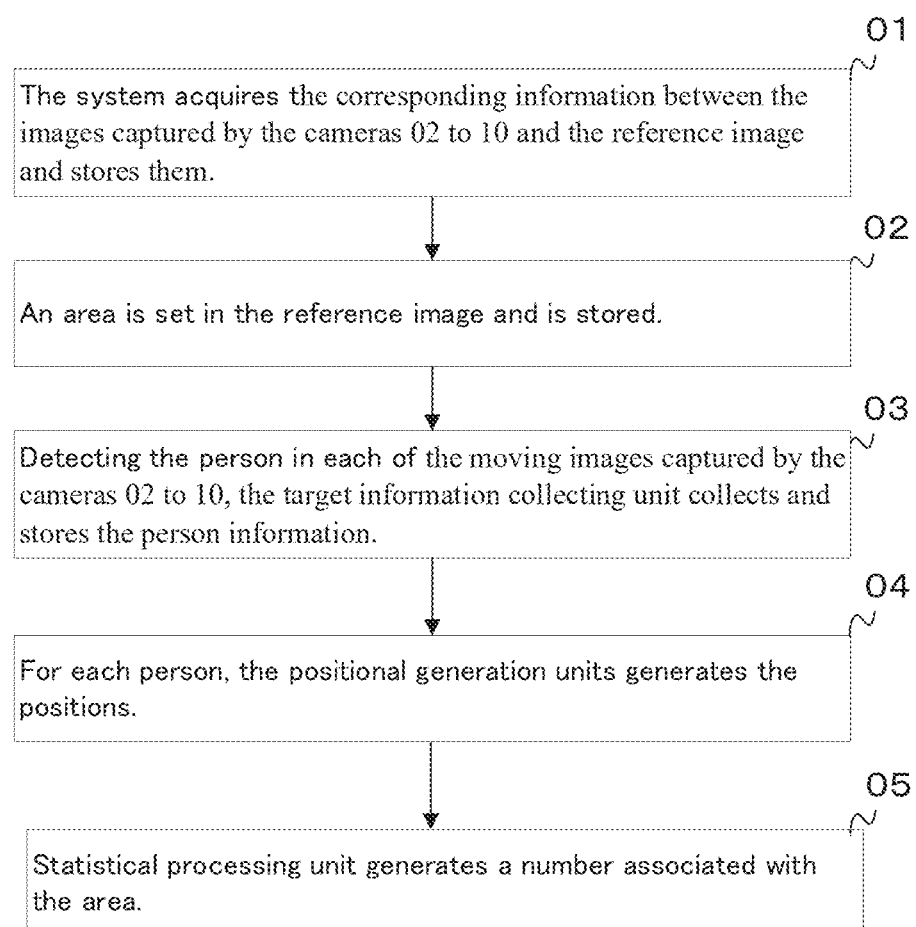
FIG. 41 is an example of a flowchart achievable by a system according to one example.

Next, one flow of an example system will be described with reference to FIG. 41. First, the user inputs the corresponding information between the images captured by the cameras 02 to 10 and the reference image into the system, and the system acquires the information (step 01). The cameras 02 to 10 are nine moving images, and the system may acquire information on the relationship between each stop image of these moving images and the reference image, and during playback of these moving images, information on the relationship with the reference image may be acquired. In addition, the reference image may be prepared in advance by a user. The reference image may be any file as long as it is an image file. For example, it may be a drawing file such as a floor plan of a facility building, a file obtained by scanning a drawing created by a user freehand, or a map or the like.

Figure 42:
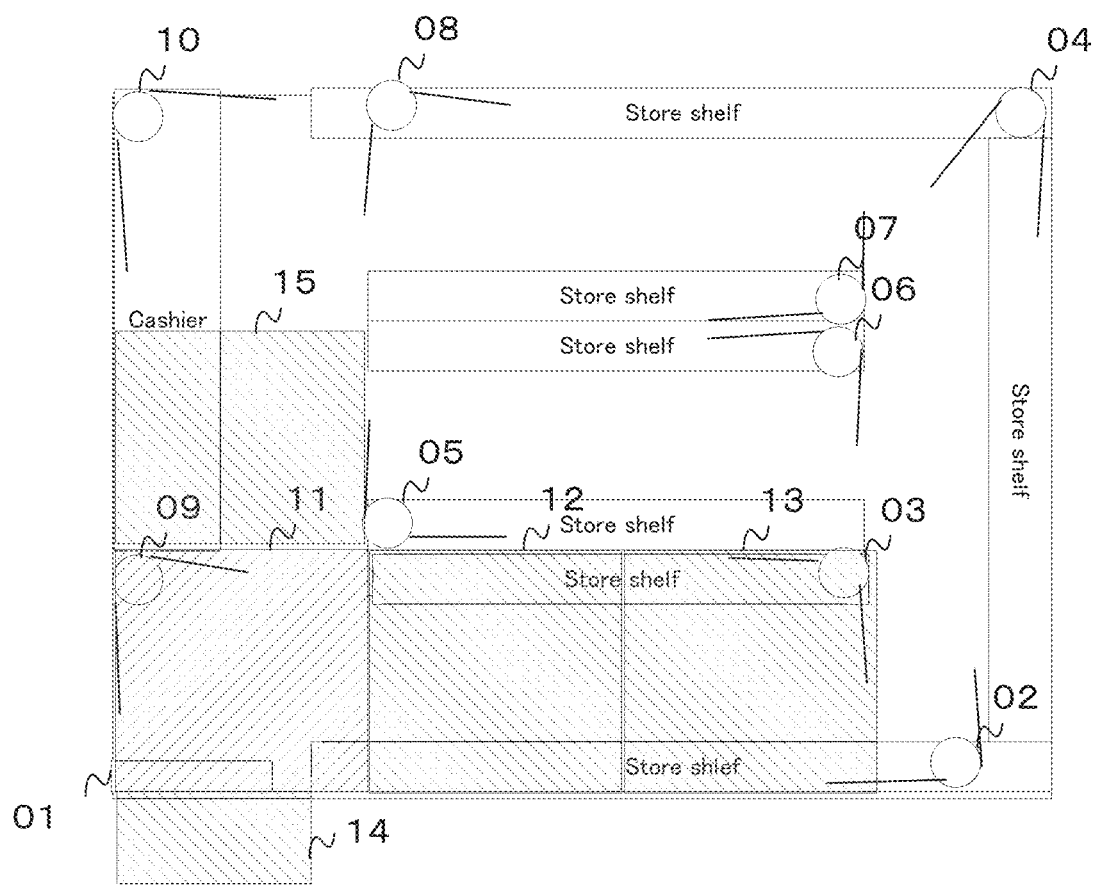
FIG. 42 is an example of an area of a reference image available for a system according to one embodiment.

In addition, the area identification unit sets an area in the reference image. This step may be performed before the above step. FIG. 42 is an example of setting the area. Area 11, area 12, and are 13 are examples, and each area is shown in an easy-to-understand manner by the upper right lower left diagonal line, the upper left lower right diagonal line, and the like. The field of view of the camera 09 mainly covers the area 11, but also includes a part of the area 12. Further, the camera 03 shows a situation in which the area 12 and the area 13 are mainly included, but a part of the area 11 is also included. Further, the camera 02 shows a situation in which the area 12 and the area 13 are included, and other areas (not shown) are also included in the field of view. The area 14 is outside the store, but is a part that enters the field of view inside the camera 09 when the doorway is opened. When the area 14 is set, the movement of a person from the area 11 to the area 14 or the movement of a person from the area 14 to the area 11 can also be included in the target database.

Next, the target information collecting unit collects and stores the person information in the moving image based on the moving image captured by the cameras 02 to 10 (step 02). Further, the position generation unit generates and stores the person position information by using the relationship between the real image and the reference image (step 03).

An example of the target database stored in the target information collection unit and the position generation unit of the system is shown in FIG. 43, for example. FIG. 43 shows an example in which area information and human information are stored at each time. In this target database, a mode including a person ID and a person position is shown as the person information, but other person information may be included in the database, or other person information associated with the person ID may be included in the database.

The statistical processing unit of the system of one example may calculate the number related to the area from the target database. The number related to the area may be calculated by counting the number exceeding the boundary of the area, calculating the number of objects in the area, or processing the number of objects in the area. The information generated by the statistical processing unit may be displayed on the store manager terminal.

Figure 44:
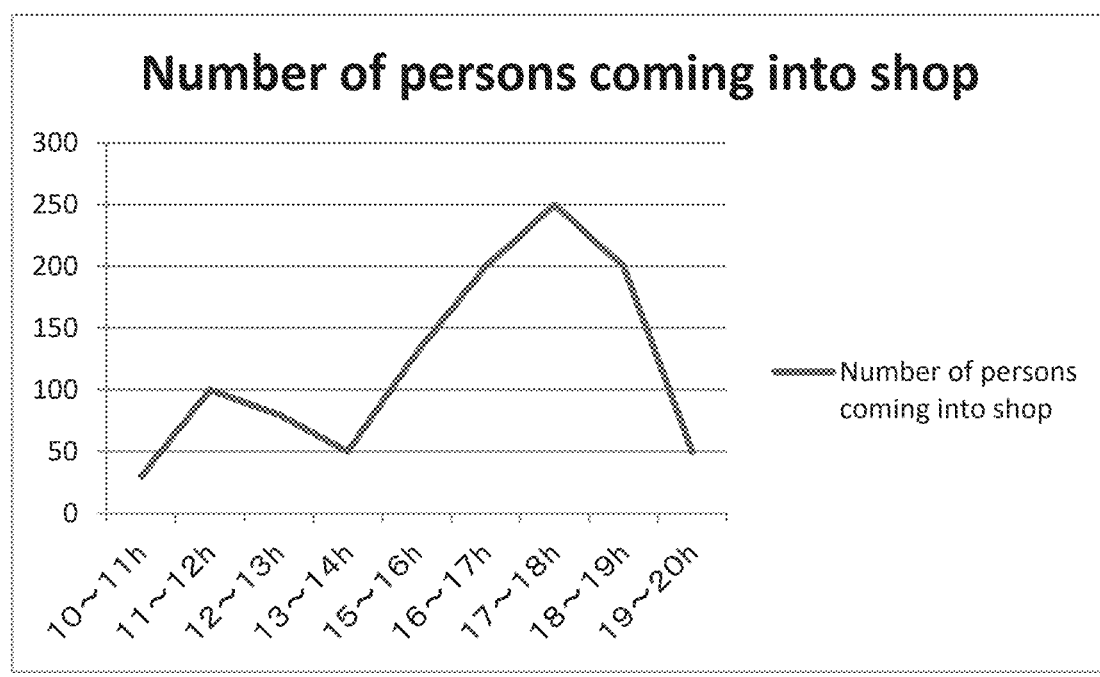
FIG. 44 is an example of a screen displayable by a system according to one example.

In addition, the statistical processing unit of the system of one example may generate the number of visitors. The number of visitors may be generated by calculating the number of movements of people from region 14 to region 11 in the target database. Further, the number of visitors may be generated by calculating the number of movements of people from the area 11 to the area 14. For example, FIG. 44 is an example of displaying the number of visitors counted by the statistical processing unit.

Further, the number of visitors may be generated by using the people collected by the target information collecting unit not only in the area outside the doorway but also in the field of view in the imaging device installed at the doorway. In this case, the target information collecting unit may collect the person information and use the identity determination function to generate the number of visitors to the store. In this case, when the number of visitors is limited within a predetermined period, there is an advantage that people who have visited twice within a predetermined period can be excluded.

Further, as described above, the statistical processing unit of the system of one example may generate the number of visitors for a predetermined period, generate it for each predetermined period, divide it according to human characteristics, divide it by human characteristics and generate for each predetermined period, create a graph by dividing by human characteristics, generate a ranking by dividing by human characteristics, or generate a ranking for each predetermined period by classifying by personal characteristics.

Figure 45:
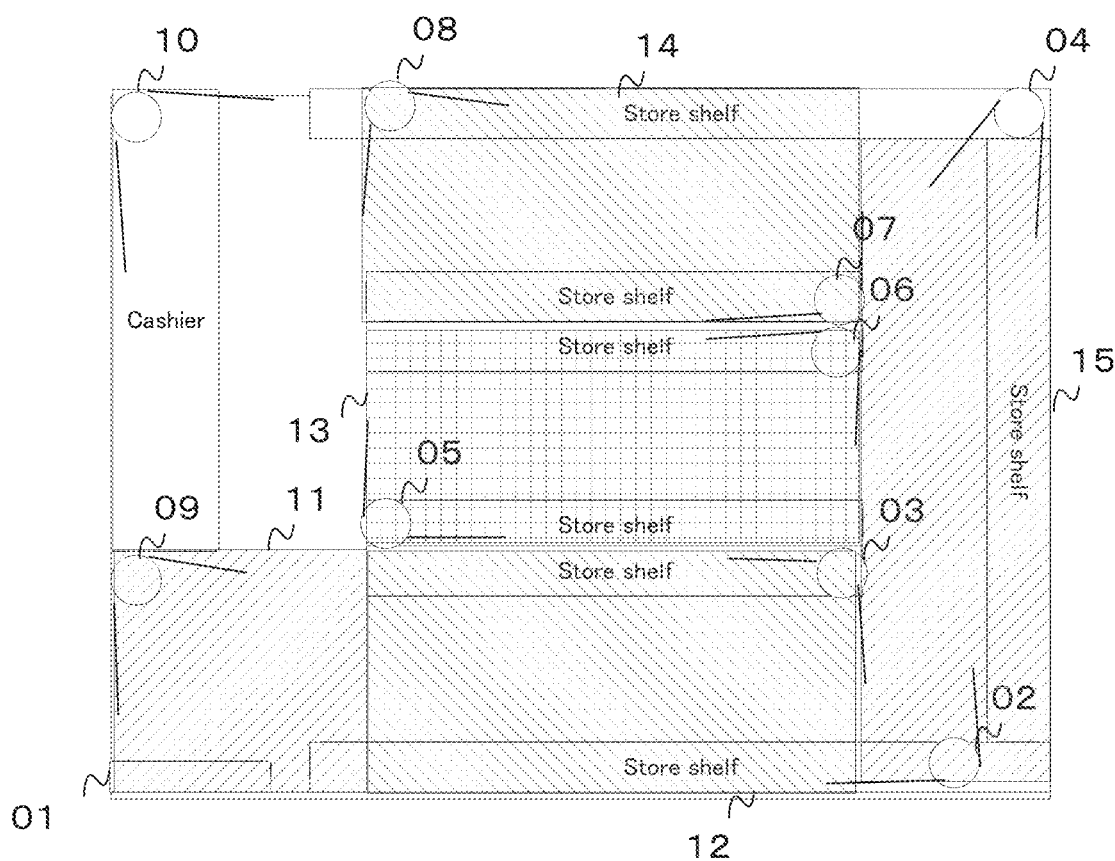
FIG. 45 is an example of an area of a reference image available for a system according to one embodiment.
Figure 46:
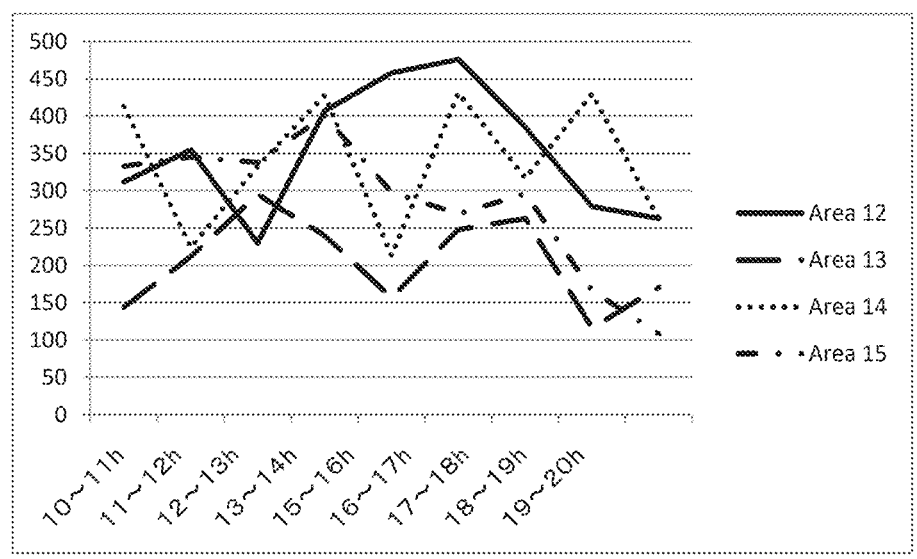
FIG. 46 is an example of a screen displayable by a system according to one example.

FIG. 45 is an example in which the areas 11 to 15 are set, and FIG. 46 is a graph showing the number of people for each time in the area. With such an area, the viewer can understand where the customer exists and where the customer does not exist in the store. In addition, by displaying the number of people for each hour, it is possible to understand the area where the customer exists for each hour. In addition, when the area and the product are connected, the relationship between the product and the customer can be understood. Also, if you connect the area and the advertisement, you can understand the relationship between the advertisement and the customer. In addition, when the area and the event are connected, the relationship between the event and the customer can be understood.

Further, the statistical processing unit of the system of one example may calculate the number of people in the area. The number of people in an area may be displayed in association with the area. By calculating the number of people in the area, there is an advantage that it can be examined according to the situation, such as a large number of store staff will be assigned to places with a large number of people in the area, space will be expanded in places with a large number of people in the area, and guards will be placed in places with a large number of people in the area, or the product in a large number of people in the area are distributed to a small number of people in the area.

Further, as described above, the statistical processing unit may generate the number of people in the area for a predetermined period, may generate it for each predetermined period, or may generate it by dividing it according to human characteristics, may divide it by human characteristics and generate for each predetermined period, may divide it by human characteristics to create a graph, may generate a ranking divided by human characteristics, or may generate a ranking divided by human characteristics for each predetermined period.

To explain more specifically an example of generating a ranking by dividing the number of people in an area by person characteristics, the ranking may generate a person characteristic by ranking for the number of people in a specific area. For a particular person characteristic, the ranking may generate the number of people in a particular area. Those ranking may be displayed. The former ranks the characteristics of a large number of people associated with a particular area. For example, the human characteristics associated with one specific area may be in their 40s, 30s, 20s, 50s, etc., in descending order of the number of people. This has the advantage of being able to consider the customer base in a specific area. The latter ranks areas with a large number of people associated with one person's characteristics. For example, women in their twenties may be ranked in the order of area A, area B, and area C. This has the advantage of being able to consider areas with a specific customer base.

Figure 47:
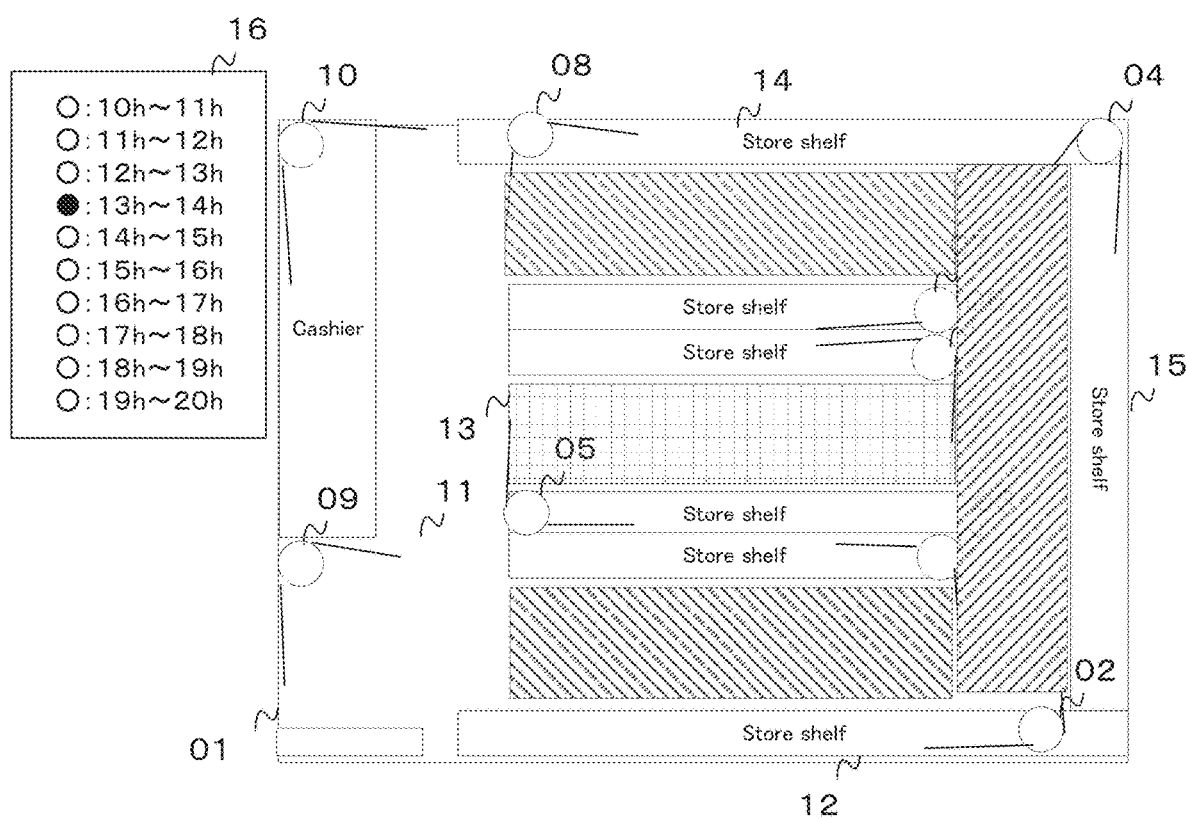
FIG. 47 is an example of an area of a reference image available for a system according to one embodiment.

Further, the statistical processing unit of the system of one example may have a function of displaying the number of people in the area with an image expressing the number of people. The image expressing the number of people may be various as long as it can be intuitively felt by a person. For example, the transparency of the pattern or the transparency of the gradation may be used for the part indicating the corresponding area. The amount of lines, the color, or the mark indicating the number of people. For the transparency of patterns and gradations, the lower the transparency, the larger the number of people, the higher the transparency, the smaller the number of people, the larger the amount of lines, the larger the number of people, and the smaller the amount of lines, the larger the number of people. Those related to human sensibility may be selected, such as indicating that the number is small, the red color indicates that the number of people is large, and the blue color indicates that the number of people is small. Further, the mark may be a predetermined mark. For example, a mark with a large number of people, a mark with a medium number of people, a mark with a small number of people, and the like may be predetermined, and such a mark may be displayed in a target area. FIG. 47 shows an example of displaying in transparency of the pattern. This is an example showing the number of people in the transparency of the pattern in the corresponding area. Further, the display 16 indicates a time zone, and is an example currently indicating 13:00 to 14:00. Associated with the time zone, the patterns in the area may be displayed by an animation showing the number of people in each area in each time zone.

Some images of the number of people mentioned above may be generated in real time. When the number of people in the area is generated in real time, it does not have to be the number of people in the predetermined period, and the predetermined period is 1 minute, 3 minutes, 5 minutes, 30 minutes, 1 hour, etc. It may be a short period of time. When the number of people is displayed in real time, the viewer can understand the degree of congestion in each area. When the statistical processing department of this system displays a small image of the number of people on the terminal for the store so that the manager of the store is the viewer, the staff of the store is placed in the crowded place, the customer is guided, etc. It will be possible to respond appropriately to congestion. In addition, the statistical processing unit of the system in the example may provide information on the congested area to the visitor, for example, in the case of a location near the entrance of the store, so that the visitor of the store is the visitor. There are advantages that can be done. Further, if the place displayed in real time is on the WEB, there is an advantage that the user can understand the congested place on the WEB using the mobile terminal.

Figure 49:
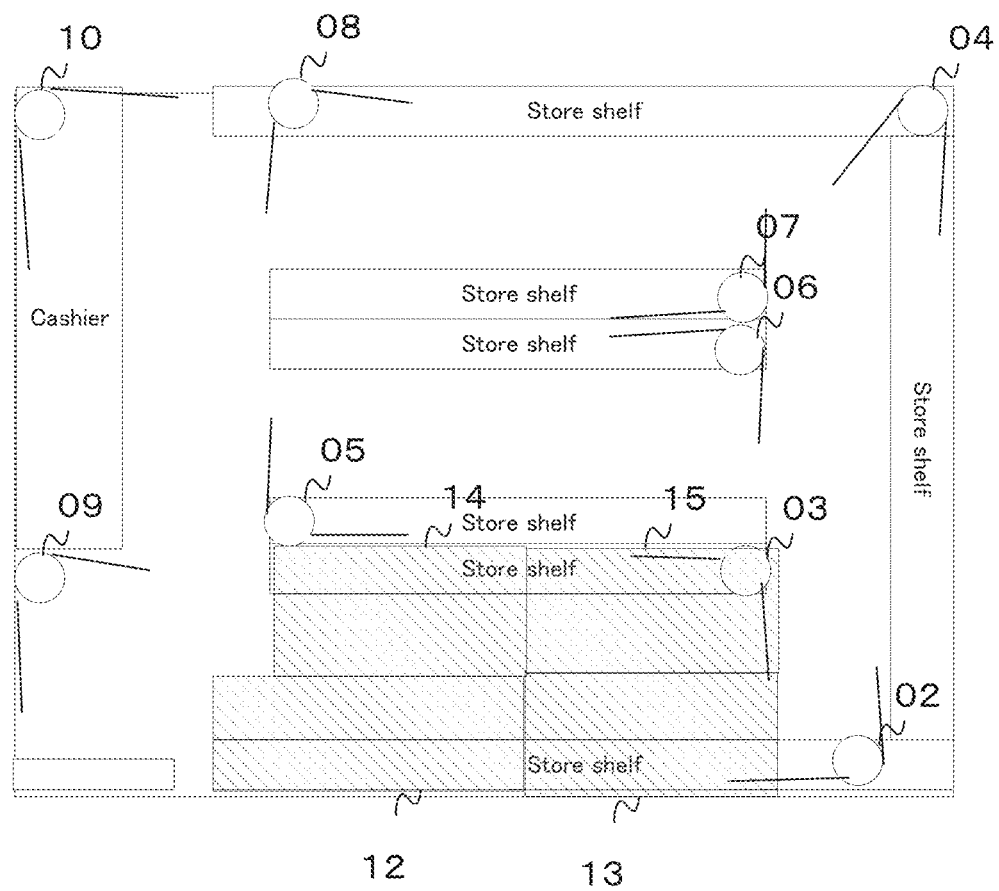
FIG. 49 is an example of an area of a reference image available for a system according to one embodiment.

In addition, the system of one example may include a product database. The product database may include product information and area information. For example, FIG. 48 is an example of a product database. It contains product ID and area information. Specific information about the product is included in another database or the like, and may be associated with the product ID as a relational database. Further, the area information may correspond to the place where the product is provided. Further, FIG. 49 is an example in which the areas 12 to 15 are set corresponding to the product shelves including the products A to D.

The statistical processing unit of the system of one example may generate the number of people in the area associated with a specific product in the product database (in the document of the present application, it may be referred to as "the number of people related to the product in the area").

As described above, the statistical processing unit may generate the number of people related to the products in the area for a predetermined period, for each predetermined period, or for each person's characteristics. However, it may be divided by human characteristics and generated for each predetermined period, it may be divided by human characteristics to create a graph, it may be divided by human characteristics and a ranking may be generated, or it may be generated by people. Ranking may be generated for each predetermined period by classifying by characteristics.

To explain more specifically an example of generating a ranking by dividing the number of people related to products in the area by person characteristics, the ranking is based on the ranking of the number of people related to a specific product, even if the person characteristics are generated. Alternatively, the number of people related to a specific product may be generated in the ranking for a specific person characteristic. Those ranked may be displayed. The former ranks the characteristics of people who are associated with a large number of people with respect to the number of people related to one specific product. For example, the person characteristics associated with the number of people related to one specific product may be in their 40s, 30s, 20s, 50s, etc. in descending order of the number of people. This has the advantage of being able to consider the number of customers for a particular product. The latter ranks the number of people related to a product with a large number of people related to one person characteristic. For example, women in their twenties may be ranked in the order of product A, product B, and product C. This has the advantage of being able to consider areas with a specific customer base.

In addition, when it is calculated based on the area based on the position information in the reference image associated with the position in the real image in the moving image using the moving image captured without providing the reference point in the field of view, in the past There is an advantage that the number of people in the area can be calculated using the captured moving image. More specifically, one example system the statistical processing unit, a first timing captured in the first time based on the moving image, the first time position in the real image in the moving reference image associated with the location based on the 1st period product information generated based on the area based on the position information of and the 2nd period moving image captured in the 2nd period, it was associated with the position in the real image in the 2nd period moving image. The second period product information generated based on the area based on the position information in the reference image may be generated. This information may be displayed in contrast. Since the sales of a product are affected by the location of the sales floor, there is an advantage that the overall profit in the store can be examined depending on the location where the same product is sold.

Figure 50:
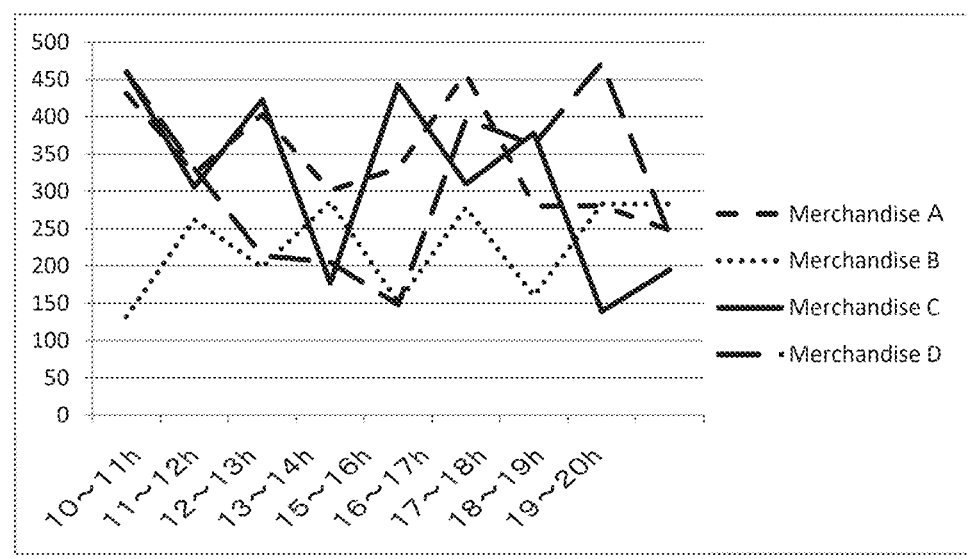
FIG. 50 is an example of a screen displayable by a system according to one example.

Note that FIG. 50 is an example in which the number of people is counted for the area corresponding to each product for each time zone. An example system includes a product database, associates products in the product database with area information, and shows products related to the area in which the customer is located in relation to the number of customers, thereby relating to the product of interest to the customer. It becomes possible to understand the information.

In addition, the statistical processing unit of the system of one example may generate the number of people who have obtained information that can be estimated to be interested in the product instead of the number of people in the area (in the document of the present application, referred as "the number of people estimated to be interested in the product"). When the statistical processing unit has such a configuration, there is an advantage that the number of people who are more interested in the product can be generated more precisely. "Information that can be presumed to be interested in a product" includes, for example, information that a person stays in a specific area for a predetermined time or longer, information that the person's face is facing the product, and information that the person's line of sight is facing the product, information that a person's arm or finger is facing the product, and so on. In the case of information in which a person stays in a specific area for a predetermined time or longer, the product in the product database associated with the specific area may be the product of interest. If the person's face is facing the product, the person's line of sight is facing the product, or the person's arm or finger is facing the product, these products are of interest. More specifically, the product presumed to be interested may be specified from the position of the product in the product database, the human position information, and human behavioral information, human behavior supplemental information by using the report, the product database, the human position information in the reference image, the direction of the human action supplemental information, human behavior information.

As described above, the statistical processing unit may generate the number of people who are presumed to be interested in the product for a predetermined period, may generate it for each predetermined period, or divide it according to human characteristics. It may be divided by human characteristics and generated for each predetermined period, a graph may be created by dividing by human characteristics, or a ranking may be generated by dividing by human characteristics. However, rankings may be generated for each predetermined period by classifying them according to personal characteristics.

To explain more specifically an example of generating a ranking by classifying the number of people who are estimated to be interested in a product by personal characteristics, the ranking generates human characteristics in the ranking for the number of people related to a specific product. Alternatively, the number of people related to a specific product may be generated in the ranking for a specific person characteristic. Those ranked may be displayed. Examples of the former and the latter are as described above, for example.

Further, as described above, the statistical processing unit of the example system is in the reference image associated with the position in the real image in the first period moving image based on the first period moving image captured in the first period. In the real image in the second period video based on the first period product information that is presumed to be of interest generated based on the area based on the location information of and the second period video captured in the second period. The second period product information, which is presumed to be of interest, is generated based on the area based on the position information in the reference image associated with the position of. In this case, there is an advantage that the relationship between allocation and profit can be grasped more precisely.

FIG. 51 is an example of ranking products based on information that can be estimated that a customer is interested in a product. Here, as information that can be estimated that the customer is interested in the product, it is the total number of people who have been in the target area for a predetermined time or more. Here, the statistical processing unit may calculate the number of people who have been in a predetermined time or more by counting the number of people who have been in a specific area for a predetermined time or more in the target database.

Incidentally, in the above human action information using the case, the statistical processing unit may calculate, using the degree of weighting of interest that has been set with respect to each person action information for each person behavior information, the sum of the value after applying the weighting, as the degree of interest in the product. Here, a method of reflecting various weights in interest other than the sum may be used. FIG. 52 is an example of weighting set for each person action information. Statistical processing unit may calculate it using subject database and each person action information using weighting associated with, one of the human action information by the customer pattern and associated et al is to have based weighting. By calculating each person's behavior in consideration of weighting, there is an advantage that the meaning of each person's behavior can be reflected in the degree of interest in the product and can be used as a marketing material. Further, the counted number may be used and displayed as a ranking as shown in FIG. 52.

FIG. 53 is an example of displaying ranking of the human characteristic based on the information where an interest is estimated to one product. This figure is an example of ranking based on the customer's information on gender and age group.

Further, FIG. 54 is an example of displaying a ranking the characteristics of other people by using the information presumed to be interested in one product, and ranks the gender, age group, fashion item type, and fashion item color. When a ranking related to fashion item information is generated in a store that sells fashion items, it is possible to understand what kind of fashion item the customer has and what kind of fashion item they are interested in. It will be possible to propose more appropriate fashion items to the visitors.

In addition, there are cases where a user wants to perform various analyzes such as classifying and analyzing products in more detail or analyzing by different product classifications in terms of product marketing. In that case, the user may set a more detailed area or set a different area depending on the area specifying unit of the system of one example. Further, a product database in which the relationship with the product according to the changed area may be set may be used. In this case, using the already recorded video, the position generator of the example system generates an area for each person using the position information of each person's ID based on the newly set area. The statistical processing unit may generate various information, graphs, rankings, etc. by using the newly set relationship between the product and the area.

In addition, the target collected by the Target Information Collection Department is not limited to people. For example, it may be a pet or a guide dog. The target information collecting unit of the example system may collect information for the pet, and the position generating unit may generate the position. The statistical processing unit of an example system may specify the number of pet visits by counting the number of pets. Further, the target information collecting unit of the system of one example may specify the type of pet, and the statistical processing unit of the system of one example may specify the number of visits according to the type of pet. The type of pet may be, for example, one based on a size such as large size, medium size, small size, or a specific type of pet. For example, when targeting a pet dog, it may be based on the size of a large dog, a medium-sized dog, a small dog, or the like. These sizes may be determined based on the height of the dog from the floor to the top of the head and the length from the tip of the dog's nose to the tail or buttocks. Further, regarding large dogs, medium-sized dogs, and small dogs, a predetermined range is predetermined, and the type of pet may be specified depending on whether or not it is within such a range. As long as it is a specific type of pet, for example, in the case of a dog, it may be a specific type such as a golden retriever, a poodle, or a shiba dog.

The information gathering unit may identify the buyer of the pet based on the relationship between the pet and the person. The relationship between the pet and the person may be set, for example, as the person whose position between the pet and the person is closest, or the pet lead of the pet and the person may be detected. In addition, the relationship between the pet and the person may be specified based on the overall positional relationship from the time the person enters the store to the time the person leaves the store. For example, in the moving image from entering the store to leaving the store, the average value of the closeness between the person and the pet may be calculated, and the person closest to the pet may be specified as the buyer.

Further, although the product has been described above, the advertisement may be similarly configured. That is, instead of the database in which the area and the product are associated, the database in which the area and the advertisement are associated may be used. Thus, through the region, the customer is interested is advantageous to collect the information of the advertisement that is estimated to have. It also has the advantage of being able to collect information about the customer base who is interested in advertising through the area. Examples of the advertisement related to the store include an advertisement 11 installed by the store 02 as one of the overviews of the store in FIG. 55, an advertisement 12 installed by the store 03 as an overview of the store, and the like. The advertisement may be a poster, a digital signage, a show window, or the like, as long as it is intended to make the product, entertainment, or the like known to many people in order to attract customers.

More specifically, for example, an example system may include an advertising database that associates and stores areas with advertisements.

Further, instead of the case where the customer can be estimated to be interested in the product, the case where the customer can be estimated to be interested in the advertisement may be used.

As described above, the statistical processing unit may generate the number of people who are presumed to be interested in the advertisement for a predetermined period, may generate it for each predetermined period, or divide it according to human characteristics. It may be divided by human characteristics and generated for each predetermined period, a graph may be created by dividing by human characteristics, or a ranking may be generated by dividing by human characteristics. However, rankings may be generated for each predetermined period by classifying them according to personal characteristics.

To explain more specifically an example of generating a ranking by classifying the number of people who are estimated to be interested in an advertisement by personal characteristics, the ranking generates human characteristics in the ranking for the number of people related to a specific advertisement. Alternatively, the number of people related to a specific advertisement may be generated in the ranking for a specific person characteristic. Those ranked may be displayed. Examples of the former and the latter are as in the case where an advertisement is used instead of the above-mentioned product, for example.

Further, also in the above-mentioned advertisement, the number of people who can be estimated to be interested in the advertisement may be weighted based on the human behavior information. For example, in the case of an advertisement, the weight of the line of sight may be heavier than that of other actions because it is not something that is picked up and viewed. Moreover, only the line of sight may be considered. Further, as one aspect of weighting, the distance between the area where the advertisement is installed and the person position information may be considered. When the distance is long, the weight may be lower than when the distance is short, and the number of people who can be estimated to be interested in the advertisement may be calculated. In this case, if the distance is longer than a predetermined distance, it may be configured not to calculate the number of people, assuming that the advertisement is practically invisible. Also, the size of the advertisement may be considered. This is because the larger the advertisement, the farther it can be seen, and the more likely it is that you are interested in the advertisement. That is, the distance between the area where the advertisement is installed and the person position information and the size of the advertisement may be used as one aspect of weighting.

4.2. Embodiment 2

Figure 55:
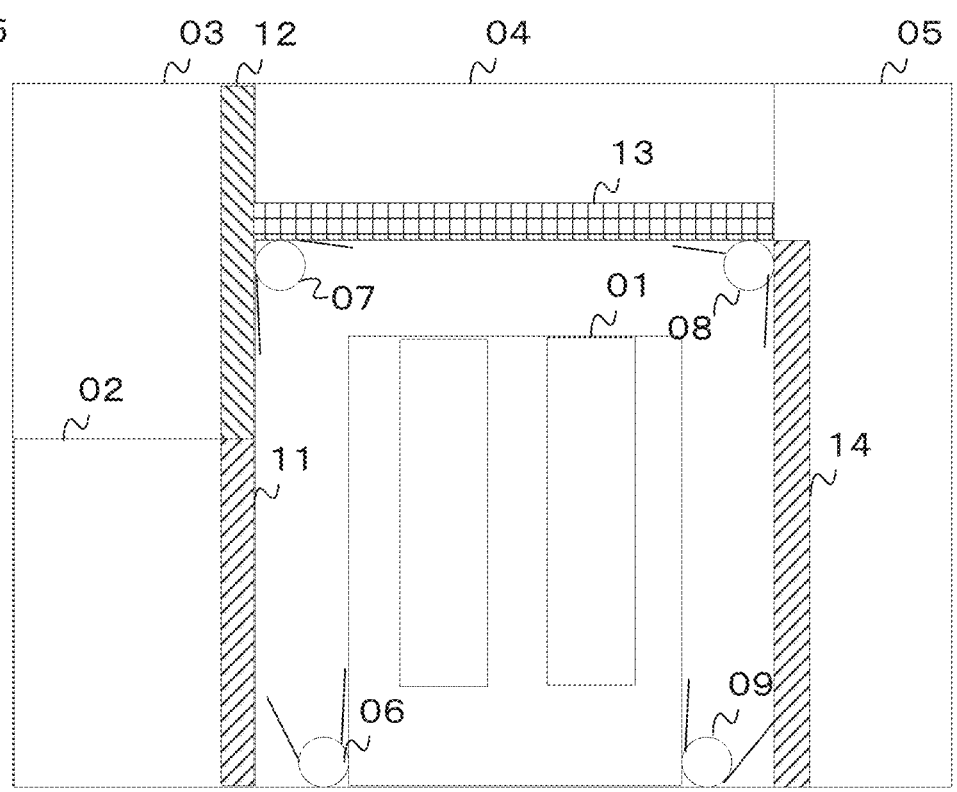
FIG. 55 is an example of an area of a reference image available for a system according to one embodiment.

Next, the embodiment is an embodiment outside the store. The same applies to the outside of the store as well as the inside of the store. For example, FIG. 55 shows one floor in a building, the escalator 01, a plurality of stores indicating a 02 or 05. The cameras 06 to 09 outside the store each have a certain field of view and image the outside of the store. Further, the advertisements 11 to 14 may be advertisements that the stores 02 to 05 put out on the front of the store.

Also in this figure, as in the first embodiment, the area may be set within the field of view of each camera 06 to 09. It is preferable that the camera can cover all areas in the site, but it is not always necessary to cover all areas.

An example system may have a database containing information within the facility (sometimes referred to as a "facility database" in the documents of the present application). The facility database may store the area set in the reference image in association with the information in the facility. For example, the facility database stores each area set in the reference image in association with items such as stores, entrances, exits, information centers, toilets, elevators, escalators, and aisles in the facility. This information may be stored in the facility database by the user inputting an item in association with the area when setting the area by using the area identification unit. Areas and items may be set one-to-one. For example, when it is not necessary to set multiple areas for one item in relation to products, advertisements, places, etc., such as items such as elevators and escalators, there is an advantage that items can be identified from the areas . . . . In addition, if it is more useful to investigate the behavior of customers, such as in stores and aisles, where it is more useful to classify the location of products and the location of advertisements, multiple areas may be set for one item. Further, as described above, since the areas may be layered, a plurality of areas may be set for one item. For example, the latter one area may be possible to be specified for the one store by dividing the inside of one store into ten areas and storing the area and setting one area corresponding to the one store. Further, one area may be set for a place including a plurality of stores such as a floor.

Figure 56:
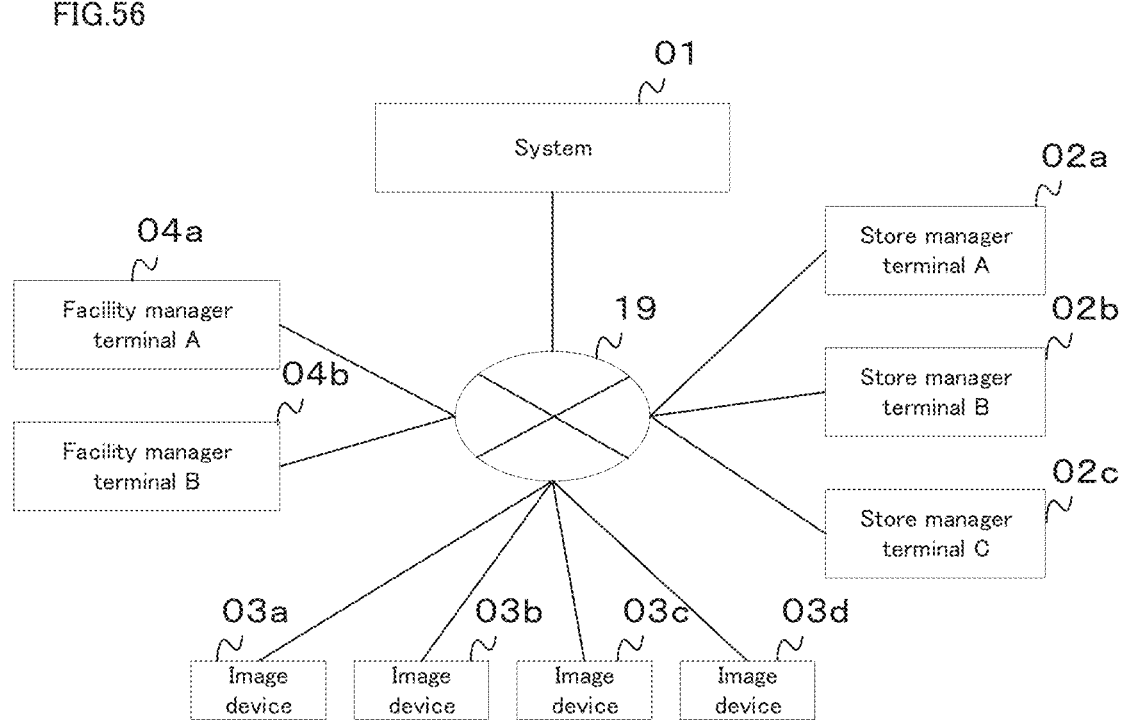
FIG. 56 is a block diagram showing a connectable configuration example of a system according to one embodiment.

Further, the system of one example may be configured to be viewable by each store manager terminal, or may be configured to be viewable by a facility manager terminal that provides a place to a plurality of stores. The manager of the facility may be the owner of the facility or the renter of the facility. FIG. 56 illustrates an example of the system of the present embodiment. The system 01 of this example is configured to be connected to the store manager terminals A to C and the facility manager terminals A and B04 via the network 19. The store manager terminals A to C are expected to be used by the manager of each store in the facility. On the other hand, the facility manager terminal is supposed to be used by the facility manager. The facility manager terminal may be installed at the site of the facility, or may be installed at a place different from the facility. For example, it is assumed that a commercial organization having a plurality of large-scale commercial facilities is installed in a place different from the facilities so that the situation of each facility can be centrally managed. Further, the system 01 of this example may be connected to the imaging devices 03a to 03d. By connecting to the image pickup devices 03a to 03d, there is an advantage that the image captured by the moving image can be processed in real time.

Further, the statistical processing unit of the system of one example may have a security function for each store manager terminal. Since the information generated by the statistical processing unit may be information such as the number of visitors related to other stores and the personal characteristics of visitors, the information that can be viewed by the store user's account on the store manager terminal may be limited to information about the store of himself or herself.

On the other hand, by sharing information about various stores in the facility, there is a possibility that profits can be improved as a whole. Therefore, for example, the database that links the store and the product/service field is connected to the system of this example, and information about other stores that do not compete with one store can be viewed on the store administrator terminal of one store. With this configuration, the store manager does not provide information to competing stores and can browse information on other non-competitive stores, which has the advantage of being able to further consider improving the store.

As in the case of the first embodiment, various statistical information may be calculated for the outside of the store. For example, in the embodiment 1, the number of visitors in the shop product was likewise, visiting each store in the facility the toll product may be. In this case, an example system the statistical processing section is, for the store A to C each for a plurality of stores the number of visitors may be generated. In addition, the generated information may be displayed on the facility manager terminal. Since the system of one example can display the number of visitors for each store, there is an advantage that the facility manager can grasp the number of visitors for each store.

As described above, the statistical processing unit may generate the number of visitors for each store for a predetermined period, may generate it for each predetermined period, or may generate it by classifying it according to personal characteristics. It may be divided by human characteristics and generated for each predetermined period, it may be divided by human characteristics to create a graph, it may be divided by human characteristics and a ranking may be generated, or it may be generated by human characteristics. The ranking may be generated for each predetermined period by dividing by.

When the statistical processing unit of the system of one example generates the number of visitors by ranking for each store and displays it on the facility manager terminal, the store facility manager is in the order of the number of visitors and/or the number of visitors is small. There is an advantage that you can grasp the store.

More specifically, the case where the number of visitors for each store is divided by the person characteristics and the ranking is generated will be described more specifically. The ranking may generate the ranking of the person characteristics for the number of visitors for each store. It may generate a ranking of the number of visitors for each store for a particular person characteristic. Those ranked may be displayed. The former ranks the characteristics of people who visit a large number of people for one store. For example, the personal characteristics associated with one store may be in their 40s, 30s, 20s, 50s, etc., in descending order of the number of people. This has the advantage of being able to collect information on the customer base of a specific store. Therefore, when it is sent to the store manager terminal, there is an advantage that it becomes possible to consider products and services based on the customer base. Further, when it is transmitted to the customer manager terminal, the facility manager has an advantage that more specific information about the store can be collected. The latter ranks stores with a large number of visitors based on one person's characteristics. For example, 5 for 0 Young Women, store A, store B, in the order of store C as descending order of the number of visitors is rankings, may be and so on. This has the advantage of being able to consider a group of stores visited by a specific customer base. Further, when it is transmitted to the facility manager terminal, the facility manager has an advantage that the nature of each store and the arrangement of stores in the entire facility can be examined. For example, there is an advantage that information for categorizing stores according to the customer group can be collected, such as separating the floor for women and the floor for men, and the place for young people and the place for elderly people. Human characteristics may be based on human information generated by the application of machine learning techniques. The ranking may be in descending order of the number of people, in ascending order of the number of people, or in both the order of the large number of people and the order of the small number of people. Based on the human information generated by applying machine learning technology, the human characteristics are classified with high accuracy and then ranked, which has the advantage of being a more useful material for marketing.

In addition, the statistical processing unit of the system of one example generates a ratio between the number of people passing through the aisle where the entrance and exit of the store touches and the number of visitors to the store (sometimes referred to as "store visitor ratio" in the documents of the present application).

Here, the number of people passing through the passage may be generated by using the real image related to the passage, or may be generated by using the area in which the area associated with the passage is set. The area associated with the aisle preferably has a shape that covers the width of the aisle, but it is not always necessary to completely cover the width of the aisle. It is sufficient to use a reference image for the real image captured by the image pickup device having a field of view that can be detected.

As described above, the statistical processing unit may generate the store visitor ratio for a predetermined period, may generate it for each predetermined period, may generate it by dividing it according to personal characteristics, or may generate it. It may be divided by characteristics and generated for each predetermined period, it may be divided by human characteristics to create a graph, it may be divided by human characteristics to generate a ranking, or it may be divided by human characteristics. Then, a ranking may be generated at predetermined period intervals.

By generating the store visitor ratio for one store, the statistical processing unit of one example system has an advantage that it is possible to grasp what percentage of the number of people passing by is visiting the store. Since the store visitor ratio is the relationship between the aisle and the number of visitors, it may be calculated for each entrance/exit. Here, the store visitor ratio may be the ratio of the number of visitors visiting from the one entrance/exit to the number of people passing through the aisle in contact with the one entrance/exit. In this case, there is an advantage that the number of visitors can be grasped for each entrance/exit.

In addition, when the ratio of each store visitor related to each store is displayed on the facility manager terminal, the facility manager can grasp which store receives many visits from the aisle, for example, regarding the overview of the store. It has the advantage of being able to collect knowledge. In particular, when the percentage of visitors to each store related to each store is displayed in a ranking format on the facility manager terminal, it is possible to understand the favorable appearance and the unfavorable appearance as an overview for visiting people from the aisle, for example. There is an advantage that such information can be shared with new stores entering the facility. In addition, when the store visitor ratio for each store is displayed in the ranking format on the store manager terminal, each store manager obtains information on the other store visitor ratio to obtain the appearance and layout. It has the advantage of being able to collect information to improve.

Also, the shop visitor rate according to one of the store, when displayed in the store manager terminal according to the one of the store, the store manager may store visitors rate and can understand the advantage. Further, when one store has a plurality of entrances and exits and a store visitor ratio is generated for each entrance and exit, it is possible to generate a store visitor ratio for each entrance and exit in the store. From the viewpoint of effective utilization of the site, there is an advantage that information for examining the layout of the store, including the blockade of entrances and exits, can be collected.

Further, the statistical processing unit of the system of one example may generate a store visitor ratio at one time and a store visitor ratio at another time for one store. When the store visitor ratio at one time and the store visitor ratio at another time generated by the statistical processing unit of the system of one example are transmitted to the store manager terminal, the store manager is in the first time. It has the advantage of being able to compare store visitor rates at other times. This has the advantage of being able to collect information about which layout can increase the percentage of store visitors when, for example, the layout of the store at one time is different from the layout of the store at another time.

Further, when the statistical processing unit of the system of one example generates the number of people passing through the above-mentioned passage for each predetermined period, there is an advantage that the usage status of the passage in the facility can be grasped for each predetermined period. More specifically, when the number of people passing through the aisle is divided into predetermined periods and displayed on the facility manager terminal, the facility manager can grasp the degree of congestion of the aisle according to the time, for example. It becomes possible to manage according to the time zone.

In addition, when the number of people passing through the aisles around the store is divided for each predetermined period and displayed on the store manager terminal, the store manager can grasp the usage status of the aisles for each predetermined period. For example, it has the advantage of being able to collect information for considering promotions such as timely sales.

Further, the statistical processing unit of the system of one example may generate the number of people passing through the above-mentioned passage by dividing it into human characteristics. In this case, there is an advantage that the usage status of the passage can be grasped for each person characteristic. In addition, the number of people passing through the passage may be generated by dividing the number of people passing by into human characteristics for each predetermined period. In this case, there is an advantage that the human characteristics can be grasped based on the time zone and the usage status of the passage can be grasped. When the configuration is displayed on the facility manager terminal, for example, when there are many office worker-like people or office lady-like people during lunch time, it is possible to grasp information such as being used as a lunch meal.

In addition, regardless of each store, attention may be paid to the entrance/exit of the facility, and information on the person who uses the entrance/exit of the facility may be collected. Statistical processing section of an exemplary system, the entrance of the facility, out of the facility (in the present application document, it is also referred to as "facility visitors") visitors to visit the facility through the inlet may generate it.

As described above, the statistical processing unit of the system of one example may generate the number of facility visitors for a predetermined period, may generate it for each predetermined period, or divide it according to human characteristics. Alternatively, it may be divided by human characteristics and generated for each predetermined period, it may be divided by human characteristics to create a graph, it may be divided by human characteristics and a ranking may be generated. Rankings may be generated for each predetermined period by classifying by personal characteristics. The number of facility visitors may be generated for each entrance/exit of the facility, or may be generated collectively for all the entrances/exits in the facility. The former has the advantage of being able to grasp information about the number of people visiting the facility at each entrance/exit, and has the advantage of being able to take various measures at each entrance/exit. For example, advertising and safety management. Further, in the latter case, there is an advantage that the information of the facility as a whole can be grasped. Further, the former and the latter information may be individually displayed on the facility manager terminal, or both the former and the latter information may be displayed on the facility manager terminal. When both the former and the latter information are displayed on the facility manager terminal, there is an advantage that both the overall tendency and the tendency of each entrance/exit in the facility can be viewed and examined.

In addition, the statistical processing unit of the system of one example sets an area not only in the aisle in contact with the entrance/exit of the store but also in the aisle in the facility, and based on the number of people related to the area in the aisle, the number of people passing through the aisle (in the documents of the present application). "Number of people passing by") may be generated.

That is, as described above, the statistical processing unit of the system of one example may generate the number of people passing by for a predetermined period, may generate it for each predetermined period, or divide it according to human characteristics. Alternatively, it may be divided by human characteristics and generated for each predetermined period, it may be divided by human characteristics to create a graph, it may be divided by human characteristics and a ranking may be generated. Rankings may be generated for each predetermined period by classifying by personal characteristics.

Further, when the statistical processing unit of the system of one example generates the number of people passing through the above-mentioned passage, there is an advantage that the usage status and the user status of the passage in the facility can be grasped. More specifically, if the passerby number of passages are displayed facility administrator terminal, facility managers can grasp the use state of the channel, for example, management of the safety and grasp the clientele can be an advantage.

In addition, the installation has been advertising in a facility interest for that there is an estimated person is the number even with, in the same manner as the first embodiment, to collect the information may be able to display. Examples of the advertisement installed in the facility include advertisements 11, 12, 13, 14 in FIG. 55.

That is, as described above, the statistical processing unit may generate the number of people who are presumed to be interested in the advertisement for a predetermined period, may generate it for each predetermined period, or classify the number according to the person's characteristics. It may be generated by dividing it by human characteristics, it may be generated by a predetermined period, it may be divided by human characteristics to create a graph, or it may be divided by human characteristics to generate a ranking. Alternatively, the ranking may be generated for each predetermined period by classifying by personal characteristics.

In addition, when the number of people who are estimated to be interested in each advertisement related to each store is displayed on the facility manager terminal, the facility manager is interested in what kind of advertisement in which store by more people. It has the advantage of being able to grasp whether or not it is being used, and for example, collecting knowledge about the installation of advertisements and the content of advertisements. In addition, when the number of people estimated to be interested in each advertisement related to each store is displayed on the store manager terminal in the ranking format, each store manager acquires information on the ratio of other store visitors. This has the advantage of being able to collect information to improve the appearance and layout.

4.3. Embodiment 3

The system of this embodiment may have a tracking unit. The tracking unit has a function of collecting information about a specific target. The tracking unit may collect information on a particular person.

The tracking unit may collect information about a specific person X in the target database collected by the target information collection unit. For example, FIG. 57 shows data extracted from a target database that includes information about a specific person X. Here, the data in FIG. 57 shows that the person X changes from time t1 to tN, from F1 to F25 in the case of a region, and from (t1$x$1, t1$y$1) to (tNx1, tNy1) in the case of position information in the reference image. It shows that it is moving to. The tracking unit can track the position of the person X based on such a target ID and position information or area information in the reference image.

4.3.1. Embodiment 3.1

Figure 58:
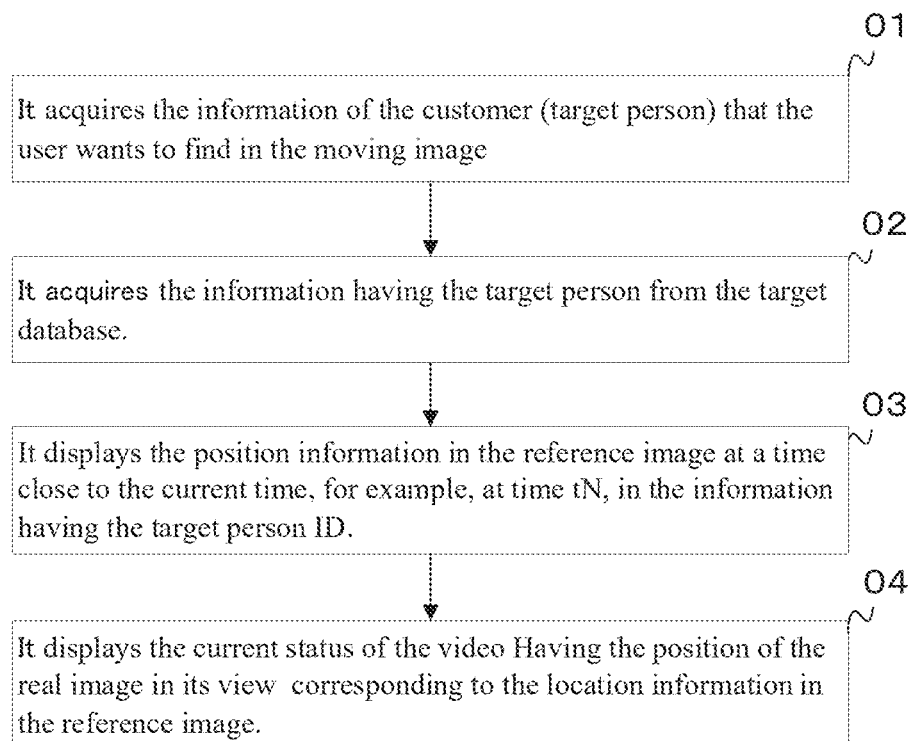
FIG. 58 is an example of a flowchart achievable by a system according to one example.

For example, you may want to find a specific customer in a store or facility. For example, you want to know where your lost customer is, you want to deliver your lost item to a customer who has forgotten something, you want to find a customer who has a problem such as theft, and so on. Examples of facilities include facilities such as department stores and amusement parks. In addition, a plurality of imaging devices may be installed in the facility. Not all areas of the facility need to be covered by the imaging device, but the more areas covered, the more likely it is to find a customer. Here, it will be described with reference to FIG. 58.

First, the system of the present embodiment acquires the information of the customer (target person) that the user wants to find in the moving image (step 1).

Next, the information having the target person ID is acquired from the target database (step 2). For example, the data shown in FIG. 57 is acquired. In FIG. 57, the target ID is also included, but if it is clear as a specific person ID, the target ID may not be present. Further, although both the position information and the area in the reference image are included, either one may be used.

Next, the system of the present embodiment displays the position information in the reference image at a time close to the current time, for example, at time tN, in the information having the target person ID (step 3). The user knows that the customer he/she is looking for is in the location information.

The system of the present embodiment, the reference image display the current status of the video to fit the position of the real image corresponding to the location information of the field of view may be (Step 4). As a result, the user can confirm that the customer he/she is looking for is actually in the field of view of the imaging device.

In the above description, the statistical processing unit of the system of one example has described the case where the target database has been created for the video. However, when the target database is not created even if the video is present, the video is first described as a case where the target database has not been created. The target information collection unit may create the target database. Here, the target information collection unit may create a target database only for the information of the person to be searched. In this case, since the creation target is limited, there is an advantage that the amount of data is small and the processing time is short. If the information on the positional relationship with the reference image is not generated for the video, the user may use the positional relationship generator to search for a person such as an imaging device in the facility. The positional relationship is input between the real image based on the moving image related to the image pickup device installed in a certain place and the reference image. In this case, the user may use the positional relationship estimation function.

Further, the statistical processing unit of the system of the example may virtually show the movement of the target person by animation on the reference image. By being displayed as an animation, there is an advantage that it becomes possible to better understand the movement of a person. More specifically, in the case of searching for a lost child, it is possible to understand the process of getting lost, and in the case of theft, etc., it is possible to understand the process of escaping. There is also the possibility to obtain thought-provoking information about the equipment of the future facilities. Here, the target person may be one indicated by an icon or the like. Further, the animation may be displayed by shortening the reproduction speed of the moving image by a predetermined ratio such as 1/10 or 1/100 of the speed.

Further, by applying the techniques described above, positional information Y time t1 one or more people, instead of the current time, is also possible to check where you are at a certain time (time tx). This considers, for example, the case where there are two events A and B in the facility. It may be used to identify where the participants of event A are moving during the time zone of event B. When event A and event B are related, the participants involved in event A stayed in a place other than event B during the time zone of event B, so that event A and event B can be used. It becomes possible to consider B.

The statistical processing unit may calculate statistical information regarding the participation rate for a plurality of events. For example, when there are events A to C, information on the characteristics of the participants of the event can be collected by calculating the participation rate of the combination. For example, in the case of three events A to C, the participation rate of the combination is the ratio of those who participated only in event A and the percentage of those who participated only in event B, with the number of visitors in the event time zone as the population. Percentage, percentage of people who participated only in event C, percentage of people who participated in events A and B, percentage of people who participated in events A and C, percentage of people who participated in events B and C, may be generated. In addition, it may be classified according to the characteristics of the people who participate in each event.

The target to be tracked has been described above as a person, but the same applies even if the target is a vehicle. In the case of a vehicle, the target information collection unit collects the vehicle type, color, vehicle number, and the like. First, the user acquires the vehicle information to be tracked in step 1 described above. Then, in step 2 described above, information about the vehicle to be tracked is acquired from the target database. Then, in step 3, among the information having the vehicle information to be tracked, the position information in the reference image is displayed for the information close to a specific time. This reveals the current location information of the vehicle you want to track.

4.3.2. Embodiment 3.2

Figure 59:
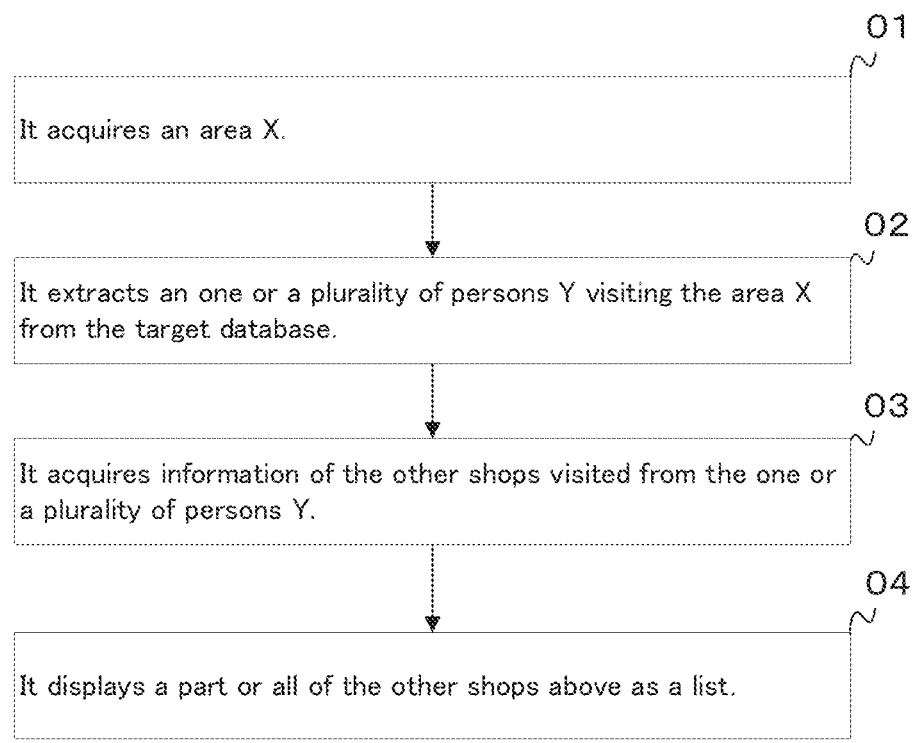
FIG. 59 is an example of a flowchart achievable by a system according to one example.

In the facility having a plurality of stores, store X associated with the person, to the day, the other the throat of this visit or through the may want to investigate whether. The technique in such a case will be described with reference to FIG. 59.

The system of this embodiment first acquires the area x (step 1). Here, the area x may be one or more areas set in the reference image. For example, when targeting a customer who visits a store, it may be one or more areas corresponding to the store. Further, when targeting a customer who is interested in a specific product in the store, it may be one or a plurality of areas corresponding to the product. Further, when targeting a customer who has purchased in a store, for example, it may be one or a plurality of areas corresponding to a cashier (cash register) in the store.

In the area X, information may be acquired from the area specified by the user, for example, by selecting an area in the reference image.

Next, one or more people Y who visited the area X are extracted from the target database (step 2).

Next, information on other stores visited is acquired from the data of the one or more people Y (step 3). Here, the other store may be specified as a store associated with the area in the facility database from the area associated with the location information of Y using the facility database described above.

Next, a part or all of the above other stores is displayed as a list (step 4). When the area x is an area corresponding to the store X, the display allows the viewer to understand what kind of other store the person who visited the store visited, and allows the viewer to get the marketing materials about the trend regarding the person who visits the store X. Also, when the area x is something corresponding to a particular product in the store X, by the display, the viewer can understand what other stores the customers who are interested in the particular product visited and obtain marketing materials regarding customer trends related to the specific product. Further, when the area x corresponds to the cashier (cash register) in the store X, the display allows the viewer to understand what other stores the customer who purchases the product in the store X has visited and allows the viewer to obtain marketing materials regarding the trends of customers who have purchased products at store X.

Further, in any of the above in step 4, the statistical value relating to the person who visited each store may be displayed in association with each store. In this case, it is possible to understand the statistical number of each store visited by the customer, and it is possible to obtain marketing materials regarding the customer's trends. Here, the statistical value may be a total, an average, or a number that has undergone various statistical processing useful for other marketing materials. For example, if it is a total, it may be calculated daily, weekly, monthly, monthly, or yearly. The average may also be an average such as daily, weekly, monthly, and so on.

In addition, the list may display statistical values related to people who visit the store in a predetermined order in a ranking. For example, when statistical values are displayed in a ranking in descending order, there is an advantage that the viewer can easily pay attention to a store having a particularly large number of people.

Further, the above list may be limited to the stores visited before the visit of the store X. In this case, the viewer can understand what kind of store he/she visited before visiting the store X, and can obtain marketing materials regarding the customer's trends.

Further, the above list may be limited to the stores visited after the visit of the store X. In this case, the viewer can understand what kind of store he/she visited after visiting the store X, and can obtain marketing materials regarding the customer's trends.

Further, in step 2 of the system of the present embodiment, one or more persons Y may be extracted by using the person attribute information of the customer. For example, the customer's personal attribute information may be gender and/or age. When such personal attribute information is used, it is possible to obtain information on the target customer, such as gender and/or age.

As another example, the customer may use the human behavior information shown in the area x defined in relation to a specific product. In the human behavior information, for example, as described above, the weighting of interest in the product can be set. Therefore, for example, only the customers who have specific human behavior information are targeted, and the target of the ranking is the target of the above list. Alternatively, the weighting may be used to calculate the total number of weighted values or to rank the rankings.

Further, in the above, the store is specified from the facility database, but other entrances, exits, and/or passages in the facility may be specified. In this case, it can collect information of the customer who is the target of the survey uses what entrances, exits, and/or passages. In particular, it has the advantage of being able to collect useful information for marketing such as setting up advertisements.

Here, more specifically, an example of collecting information on the usage status of the entrance/exit of a facility in association with a specific store will be described. In this case, since it is possible to know which doorway in the facility the person using the specific store uses, the manager of the specific store has the advantage of being able to consider providing advertisements in relation to the doorway of the facility. Statistical processing unit of an exemplary system may generate the number of people who visits a particular store, through the entrance of the facility, (herein referred as "store visitors through doorway" in the present application.).

As described above, the statistical processing unit of the system of one example may generate the number of visitors to the facility entrance/exit store for a predetermined period, may generate it for each predetermined period, or divide it according to human characteristics. It may be divided by human characteristics and generated for each predetermined period, a graph may be created by dividing by human characteristics, or a ranking may be generated by dividing by human characteristics, and may be divided by human characteristics for each predetermined period. The number of visitors to the facility entrance/exit store may be generated for each entrance/exit of the facility, or may be generated collectively for all the entrances/exits in the facility. The former has the advantage of being able to grasp information about the number of people visiting the facility at each entrance/exit, and has the advantage of being able to take various measures at each entrance/exit. Further, in the latter case, there is an advantage that the information of the facility as a whole can be grasped. Further, the former and the latter information may be individually displayed on the store manager terminal, or both the former and the latter information may be displayed on the store manager terminal. When both the former and the latter information are displayed on the store manager terminal, there is an advantage that both the overall tendency and the tendency of each entrance/exit in the facility can be viewed and examined.

Similarly, information may be collected about a specific aisle in association with a specific store.

4.3.3. Embodiment 3.3

The system of this embodiment is a system that detects a group of facility visitors. By collecting information on a group of facility visitors, it will be possible to consider measures to further improve the profitability of commercial facilities. There may be various types of groups, for example, one person, a friend, a couple (male and female), a child, and the like.

The detection of the group of the facility coming to the store may be detected by a variety of methods. The method described below is calculated based on the distance between people because it is assumed that the group will move at a short distance.

<Group Detection Method 1>

The tracking unit generates information on the time and position (or area) of each facility visitor from the target database, and generates the distance of each person. FIG. 60 is an example of data obtained by calculating the position of each person and the distance between people at each time.

Here, the calculation amount of the distance between people may be reduced by various methods. For example, among the target data, the data sampled and extracted at the time may be the target. For example, 1 per second of or the information, per 2 seconds of the may be calculated as information. This is because a person cannot move a long distance in a short time, and even if it is omitted, it is considered that the calculation of the distance is not adversely affected. In addition, regarding the calculation of the distance, those with a clearly long distance may be excluded from the target. For example, those who are on different floors in the facility or who belong to different areas may be excluded from the calculation of the distance.

The group is then detected based on the distance between the people. The distance between people may be in various ways. For example, the distance between people has been extracted from the above data use and it may calculate the distance between one person and another person at the same time, and the variation of the distance can be calculated. The variation may be standard deviation or variance. This is because it is assumed that the same group will move at a certain distance. People whose variation is smaller than a predetermined value may be detected as the same group.

Further, for example, the distance between people is determined by calculating the distance between one person and another person at the same time using the above-extracted data, and among those distances, a predetermined distance. The variation in distance may be calculated for the distance below the threshold value of. By setting the threshold value to a predetermined threshold value or less, it is possible to exclude cases where the noise is scattered in each store and moves according to each person's interests, and there is an advantage that noise in so-called variation can be excluded.

Further, for example, as the distance between people, the distance between one person and another person at the same time is calculated using the above-extracted data, and the distance between those distances is the first. You may calculate the ratio of the time of the thing which is less than or equal to the second predetermined distance for the thing of the distance which is less than or equal to the predetermined threshold value of 1. By limiting to the first predetermined threshold value or less, there is an advantage that it is possible to exclude the time zone in which the person moves according to the above-mentioned interests of each person. In addition, setting the distance to the second predetermined distance or less extracts that people in the same group are very close to each other. In addition, the time zone that excludes the time zone that moves according to interest is taken as a whole, and the ratio of the time zone that is very short distance is used, and depending on the ratio of the time zone that the distance between people is short distance, and the ratio of the time zone of a short distance is high, it would be a high possibility of the same group.

<Group detection method 2>

The group detection method 2 is a method of detecting a group by using camera images of a specific limited place, instead of targeting a large number of camera images in a facility. Since this method is calculated based on the camera image of a limited place, it is a method that can exclude noise and the like while reducing the amount of calculation.

As a camera in a specific limited place, it may be a camera installed at the entrance/exit of the facility. In this method, when there are various tenants in the facility, even if the same group may visit the tenants of interest to each person, there is a high possibility that they will enter or leave together at the entrance/exit. The idea is to emphasize the image of the camera at the doorway.

Tracking unit may determine a plurality of people entering the substantially same time or almost the same time within the video captured by the camera installed at the entrance and a plurality of people entering the substantially same time or almost the same time within the video captured by the camera installed at the exit as people in the same group. In this case, if some people are missing the in the same video in the same time, if it the difference is a few seconds, it can be determined as a person in the same group.

Hereinafter, a more specific flow will be described.

First, reference images are prepared for each real image corresponding to the image pickup device installed near the entrance and near the exit, and the positional relationship generation unit receives input of the user and generate a position information between each real image and the corresponding reference image (step 1).

Next, the target information collecting unit collects the person information in the real image captured near the entrance and the vicinity of the exit and stores it in the target database. Here, the target information collecting unit may generate the person movement information based on the person information in the real image. FIG. 61 is, for example, an example of the data of the target database regarding the entrance and the exit related to this embodiment. Here, the person movement information is simply referred to as a person who enters the facility and a person who leaves the facility. In this figure, the person Ds 001, 002, and 005 are entered at the entrance 1. Note relates time, human ID001 and 005, 002 (003 from 001 by subtracting) the difference there is considered to be substantially the same time. On the other hand, at the entrance/exit 2, the person IDs 005 and 001 appear at substantially the same time. On the other hand, the person ID 002 exits from the doorway 3 at a time different from the time 050.

Next, the tracking unit determines that a plurality of people who enter within the predetermined time and exit within the predetermined time are in the same group (step 3). In the above example, since the person IDs 001 and 005 enter the facility at substantially the same time and leave the facility at substantially the same time, they are determined to be people in the same group. On the other hand, the person ID 002 is not determined to be in the same group because he/she exits from different entrances/exits at different times.

The person who enters the facility and the person who exits the facility may be specified by the position of the image pickup device, the image pickup direction of the image pickup device, and whether the person is in front of or behind the imaged person. For example, the target information gathering department identifies a person who has imaged the front with an imaging device installed toward the exit of the facility at the entrance and exit of the facility as a person entering the facility, and installs the person at the entrance and exit of the facility toward the entrance of the facility. A person who has imaged the front surface with the image pickup device may be identified as a person leaving the facility.

From the viewpoint of crime prevention, the image pickup device installed at the entrance/exit of the facility is often installed in the facility with the direction of entry and the direction of exit. When these image pickup devices are used, the image pickup device directed in the entering direction captures only the back surface of the person leaving the facility, and it may be difficult to determine the identity with the person in the person database by the image pickup device alone. In this case, the identity of the person may be determined using both the image pickup device in the entry direction and the image pickup device in the exit direction. That is, since the image pickup devices in the entry direction and the exit direction each image the front and the back, the same person uses the sameness related to the fashion item attributes (for example, the type, color, pattern, processing, etc. of the fashion item). And the position in the reference image associated with the position in the real image based on the camera in the entering direction and the position in the reference image associated with the position in the real image based on the camera in the exit direction. The identity may be determined by the identity of the position of the person, or the identity of the person may be determined by using both the fashion item attribute and the identity of the position in the reference image.

Next, each group may be divided into group types. The group type may be classified into, for example, one person, a friend, a male and female group, and a child. Here, for men and women and families with children, the age group and gender specified by the target information collection department may be used. As for the group type, an age group may be further set for each group. For example, the age groups of friends and men and women may be average values, and the age groups with children may specify the age groups of children and the age groups of parents, respectively.

Next, the flow after specifying the group type will be described. First, the statistical processing section of an exemplary system, the group (in the present application document, sometimes referred to as "number of groups") number of the product may be. In addition, the number of groups may be generated separately for each group type. In addition, the number of groups may be generated at predetermined time intervals.

When the statistical processing unit of an example system divides the number of groups of facility visitors into group types and displays them on the facility manager terminal, there is an advantage that the number of groups can be used for marketing. For example, the facility to visitors to the case Lone there are many, in the facilities of the store, children such as increasing the number of stores that related to, there is an advantage that can be used in the selection of a new store.

In addition, when the statistical processing unit of the system of one example divides the number of groups of the number of facility visitors into group types and displays them on the facility manager terminal at predetermined time intervals, it is assigned to a specific group in a specific time zone. It has the advantage of being able to collect information on the planning of combined events. For example, if you have many children at a particular time, you have the advantage of being able to organize an event for children.

In addition, the statistical processing unit may create a graph by classifying the people who make up the number of groups according to their personal characteristics. Creating a graph has the advantage of being able to obtain information organized from a more specific point of view. In the graph, the horizontal axis may be the time axis of a predetermined period, and the vertical axis may be divided into human characteristics and used as the number of groups. This has the advantage that the number of the same group of human characteristics in a predetermined period can be grasped. More specifically, as an example, the horizontal axis is the time zone of the day, and the vertical axis is the number of groups, which can be classified by gender, age group, fashion item type, fashion item processing, and hairstyle. It may be classified by combination or by combination of gender and age group.

In addition, when the statistical processing unit of the system of one example divides the number of groups of the number of facility visitors into group types and displays them in the ranking at predetermined time intervals on the facility manager terminal, from the viewpoint of the number of visitors, which would be an advantage to be grasped.

In addition, the statistical processing unit may calculate the ranking by classifying the group types according to personal characteristics. The ranking may generate a ranking of the person characteristics of the people who make up the group for one group type, or may generate a ranking of the number of groups for a specific person characteristic. The former ranks the characteristics of people with a large number of people for one group type. For example, if one group type is a friend, human characteristics in order large number of groups, 1 0's, 2 0's, 6 0 generations, it may be the 50s, and the like. This has the advantage of being able to consider the customer base of one group type. The latter ranks a group type with a large number of people for one person characteristic. For example, women in their twenties may be ranked in the order of friends, men and women, and one person. This has the advantage of being able to consider a specific group of customers.

4.4. Embodiment 4

Figure 62:
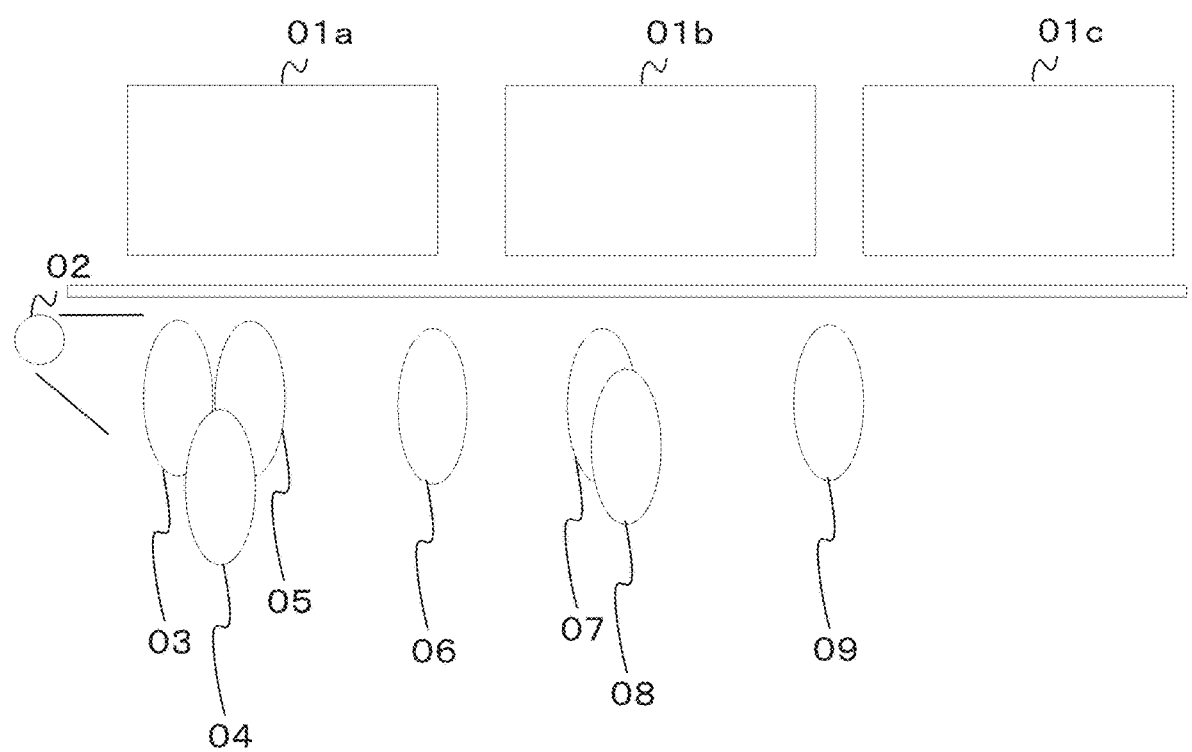
FIG. 62 is an example of a situation available for a system according to one example.

The system of this embodiment is a system for a person waiting for a taxi. FIG. 62 is an example showing a line of people waiting for a taxi at a place waiting for a taxi. Taxi 01a, 01b, 01c are taxis waiting for a taxi. The camera 02 takes an image of a line of people waiting for a taxi, and shows a state in which there are people 03 to 09 waiting for a taxi.

In the taxi industry, it is preferable to identify how many taxis are needed when a person is waiting for a taxi. A taxi may be taken by one person or by multiple people. This is because a taxi is generally a group of people involved, such as family and friends, who often take a single taxi. Therefore, the number of people waiting for a taxi does not become the required taxi. If you prepare as many taxis as there are people waiting for a taxi, you will have to dispatch an extra taxi to the taxi stand, which can be a loss of opportunity elsewhere. On the other hand, if a small number of taxis are dispatched, the taxis cannot be dispatched even though there are people waiting for the taxi.

Figure 63:
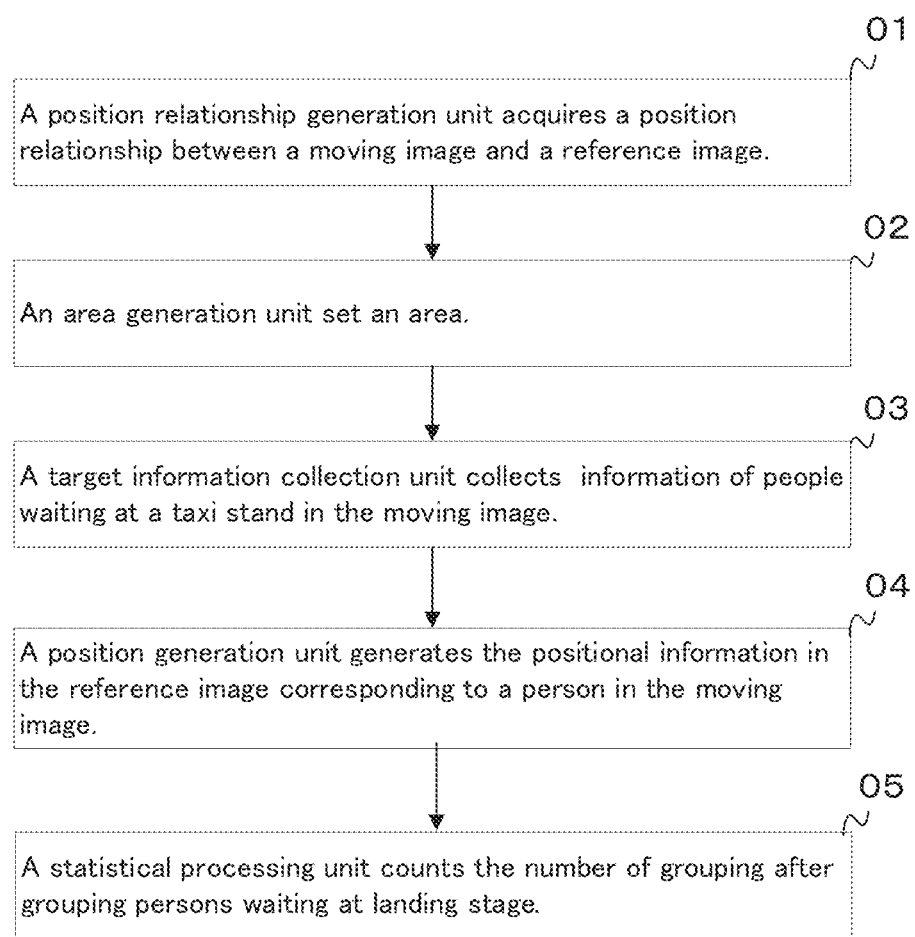
FIG. 63 is an example of a flowchart achievable by a system according to one example.
Figure 64:
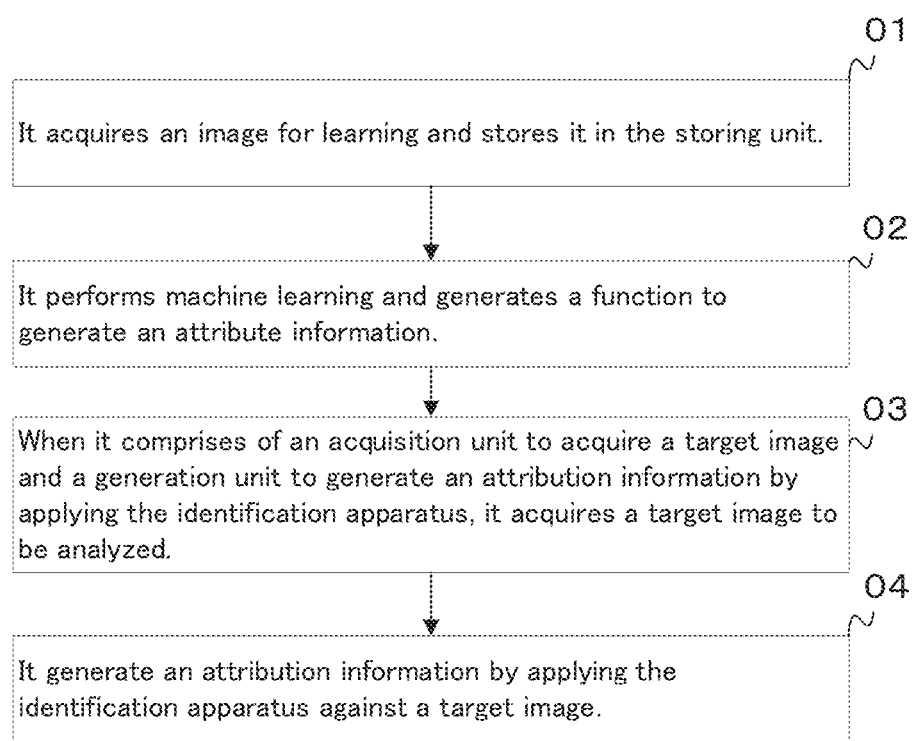
FIG. 64 is an example of a flowchart of a system according to one example.

This system predicts the number of groups of people waiting for a taxi. If the number of groups can be predicted, by preparing taxis corresponding to the number of groups, it is possible to prepare taxis for at least the number of groups waiting at the taxi stand. In this system, the number of groups is an idea calculated based on the distance of people waiting at the taxi stand. That is, strangers tend to wait a certain distance away, while groups such as family and friends tend to wait shorter distances than strangers. Therefore, this system calculates the number of groups by measuring the distance of people waiting at the landing. In the following, the flow will be described with reference to FIG. 63.

The user of this system first inputs the positional relationship between the moving image captured by the camera 02 and the reference drawing as shown in FIG. 61. That is, the positional relationship generation unit acquires the positional relationship between the moving image and the reference drawing (step 1). If there are multiple cameras in the waiting area of the platform, the positional relationship is set accordingly.

Next, the user of this system sets the area (step 2). The area may be configured to be automatically generated by the area specifying unit. In that case, the burden of setting the area is reduced.

Next, the target information collection unit of this system connected to the camera of the taxi stand detects and collects information for people waiting at the taxi stand using the video obtained from the camera of the taxi stand (step 3). The target information collection department collects location information in the video of people waiting at the landing. The target information collection unit may collect information other than the location information of people.

Then, the position generator of the present system, a human in the video location information in the reference image corresponding to generate (Step 4).

Next, the statistical processing unit of this system groups the people waiting at the platform and counts the number of groups (step 5).

4.5. Embodiment 5

The following embodiment is an example of application to animals. For example, in a facility dealing with animals such as zoo, ranch, stables, pet shop (in the present document, the place where a target animal is placed may be referred as "exhibition facilities".), etc., it can be used to investigate the animal behavior. Here, the behavior of animals in the zoo will be described as an example.

First, the user of the system of the present embodiment first prepares a drawing such as a sketch of the exhibition facility, and creates a reference image which is an image file based on the drawing.

Next, the system of this embodiment the positional relationship generation unit includes, a position information in the video that is captured by the imaging device comprising in the visual field of the exhibition facilities, and position information of the reference image, acquired, association And memorize (step 1).

The area specifying unit of the system of the present embodiment sets a plurality of areas in the reference image (step 2).

Next, the target information collecting unit of the system of the present embodiment collects information about the animal from the moving image captured by the imaging device and stores it in the target database (step 3).

Next, the position generation unit of the system of the present embodiment generates the position information of the target animal and stores it in the target database (step 4).

Next, the statistical processing unit of the system of the present embodiment counts statistical information regarding the target (step 5). The statistical processing unit may generate various kinds of information as statistical information.

For example, the statistical processing unit may generate the staying time ratio of the area in the reference image as statistical information. For example, the ratio of region 1 is X %, region 2 is Y %, and the like. This makes it possible to obtain ecological information on which area of the exhibition facility and how long the animal stays.

In addition, the statistical processing unit may generate statistical information by associating the staying time ratio of the area in the reference image with the time zone. For example, in the time zone T1, the ratio is X1% in the region 1, Y1% in the region 2, X2% in the region 1 in the time zone T2, Y2% in the region 2, and so on. As a result, it is possible to acquire ecological information on which area in the exhibition facility and how long the animal stays, depending on the time zone.

In addition, the statistical processing unit may generate information that can be used as a material for determining the health condition of the animal by comparing it with a past period or a normal period. For example, an average value of information at a plurality of periods may be generated and displayed in comparison with these. The average value of the information at a plurality of periods may be an average value calculated using the age and season of the animal, the same species of animals bred in the garden, the same species of animals including other gardens, and the like. By being displayed in comparison with the average value, it has the advantage of being useful as a reference for estimating the health condition of animals. Further, if the value differs from the average value by a predetermined value or more, an alert may be transmitted. The alert may be configured to be transmitted, for example, to the keeper's mobile terminal. This has the advantage of being able to promptly contact and respond promptly when the value differs from the normal value by a predetermined value or more.

It may have a database (sometimes referred to as "exhibition facility database" in the documents of the present application) having a relationship between the meaning of the area in the exhibition facility and the area. Exhibition lifting of the area within the facility as the one meaning, for example, feeding grounds, water park, exhibition facilities in came visitors to the close location, and the like. By linking with the database and identifying the meaning of the area in the exhibition facility by a one-to-one relationship from the area, the user of the system of the present embodiment can easily understand the meaning of the area. Can be done.

In the above, the target information collecting unit may collect the target information from the moving image captured in real time by the imaging device, or the target information from the moving image recorded in the past by the imaging device. You may collect it. When videos recorded in the past are also used, there is an advantage that statistical information can be collected by making the best use of past information.

Although the above has described animals, they may be used for observing the ecology of insects, fish, and the like.

In the application documents, the paused image in the target moving image may be the image being played.

Further, the real image may be an image pickup device captured by fixed point observation in addition to the moving image, in addition to the one-stop image of the moving image captured by the image pickup device. For example, the panoramic camera captured by one may be. Moreover, there is no limitation on the lens of the image pickup apparatus. For example, it may be an image taken with a fisheye lens or the like. In this case, although there is a possibility that distortion may occur locally with respect to the correspondence with the reference image, it is sufficient if such distortion is allowed and the relationship between the real image and the reference image can be specified.

The imaging measure may be fixed or moving. The movement may be a periodic movement or an aperiodic movement. The real image of the moving imaging device may be the real image of the entire range that the imaging device can capture in the field of view due to the movement. Further, the reference image may be a reference image corresponding to the real image for the entire range. For the target imaged by the moving image pickup device, the target information collecting unit may be able to collect the position information of the target in the real image for the entire range in association with the movement index. The movement index may be, for example, the movement angle or the movement position of the image pickup apparatus. By associating these motion indexes with the position information in the real image, the position information in the real image may be generated for the target imaged by the moving image pickup device. Further, the position generation unit may generate the position information in the corresponding reference image by using the position information of the target in the real image.

In the present application documents, the coordinates have been described centering on Cartesian coordinates. The coordinates may be the coordinates in the Cartesian coordinates absolutely set in the real image, the coordinates in the Cartesian coordinates absolutely set in the reference image, but in the relative set Cartesian coordinates. It may be the coordinates of. For example, the first specified coordinate may be an absolute coordinate within each image, but the next specified coordinate is a relative coordinate with the first specified coordinate as the reference point. You may. In addition, the coordinates may use other coordinate methods other than Cartesian coordinates. For example, it may be polar coordinates. Polar coordinates are a method in which the coordinate position is specified by the distance from the base point and the angle from the reference line including the base point. Further, these coordinates may be transmitted to the display device and displayed on the display device.

Although each of the above-mentioned data has been described in the database format, various data management methods may be used. For example, it may be a method that can appropriately cope with an increase in information by managing various methods such as arrays, pointers, and lists.

The processes and procedures described herein are feasible not only by those expressly described in the embodiments, but also by software, hardware or a combination thereof. Further, the processes and procedures described in the present specification can be implemented by various computers by implementing the processes and procedures as a computer program. In addition, the program may be recorded on a recording medium. Further, the recording medium may be non-temporary.

Here, a technique for collecting information on the relationships between fashion items will be described.

For this embodiment, FIG. 6 will be described with reference to 4. First, a learning image is acquired in order to machine-learn information about fashion (step 1).

The learning image may be obtained from various sources. For example, it may be prepared from media in the fashion industry, such as collection photos, collection videos, top brand photos, top brand videos, top budick brand photos, top budick brand videos, select shop photos, select shop videos, general brand photos, general brands. Examples include videos, general consumer photographs, general consumer videos, and the like.

Examples of media include fashion shows, designer homepages, and publications of fashion-related associations.

In addition, the information related to the learning image may be stored in association with the learning image. The information related to the learning image may be, for example, the type of the fashion item, the color of the fashion item, the pattern of the fashion item, the processing of the fashion item, the accessory of the fashion item, the length of the fashion item, and the like. Incidentally, a particular aspect of the nature of these fashion items, in this application, leave fashion item attributes will. Here, the fashion item attribute is not limited to the above. As described below, for example, in the type of fashion item, there are shirts, blouses, blousons, etc. as subordinate concepts under tops and outerwear. In this case, for the fashion item type, the detailed classification may also be a fashion item attribute. The subordinate concept is provided not only for the type of fashion item but also for other fashion item attributes. In this way, the fact that one fashion item attribute has a fashion item attribute of a subordinate concept may be called a layering of fashion item attributes, as will be described later. As will be described later, the term fashion item attribute may indicate information used during machine learning, or may be generated by applying it to a target image using a system after machine learning. It may also indicate attribute information.

For the types of fashion items, for example, tops (T-shirts/cut-and-sew, shirts, blouses, polo shirts, sweaters/knits, vests, parkers, sweatshirts, cardigans, tank tops, camisole, bische, vests), outer jackets (tailored jackets, etc.) Collarless jacket, denim jacket, ride's jacket, bruzon, down jacket, coat, trench coat, military jacket, down vest, knit coat, gown dress), pants (denim pants, cargo pants, chino bread, slacks), dress (dress, dress, All-in-one), bags (shoulder bags, tote bags, backpacks/backpacks, Boston bags, body bags/waist pouches, handbags, clutch bags, suitcases/carry bags, basket bags), shoes (sneakers, slip-ons, sandals, pumps, Boots, booties, dress shoes, ballet shoes/loafers, mocasins/deck shoes, rain shoes), hats (hats, beanies, hunting/berets, casquette), skirts, etc.

The color of the fashion item may be, for example, white, black, gray, brown, beige, green, blue, purple, yellow, pink, red, orange, gold, silver, or the like.

The pattern of the fashion item may be, for example, a plain pattern, a border pattern, a dot pattern, a striped pattern, a check pattern, a floral pattern, a camouflage pattern, a leopard pattern, or the like.

The processing of fashion items may be, for example, no processing, lace processing, pleating processing, chiffon processing, gather processing, fur processing, corduroy processing, or the like.

If it is an accessory of a fashion item, for example, it may be without accessory, with frill, with ribbon, with bijou, with one point, with damage, with point fur, and the like.

For fashion item lengths, for example, short sleeves, short sleeves, long sleeves, sleeveless, short length, middle length, long length, skinny tight, standard, wide loose, short length/above knee length, half/knee length, Full length, short/mini length, knee length, mimore/odd length, long/maxi length, etc.

Here, a specific value such as white, black, or gray in the color of the fashion item, a specific value such as a plain pattern, a border pattern, or a dot pattern in the pattern of the fashion item is referred to as a fashion item attribute value.

FIG. 65 is an example in which the ID indicating the learning image and the attribute information related to the learning image are associated and recorded in the database. An ID indicating each learning image is associated with one fashion item contained therein. Further, a plurality of fashion item attributes are associated with the one fashion item. In this way, the learning image and the information related to the learning image may be associated and stored. Here, as fashion item attributes, the type of fashion item, the color of the fashion item, the processing of the fashion item, and the like are listed. In addition, specific attribute values are stored for each learning ID. Further, regarding the types of fashion items, as more detailed classifications, the classifications are detailed as type details 1 and type details 2. In this way, fashion item attributes may be layered. Further, the layered fashion item attributes are not limited to the types of fashion items, and may be other fashion item attributes or may be layered. By layering the fashion item attributes in the training data, there is an advantage that the fashion item attributes generated by the attribute information generator described later can also be layered.

The system of the present embodiment may be configured so that a plurality of fashion item attributes related to one fashion item can be associated with one learning image and machine-learned as learning data to generate attribute information. When the attribute information generation function generated in this way is applied to an image including a fashion item, there is an advantage that a plurality of fashion item attributes related to the one fashion item can be generated. When these multiple fashion item attributes are associated and stored, information about the multiple fashion item attributes becomes available. Specifically, in a certain image, information with a polo shirt is generated as a type of fashion item with a fashion item attribute, information with green is generated as a color of a fashion item with a fashion item attribute, and a fashion item with a fashion item attribute is generated. When the information of the border pattern as a pattern of is generated, polo made and shirt, and green, and the fact that the border pattern is stored in association with each other. This is because people's tastes and impressions of fashion are greatly influenced by the combination of multiple fashion item attributes related to fashion items, so there is an advantage that this information is stored in association with each other. Then, as a means for generating the plurality of attribute information related to the fashion item in relation to each other, there is a technical advantage in machine learning by associating the plurality of attribute information related to the fashion item.

FIG. 66 is another example to be recorded where an ID indicating the learning image, and attribute information relating to the learning image, are associated in a database. An ID indicating each learning image is associated with a plurality of fashion items contained therein. In addition, a plurality of fashion item attributes are associated with each fashion item. In this way, the learning image and the attribute information related to the learning image may be associated and stored.

The system of the present embodiment may associate one fashion item with one learning image and use it as learning data, but the system of the present embodiment has a plurality of fashions with respect to one learning image. It may be configured so that items can be associated with each other and machine-learned as learning data to generate attribute information. For example, if a learning image contains tops, skirts, and bags, information on the fashion item names, colors, patterns, processing, accessories, etc. of these tops, skirts, and bags can be found. It may be associated as information related to the learning image. When the attribute information generation function generated in this way is applied to a target image in which a plurality of fashion items are included in one image, a plurality of fashion item attributes related to the plurality of fashion items are displayed. It has the advantage of being able to generate. This is done by generating fashion item attributes for at least two or more fashion items among the plurality of fashion items when a plurality of fashion items are included in the image to be identified. There is an advantage that the relationship between items can be generated by associating them as information. Since fashion generally takes into consideration combinations, there is an advantage that information can be generated from an image including the relationship between a plurality of fashion items and the relationship between a pluralities of fashion item attributes related to each fashion items.

Further, the attribute information related to the learning image may be information related to a person included in the learning image. For example, it may be information indicating a person such as gender, age, age group, height, physique, facial expression, etc. from a specific viewpoint. These are referred to as human attributes in the application documents. Moreover, the specific value is called a human attribute value. Human attributes as attribute information have the advantage of being able to enrich information about fashion items. That is, whether fashion items are preferred by men, women, what age group they are, and how tall they are. It is also related to information about people, such as what kind of physique they like. Therefore, by storing such a person attribute in association with a fashion item, there is an advantage that it is possible to generate information as to what type of person the fashion item is associated with. Further, by storing such a person attribute in association with the fashion item attribute, there is an advantage that it is possible to generate information as to what type of person the fashion item attribute is associated with. As with the fashion item attributes described above, the human attributes may also be hierarchized. For example, there is a stratification of age groups such as an age group of 10 years old, an age group of 5 years old, and an age group of 2 years old, or an age group of 5 years old and a specific age group. As such, the age group and the age group may be stratified. In addition, the human attribute, like the fashion item attribute, may indicate information used in machine learning, or the result obtained by applying it to the target image using the system after machine learning. It may also indicate the corresponding information in. Here, the fashion item attribute and the human attribute may be included in the "attribute information", and the fashion item attribute value and the human attribute value may be included in the "attribute value". In addition, the attribute information may also be hierarchized.

FIG. 67, the ID indicating the learning image, and attribute information relating to the learning image, in and is associated with a database, which is another example which is recorded. The ID indicating the learning image is associated with the person and the fashion item included in the learning image. The person and the fashion item may be one or more, respectively. People and fashion items may also be associated. The association between a person and a fashion item may be, but is not limited to, the relationship between the fashion item worn by the person. In addition, a plurality of human attributes are associated with each person. In addition, a plurality of fashion item attributes are associated with each fashion item. In this way, the learning image and the information related to the learning image may be associated and stored.

Also, FIG. 68 is further another example to record database where the ID indicating the learning image, and attribute information relating to the learning image are associated. It is an example of a relational database and they are associated thorough an image for learning ID and a person in the image for learning. For example, for the learning image ID 1002, there are three people in the image, one or more fashion items are associated with each person, and a plurality of fashion item attributes are associated with each one fashion item. In the case of FIG. 8, for example, the number of records including one attribute value of the fashion item type indicates the number of the fashion items, and one fashion item is included in one reference image. And there is an advantage that it is possible to handle the case in an unified manner. FIG. 68 shows an example of a layered human attributes where a rough age group and fine age group are provided.

In the above, as the relationship between the person and the fashion item, the fashion item imaged in the image is associated with the position worn by the person and the person, but the relationship between the other person and the fashion item. It may be attached. For example, a person holds a fashion item by hand, a person is located behind the fashion item, and so on. In this way, if humans can find a relationship between a person and a fashion item when they see the image, machine learning may be able to derive rules regarding the relationships that humans can find. People may be associated with fashion items based on machine-learned rules.

Next, the system of the present embodiment may perform machine learning to generate an attribute information generation function (step 2). As the input information, information in which the learning ID based on the ID indicating the above-mentioned learning image and the attribute information related to the learning image are associated with each other may be used. With these, the relationship between the learning image and the attribute information related to the learning image may be machine-learned. The system of the present embodiment may have an attribute information generation function capable of generating attribute information related to the image with respect to an input image by machine learning.

Various artificial intelligence techniques may be used for machine learning. Artificial intelligence technologies include, for example, machine learning technologies such as neural networks, genetic programming, functional logic programming, support vector machines, clustering, regression, classification, Bayesian networks, reinforcement learning, expression learning, decision trees, and k-means clustering. In the following, an example using a neural network will be used, but the present invention is not necessarily limited to the neural network.

As the machine learning technique using the neural network, a deep learning technique may be used. This is a technology that enables output even for an unknown input by learning the relationship between input and output using a plurality of layers. There are supervised and unsupervised methods, either of which may be applied. In the above FIG. 67, ID indicating a image for learning and an attribute information involving the image for learning are associated and the information involving an image for learning as a supervision and it is an example of a supervised method but it is not necessarily to use the supervised method but it may use the unsupervised method.

The system of this embodiment may perform a machine learning targeting a learning data associated between a learning image and a plurality of fashion item attributes involving one fashion item included in the learning image and may perform a machine learning targeting a learning data associated between a learning image and a plurality of fashion item attributes involving a plurality of fashion items included in the learning image.

Further, the fashion item attributes and the human attributes for the learning image may be collectively machine-learned in one machine learning device, the fashion item attributes and the human attributes for the learning image may be separately machine-learned. When the fashion item attributes and the human attributes for the learning image are separately machine-learned, each attributes are focused and can be efficiently machine-learned.

Further, it may be a device that machine-learns only fashion item attributes. This is because, among the objects learned by the human attribute, the age and gender, which are the human attributes, may be collected from the external information of the image.

The system of the present embodiment after machine learning may be configured to be able to output attribute information related to the target image when applied to the acquired target image. The attribute information may be one or more fashion item attributes related to one or more fashion items in the target image, or one or more person attributes related to one or more people in the target image. It may be one or more fashion item attributes related to one or more fashion items in the target image and one or more person attributes related to one or more people in the target image. FIG. 69 is an example of the generated attribute information. Here, as the attribute information, the human attribute and the fashion item attribute are associated with each other. The fashion item may be one or more. Further, the attribute information generated by the attribute information generation function may also be hierarchized by layering the attribute information of the learning database. By layering the attribute information, it is possible to generate more detailed attribute information for the target image.

Further, when the system of the present embodiment after machine learning is applied to a target image including a plurality of people, one or a plurality of attributes and/or a plurality of attributes related to one or a plurality of fashion items in the target image. The configuration may be such that a plurality of attributes related to a plurality of people in the target image can be output. Here, the attribute relating to one or more fashion items may be associated with the person who wears the fashion item and may be associated with the attribute of the person. FIG. 70 shows one or more person attributes and one or more fashion item attributes related to one or more fashion items for each of the plurality of people in the target image based on the order of description. This is an example generated in association with each other.

In addition, by combining the above, the system of the present embodiment after machine learning, when applied to the acquired target image, has one or more attributes related to one or more fashion items in the target image. Alternatively, the configuration may be such that a plurality of attributes related to one or a plurality of people in the target image can be output.

The generated information may be stored as appropriate.

The system of this embodiment is an attribute information generation system comprising of, an acquisition unit that acquires an image for machine learning that includes one or more fashion items in the image, and
a neural network unit that machine-learns the relationship between the one learning image and one or more fashion item attributes related to the one or more fashion items by deep learning.

When the system of the present embodiment has the above-described configuration, there is an advantage that one or more fashion item attributes which are information about one or more fashion items can be acquired from an image including one or more fashion items.

In addition, the system of this embodiment may be an attribute information generation system comprising from,
an acquisition unit that acquires an image for machine learning that includes one or more fashion items with a person in the image
a neural network unit that machine-learns the relationship between the one learning image, the human attribute related to the person, and the one or more fashion item attributes related to the one or more fashion items by deep learning.

When the system of the present embodiment includes the above-described configuration, one or more fashion items which are information about one or more person attributes and one or more fashion items from an image containing a person and one or more fashion items. There is an advantage that it can be obtained by associating it with an attribute.

In addition, the system of this embodiment may be an attribute information generation system comprising of,
an acquisition unit that acquires an image for machine learning that includes one or more fashion items with one or more people in the image, and
an neural network unit that machine-learns the relationship between the one or more learning images, one or more person attributes related to the one or more people, and one or more fashion item attributes related to the one or more fashion items associated with the one or more people.

In addition, the network unit in the document of the present application includes the one learning image and one or more people related to the one or more people for the machine learning image including one or more people and one or more fashion items. A trained neural network unit is produced by machine learning the relationship between an attribute and one or more fashion item attributes related to the one or more fashion items associated with the one or more people by deep learning. A method (including a method of manufacturing the neural network unit, but expressed as being produced in the present document) may be included. The neural network unit may be a program.

When the system of the present embodiment includes the above-described configuration, from an image containing one or more people and one or more fashion items, one or more attributes relating to one or more people, and each of the plurality of people. There is an advantage that one or more person attributes associated with a person and one or more fashion item attributes which are information about the one or more fashion items associated with each person of the person can be acquired.

As described above, the system of the present embodiment includes one or more people and/or one or more fashion items in one learning image and is associated with the one learning image. A machine learning device that has learned one or more person attributes related to the one or more people and/or one or more fashion item attributes related to the one or more fashion items as learning data is attribute information. Will be able to generate. Since the system of the present embodiment having the attribute information generation function can generate attribute information when applied to an image including a fashion item, information on the fashion item is organized from the image including the fashion item. There is an advantage that can be obtained.

EXPLANATION OF SYMBOLS

10 Information processing device
11 bus
12 Calculation unit
13 Memory
14 Input section
15 Display
16 Communication IF
19 networks
2401 people
2402 passage
2403 field of view
2404 field of view
2405 imaging device
2406 Imaging device
2407 Information processing device

The invention claimed is:
1. A method to identify a position in a figure corresponding to a position in an image comprises:
   storing, by a computer, a plurality of first positions in the image captured by an imaging device and a plurality of second positions corresponding to the plurality of the first positions in the figure corresponding to the image as a relationship,
   acquiring, by a computer, the third position involving a target in the image,
   generating, by a computer, a fourth position in the figure corresponding to the third position, using a positional relationship between a part of the plurality of the first positions and the third position and a part or all of the relationship,
   wherein a part of the plurality of the first positions is three first positions closest to the third position among the plurality of the first positions,
   wherein the generating the fourth position includes using a side of a triangle comprising from the three first positions, and wherein the generating the fourth position includes using each perpendicular line from the third position to sides or extension lines thereof involving the triangle.

2. The method according to claim 1, wherein the generating the fourth position includes using each intersection of the perpendicular line corresponding to each side of the triangle or the extension lines thereof.

3. The method according to claim 1, the method includes obtaining, by a computer, one of the second positions after obtaining one of the first positions.

4. The method according to claim 3, the method includes displaying, by a display device displaying the figure, the first position after obtaining the one of the first positions and before obtaining the one of the second positions by a computer.

5. The method according to claim 4, the method includes continuing to display, by a displaying device displaying the figure, the first positions obtained by a computer until finishing the obtaining of the plurality of the first positions.

6. The method according to claim 1, the method includes obtaining, by a computer, one of the first positions after obtaining one of the second positions.

7. The method according to claim 6, the method includes displaying, by a display device displaying the figure, the second position after obtaining one of the second positions and before obtaining one of the first positions by a computer.

8. The method according to claim 7, the method includes continuing to display, by a display device displaying the figure, the second positions obtained by a computer until finishing the obtaining of the plurality of the second positions.

9. A non-transitory computer readable medium containing a program operating a computer by a method according to claim 1.

10. A system comprising of
a storing unit to store a plurality of first positions in the image captured by an imaging device and a plurality of second positions corresponding to the plurality of the first positions in a figure corresponding to the figure as a relationship,
an acquiring unit to acquire the third position involving a target in the figure, and
a generation unit to generate a fourth position in the figure corresponding to the third position, using a positional relationship between a part of the plurality of the first positions and the third position and a part or all of the relationship,
wherein a part of the plurality of the first positions is three first positions closest to the third position among the plurality of the first positions,
wherein the generation unit to generate the fourth position uses a side of a triangle comprising from the three first positions, and
wherein the generation unit to generate the fourth position uses each perpendicular lines from the third position to sides or extension lines thereof involving the triangle.

11. The system according to claim 10, wherein the generating unit to generate the fourth position uses each intersection of the perpendicular line corresponding to each side of the triangle or the extension lines thereof.

12. The system according to claim 10, the system includes an obtaining unit to obtain the first positions and the second positions,
wherein the obtaining unit obtains one of the second positions after obtaining one of the first positions.

13. The system according to claim 10, the system includes an obtaining unit to obtain the first positions and the second positions,
wherein the obtaining unit obtains one of the first positions after obtaining one of the second positions.

* * * * *